United States Patent
Kazi et al.

(10) Patent No.: US 9,762,395 B2
(45) Date of Patent: Sep. 12, 2017

(54) ADJUSTING A NUMBER OF DISPERSED STORAGE UNITS

(71) Applicant: CLEVERSAFE, INC., Chicago, IL (US)

(72) Inventors: Asimuddin Kazi, Naperville, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 14/636,860

(22) Filed: Mar. 3, 2015

(65) Prior Publication Data

US 2015/0317196 A1  Nov. 5, 2015

Related U.S. Application Data

(60) Provisional application No. 61/986,399, filed on Apr. 30, 2014.

(51) Int. Cl.
*G06F 11/20* (2006.01)
*H04L 9/32* (2006.01)
(Continued)

(52) U.S. Cl.
CPC .............. *H04L 9/3242* (2013.01); *G06F 3/06* (2013.01); *G06F 3/067* (2013.01); *G06F 3/0619* (2013.01);
(Continued)

(58) Field of Classification Search
CPC ............. H04L 67/1097; H04L 67/1095; H04L 67/1002; H04L 67/1008; H04L 67/101;
(Continued)

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Joseph Schell
(74) *Attorney, Agent, or Firm* — Garlick & Markison; Timothy W. Markison

(57) ABSTRACT

A method begins by a processing module of a dispersed storage network (DSN) determining that a set of storage units of the DSN will be substantially used for read operations of dispersed storage error encoded data. For the set of storage units, the method continues with the processing module determining an actual level of reliability in retrieving a decode threshold number of encoded data slices per read request of a plurality of read requests. The method continues with the processing module comparing the actual reliability to a desired level of reliability in retrieving the decode threshold number of encoded data slices per read request of the plurality of read requests. When the actual reliability exceeds the desired reliability by a reconfiguration threshold, the method continues with the processing module removing one or more storage units from the set of storage units.

26 Claims, 54 Drawing Sheets

(51) Int. Cl.
*G06F 11/07* (2006.01)
*G06F 3/06* (2006.01)
*H04L 29/08* (2006.01)
*H04L 9/08* (2006.01)
*H04L 29/06* (2006.01)
*H04L 9/14* (2006.01)

(52) U.S. Cl.
CPC ............ *G06F 3/0653* (2013.01); *G06F 11/07* (2013.01); *G06F 11/076* (2013.01); *G06F 11/0727* (2013.01); *G06F 11/0754* (2013.01); *G06F 11/2058* (2013.01); *H04L 9/0822* (2013.01); *H04L 9/14* (2013.01); *H04L 63/0435* (2013.01); *H04L 67/10* (2013.01); *G06F 3/0685* (2013.01); *G06F 11/2094* (2013.01); *G06F 2211/1004* (2013.01)

(58) Field of Classification Search
CPC ......... G06F 17/30194; G06F 17/30215; G06F 3/067; G06F 3/0683; G06F 3/0685; G06F 3/0617; G06F 3/065; G06F 11/1453; G06F 11/2058; G06F 11/2056; G06F 11/2094; G06F 2211/1028; G06F 2211/1004
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0078174 A1* | 6/2002 | Sim ................... | G06F 17/30194 709/219 |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0080810 A1* | 4/2005 | Matsuura ............ | G06F 3/0605 |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2009/0172277 A1* | 7/2009 | Chen .................... | G06F 3/0617 711/114 |
| 2010/0023524 A1 | 1/2010 | Gladwin et al. | |
| 2011/0060759 A1* | 3/2011 | Fienblit ............ | G06F 17/30575 707/770 |
| 2011/0072230 A1* | 3/2011 | Dudgeon ............ | G06F 3/0608 711/165 |
| 2011/0078277 A1* | 3/2011 | Baptist .................. | G06F 3/0617 709/217 |
| 2011/0289359 A1* | 11/2011 | Resch ................ | G06F 11/2094 714/42 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

(56) References Cited

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

| DST allocation info 242 | data partition info 320: data ID; No. of partitions; Addr. info for each partition; format conversion indication | | | | | | |
|---|---|---|---|---|---|---|---|
| | task execution info 322 | | | | intermediate result info 324 | | |
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1-4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_2, 2_2, 3_2, 4_2, & 5_2 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | DST unit 5 | DST unit 5 | DST units 5,6, 1-3 |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

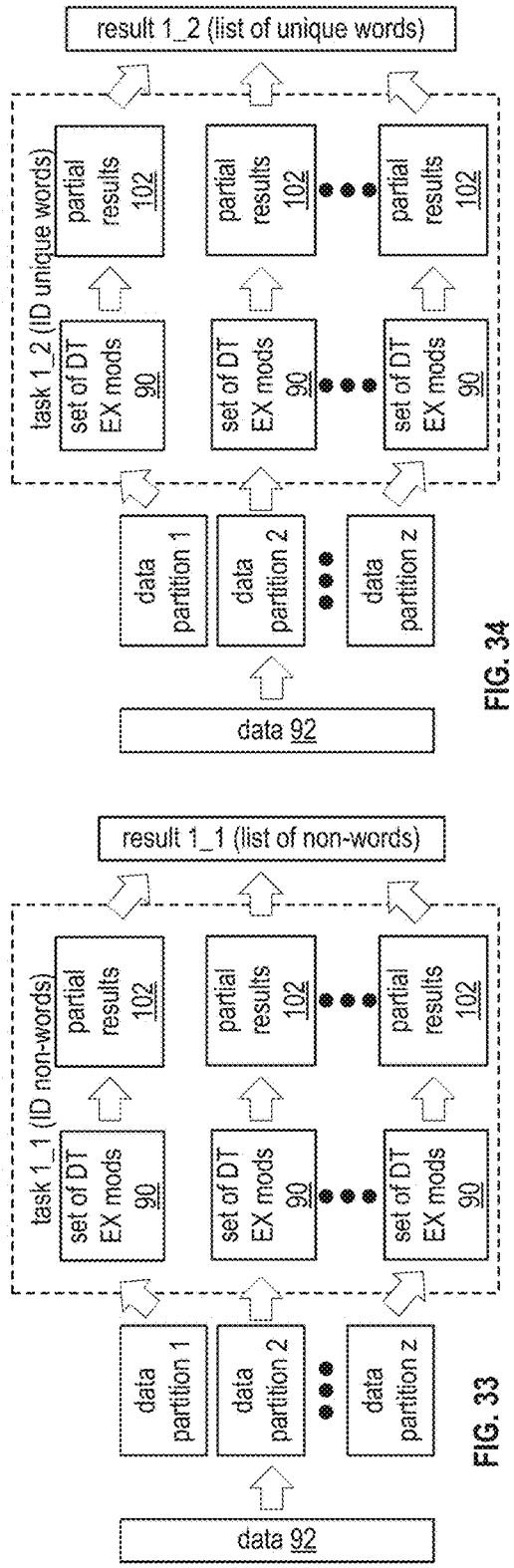
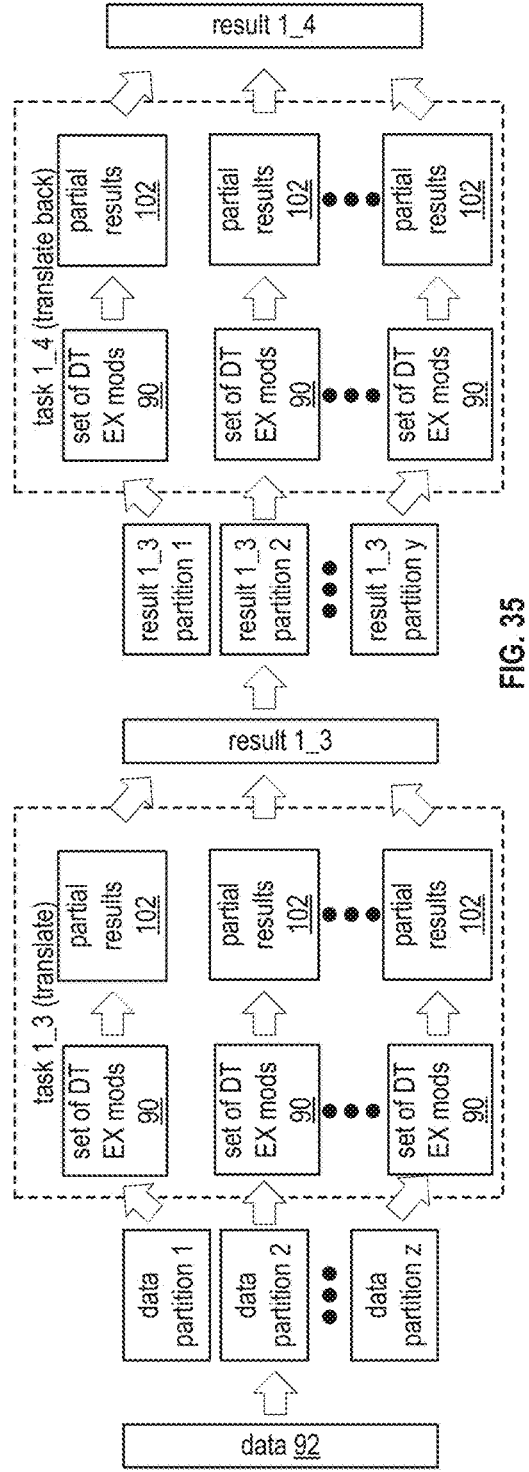
FIG. 33
FIG. 34
FIG. 35

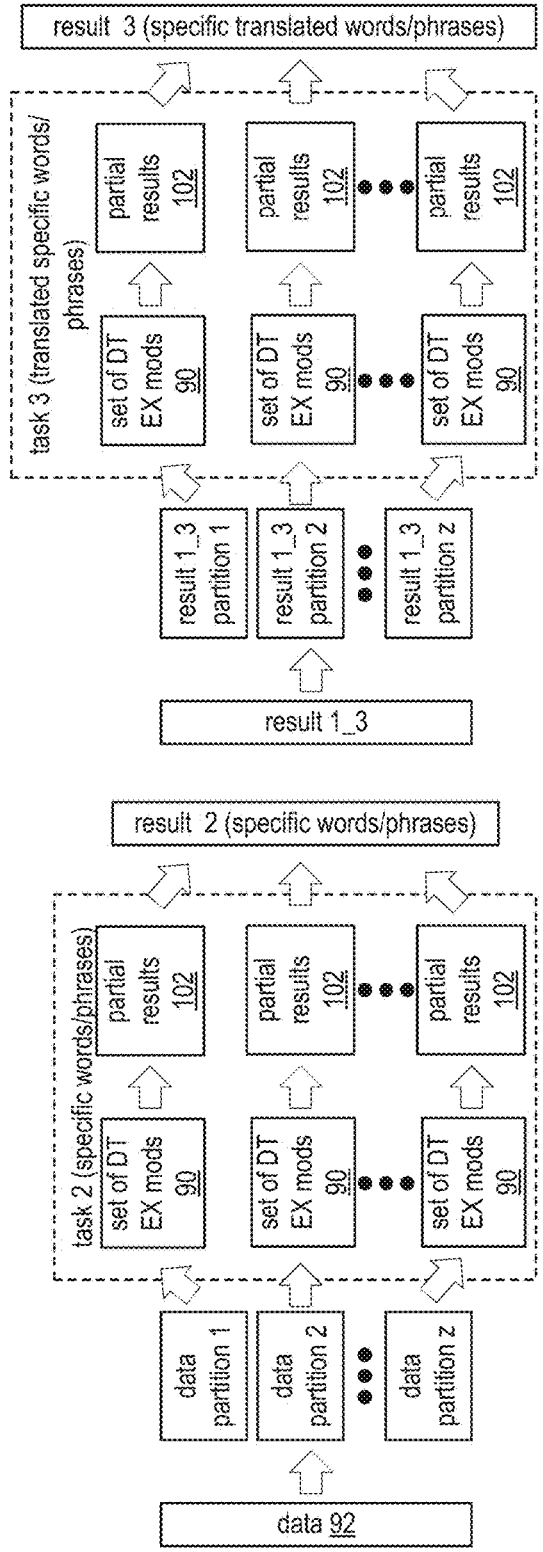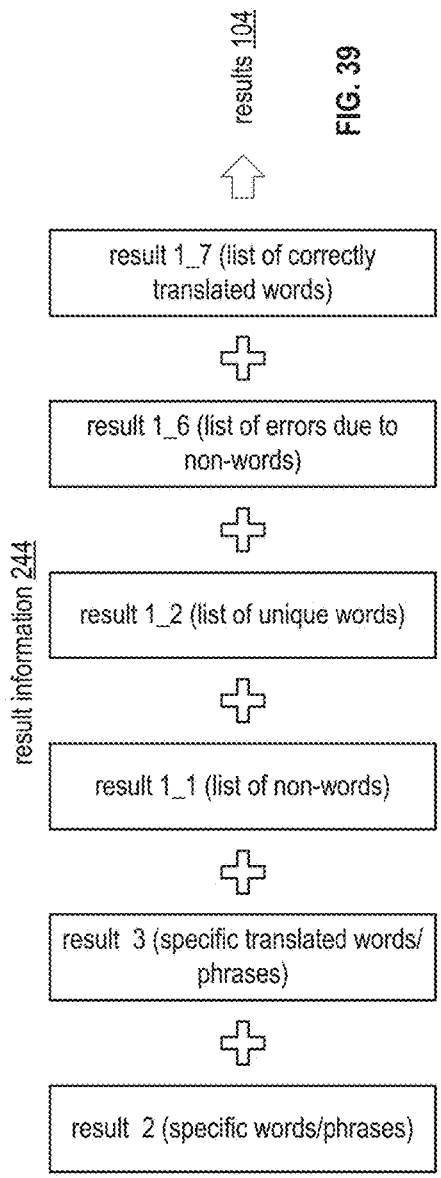

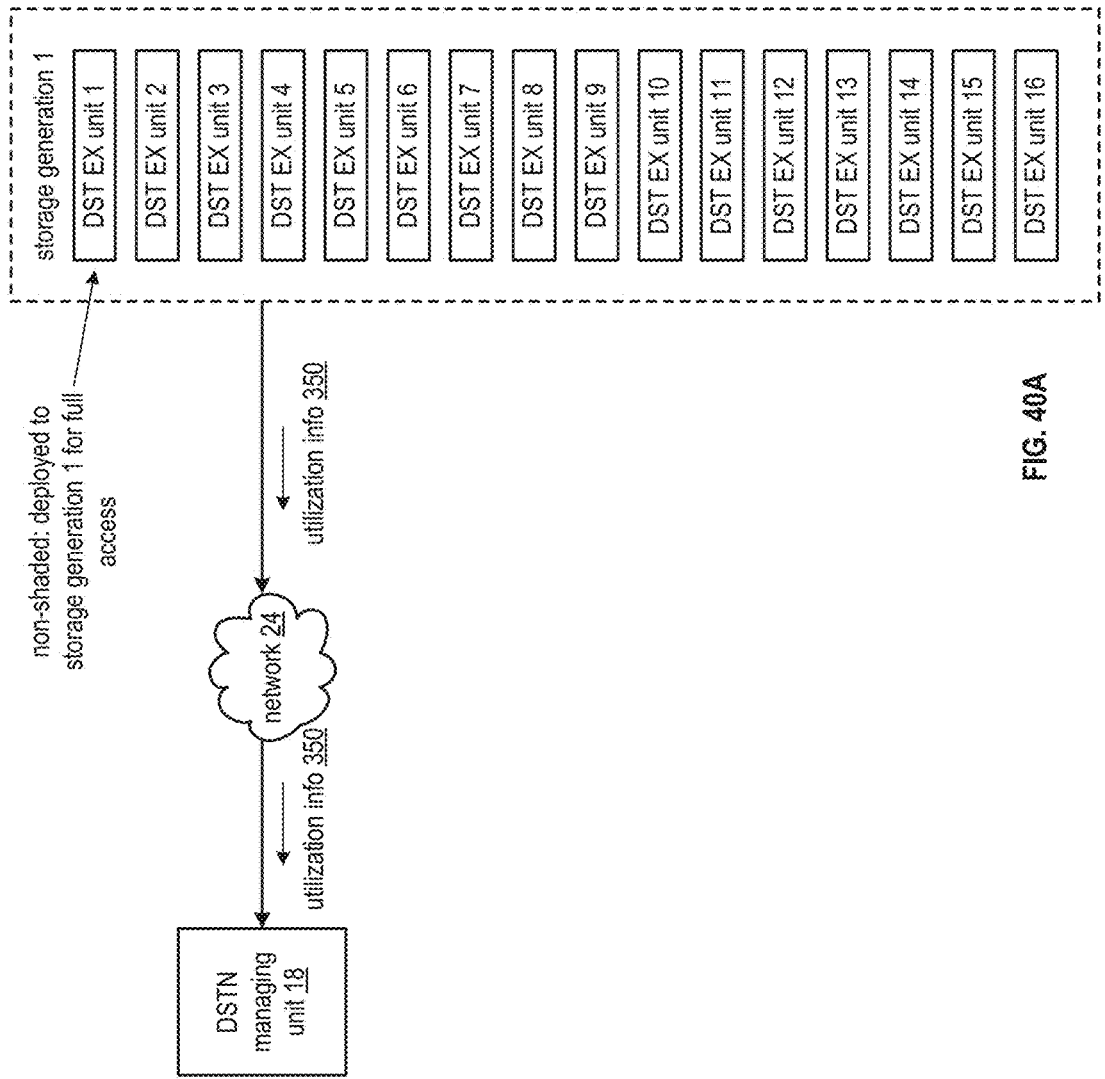

ADJUSTING A NUMBER OF DISPERSED STORAGE UNITS

CROSS REFERENCE TO RELATED PATENTS

The present U.S. Utility patent application claims priority pursuant to 35 U.S.C. §119(e) to U.S. Provisional Application No. 61/986,399, entitled "ALLOCATING STORAGE GENERATIONS IN A DISPERSED STORAGE NETWORK", filed Apr. 30, 2014, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIGS. 40A and 40B are a schematic block diagram of an embodiment of a dispersed storage network (DSN) in accordance with the present invention;

DETAILED DESCRIPTION OF THE INVENTION

Figure 1:
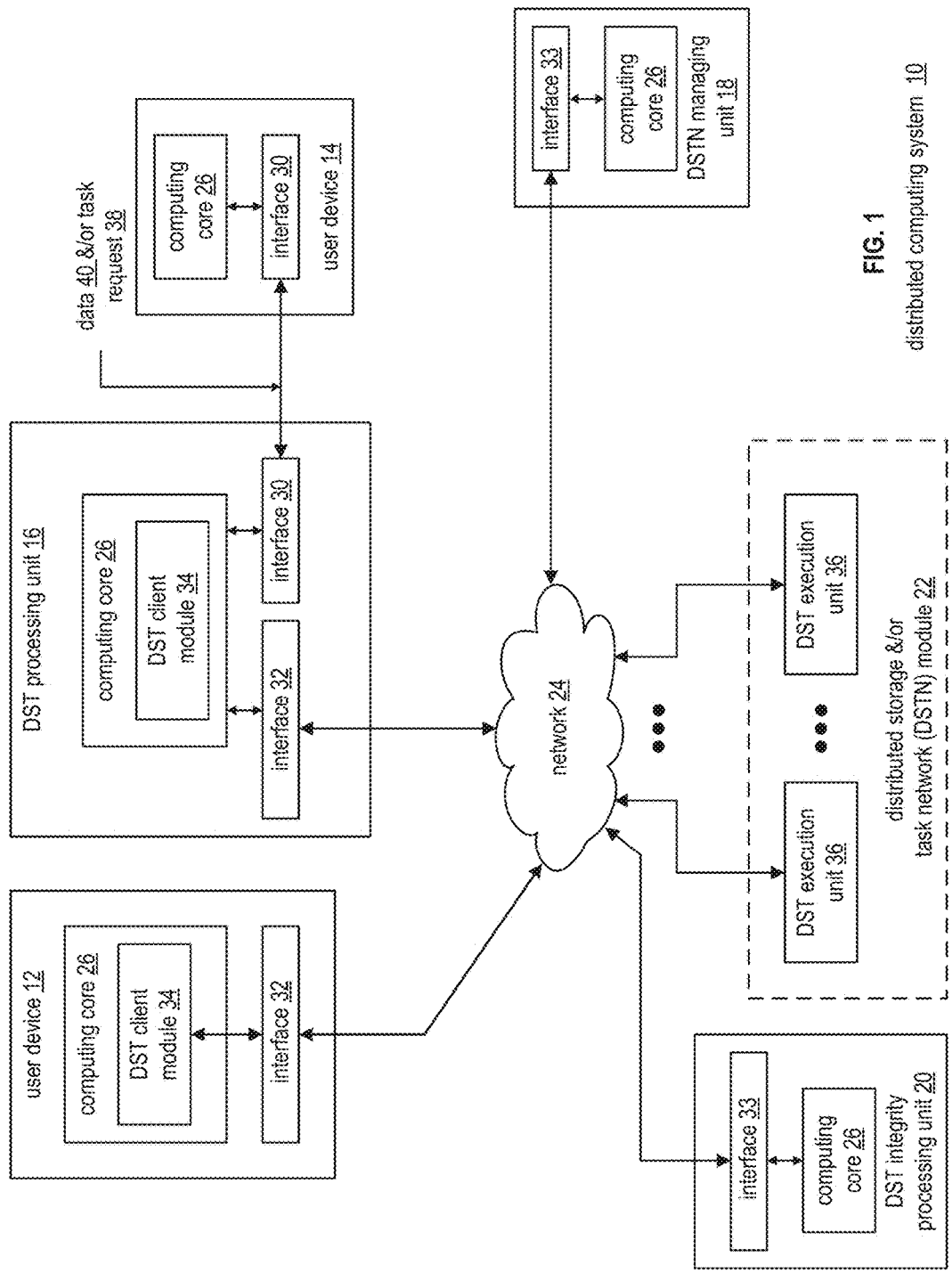
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24. The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
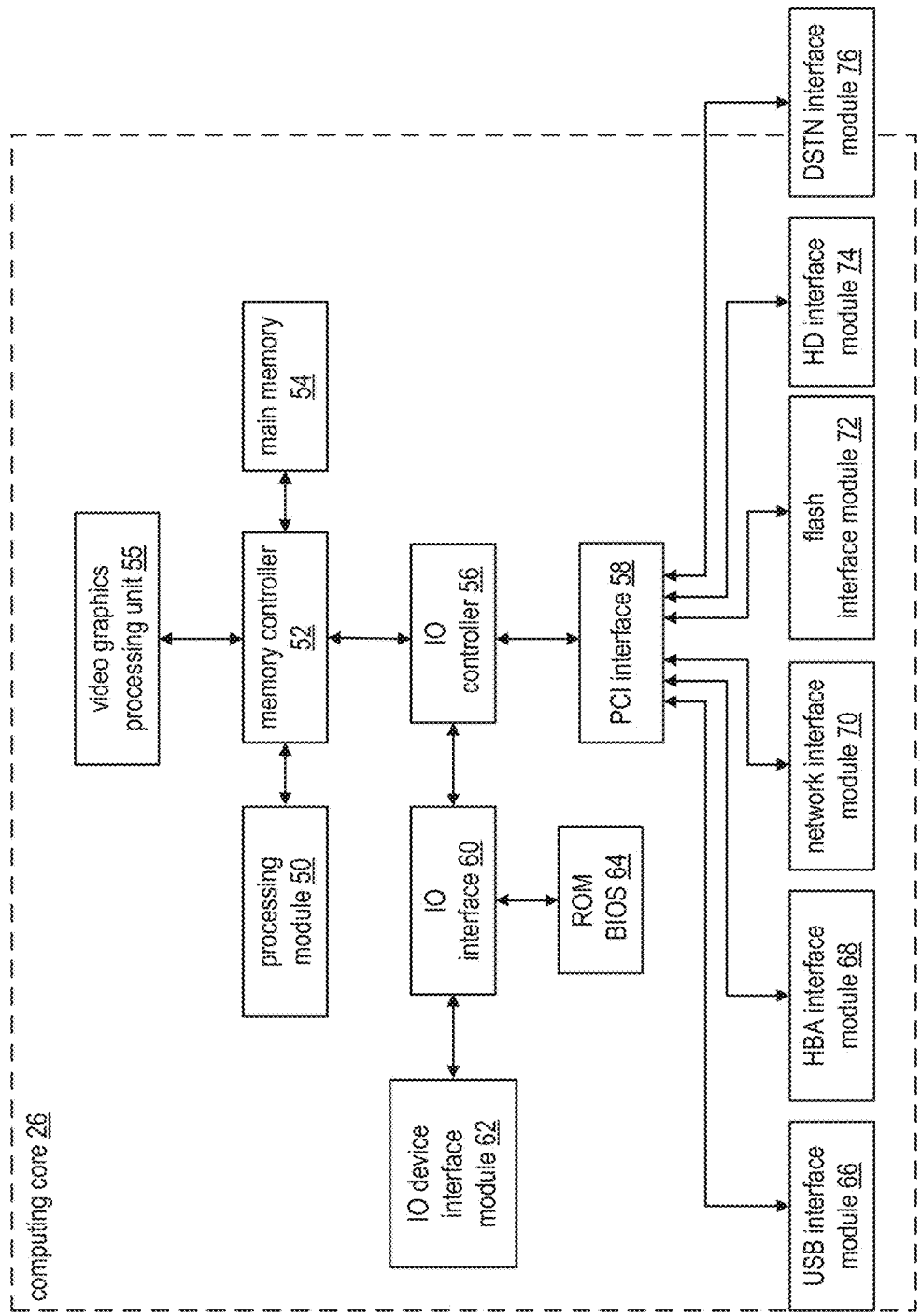
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
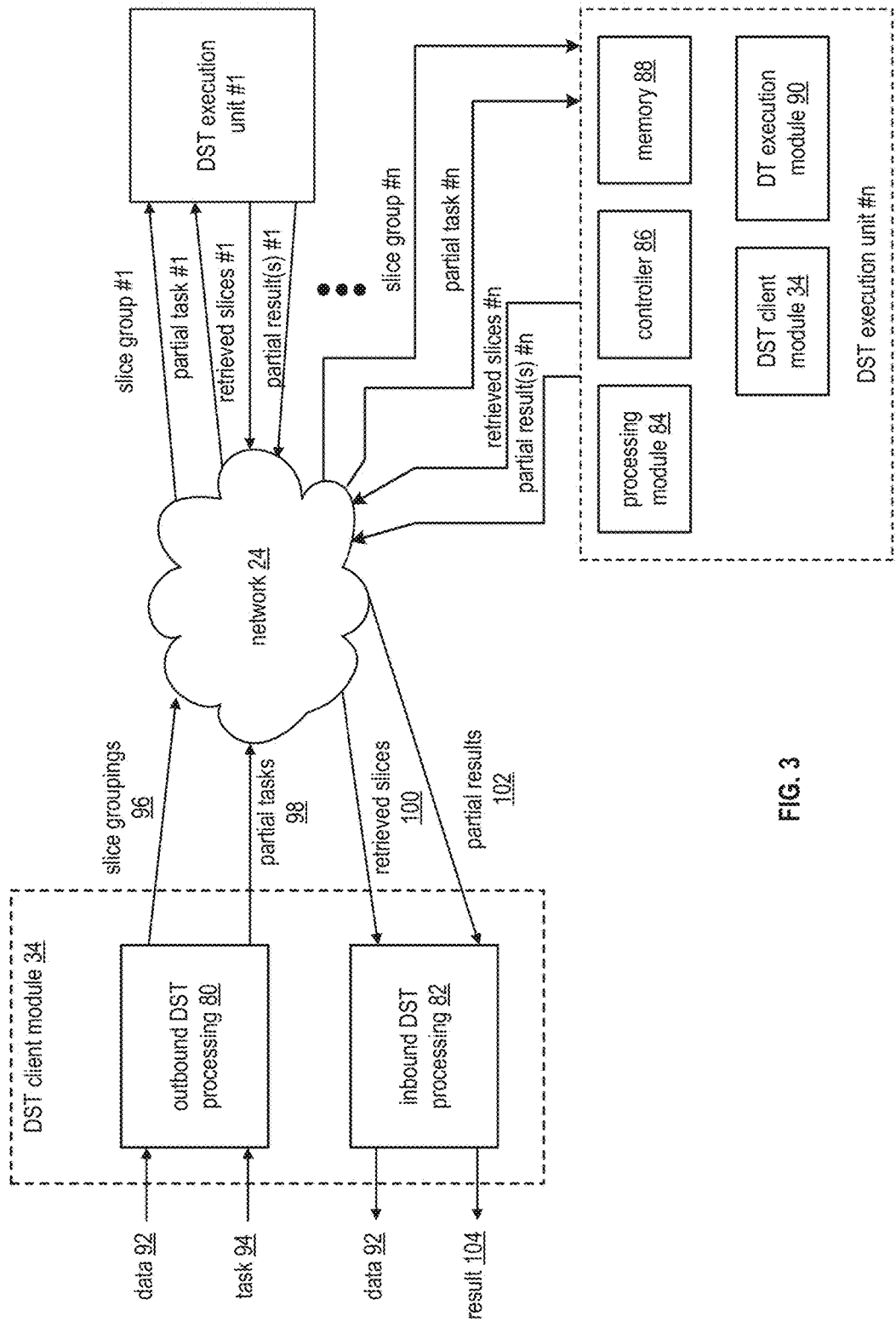
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
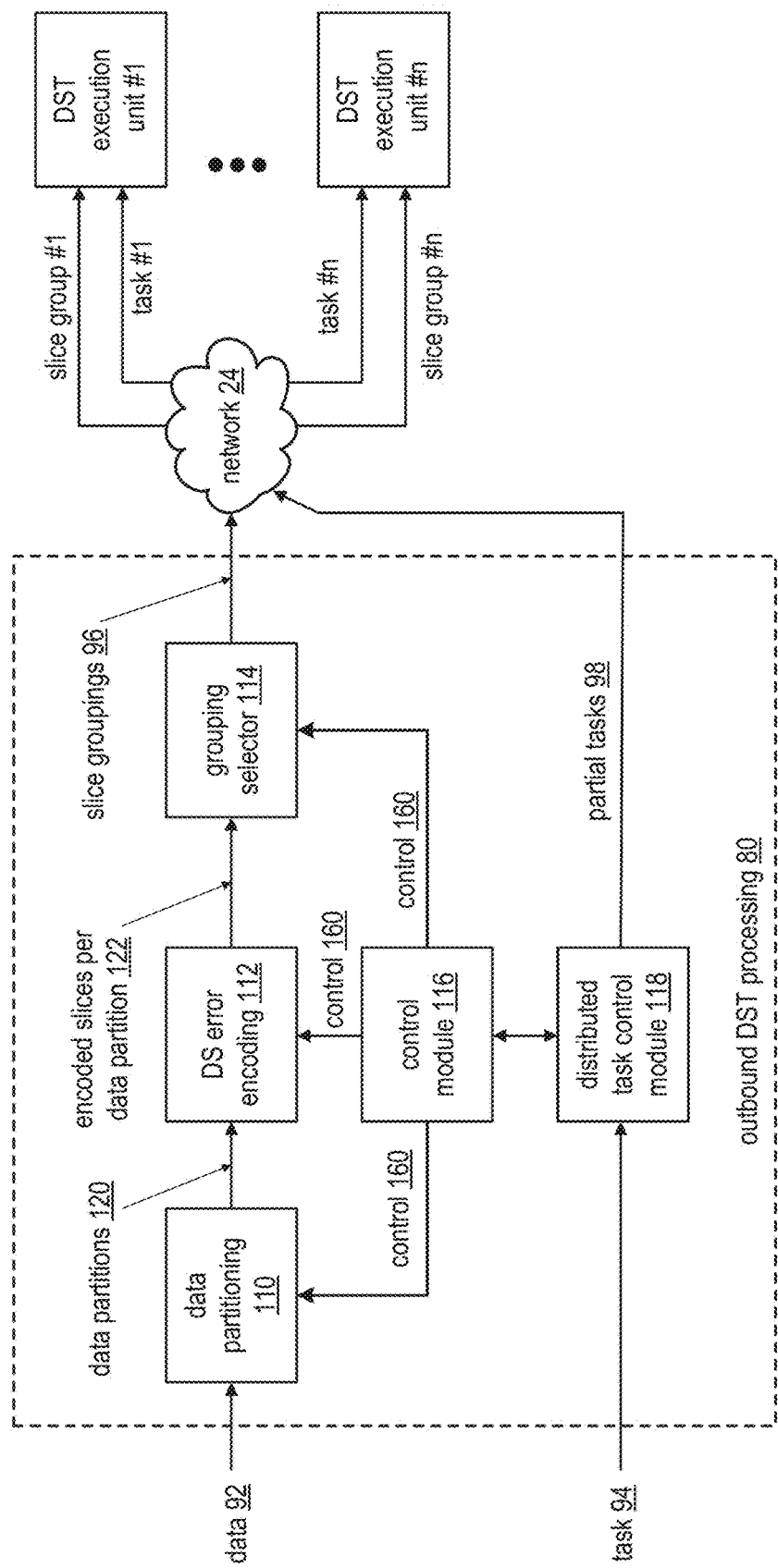
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
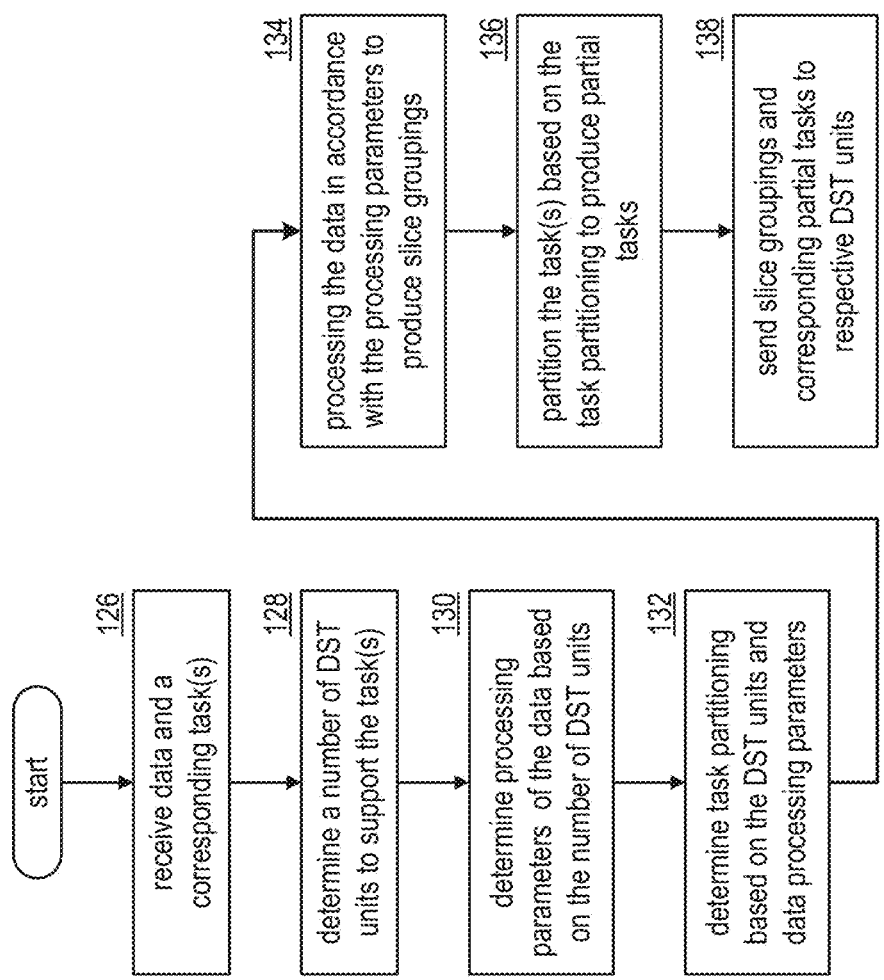
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
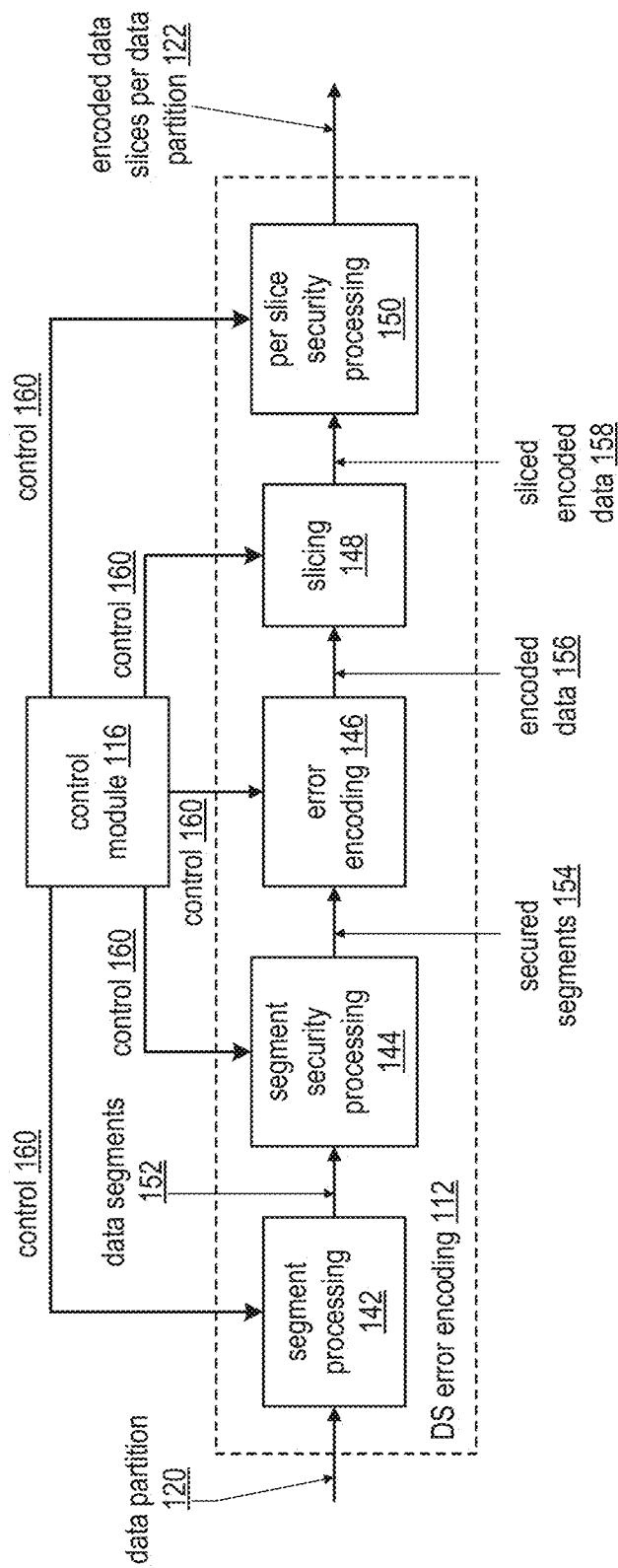
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
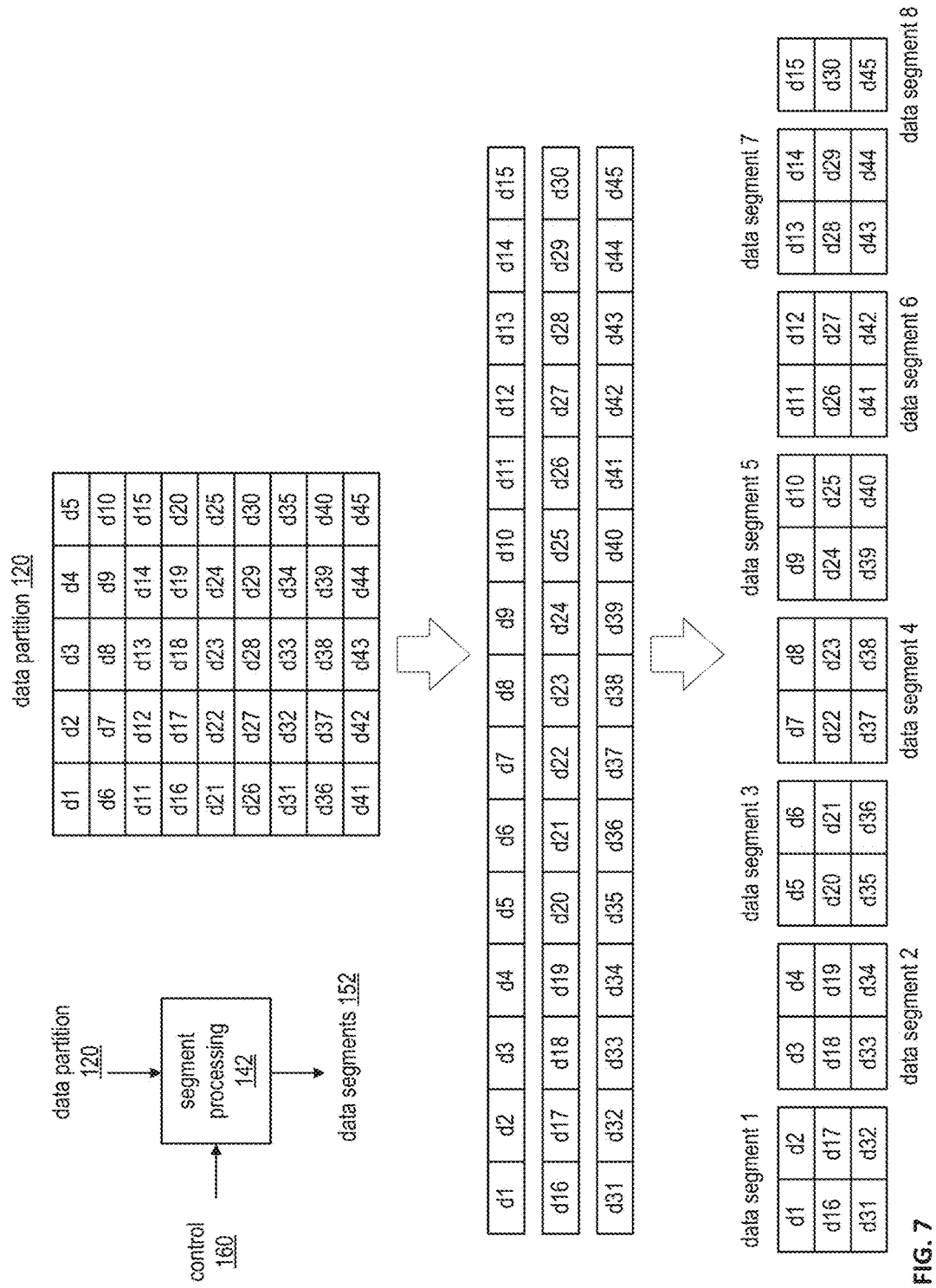
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
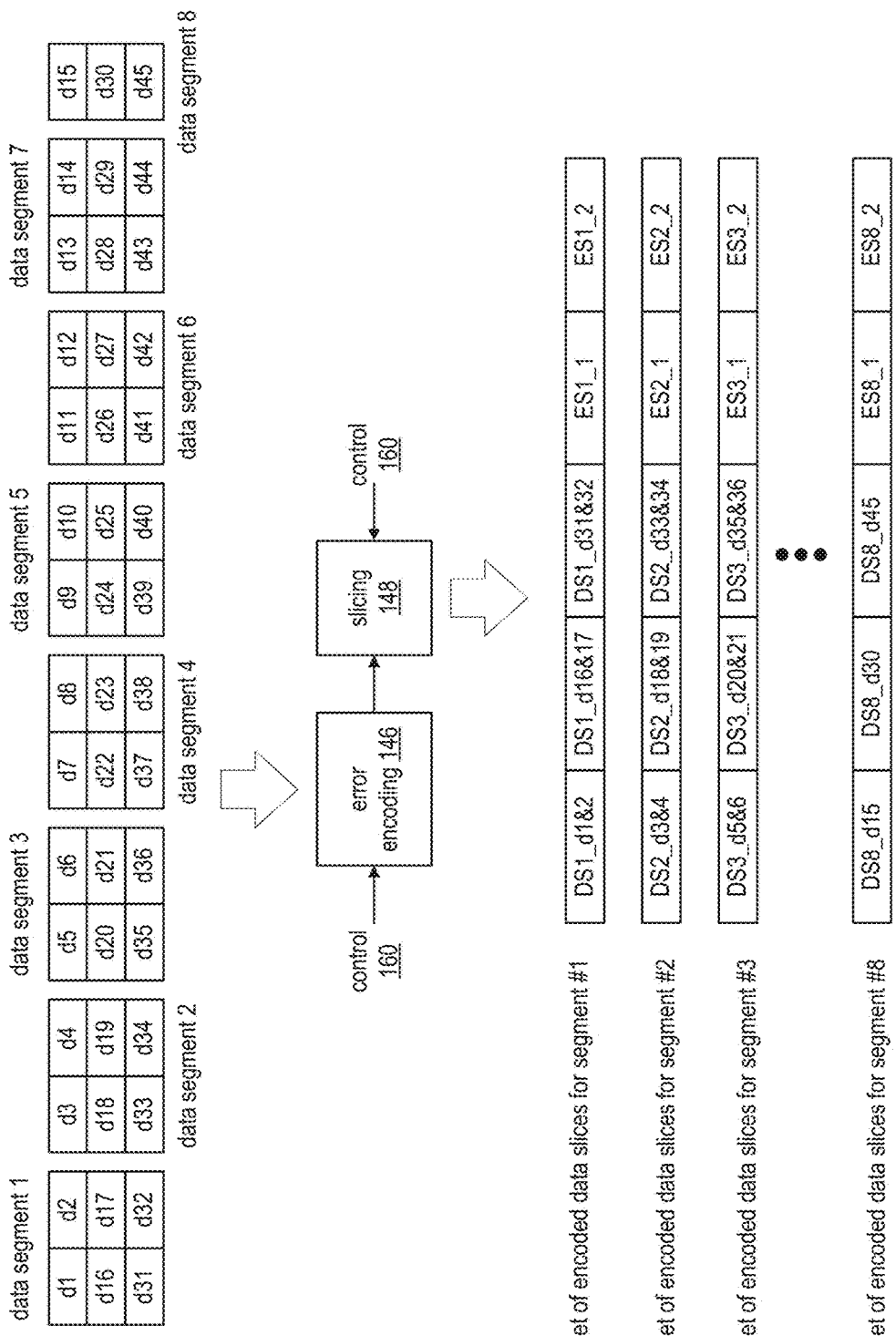
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
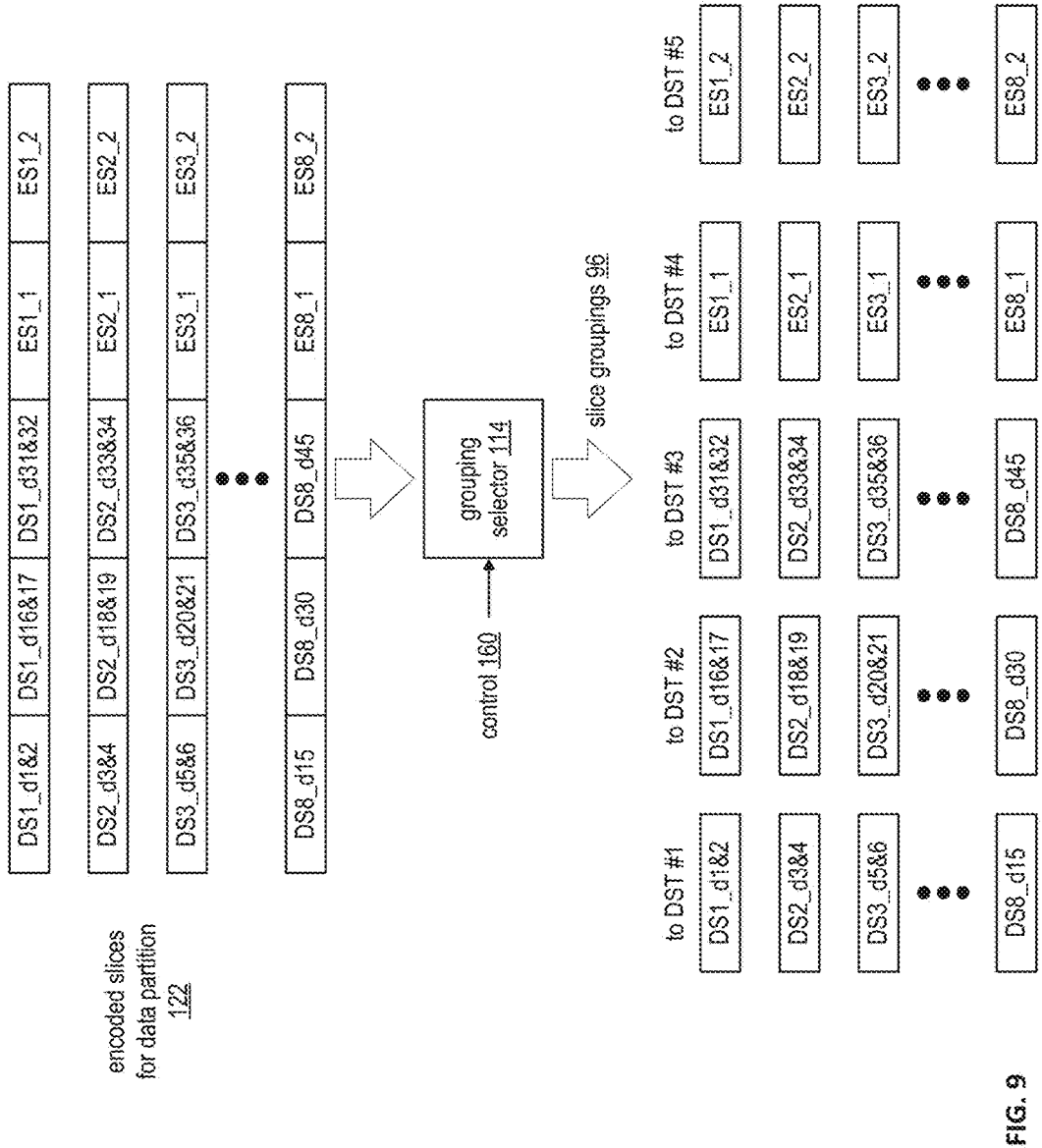
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with grouping selector information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
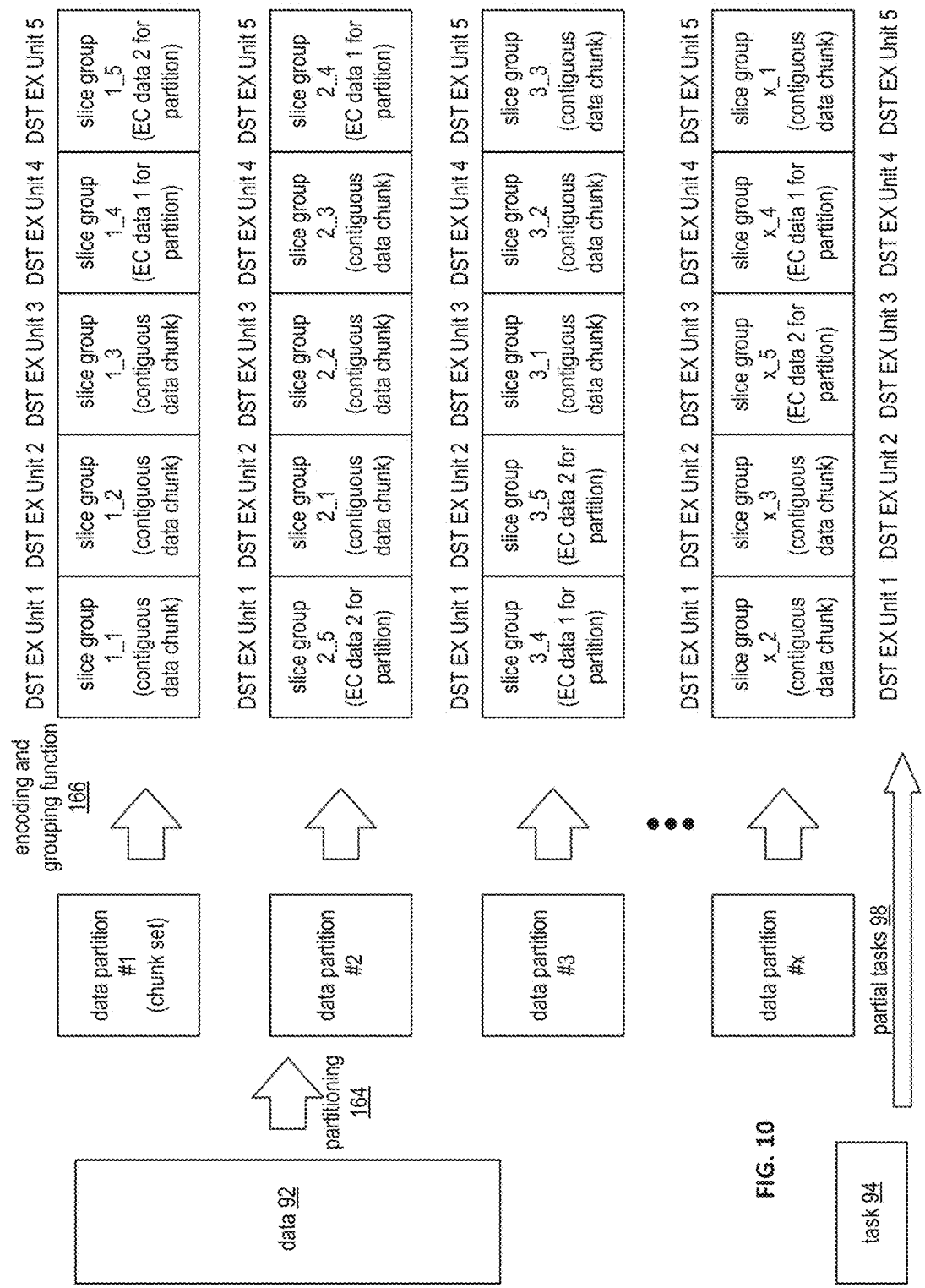
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
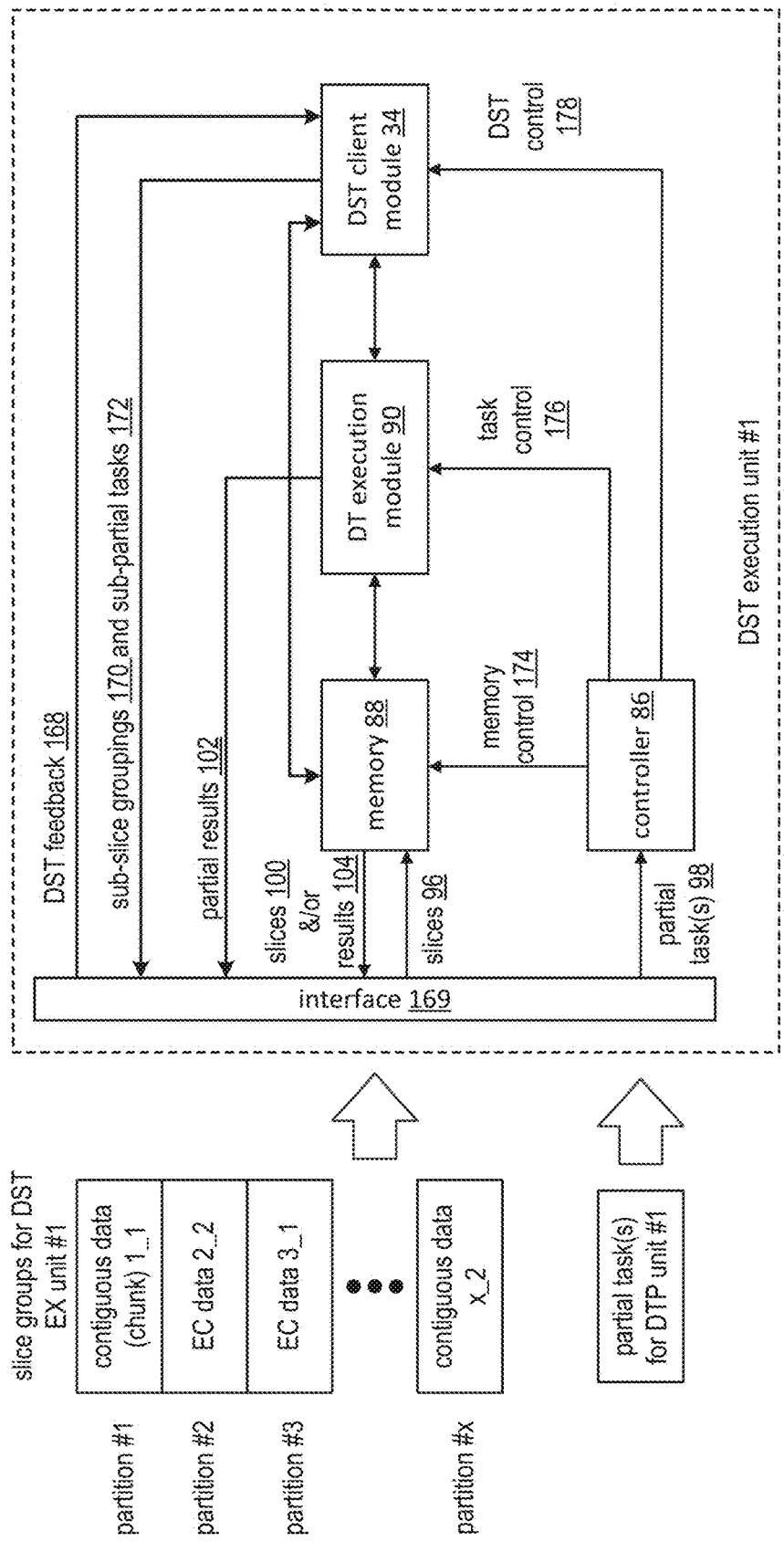
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions. The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
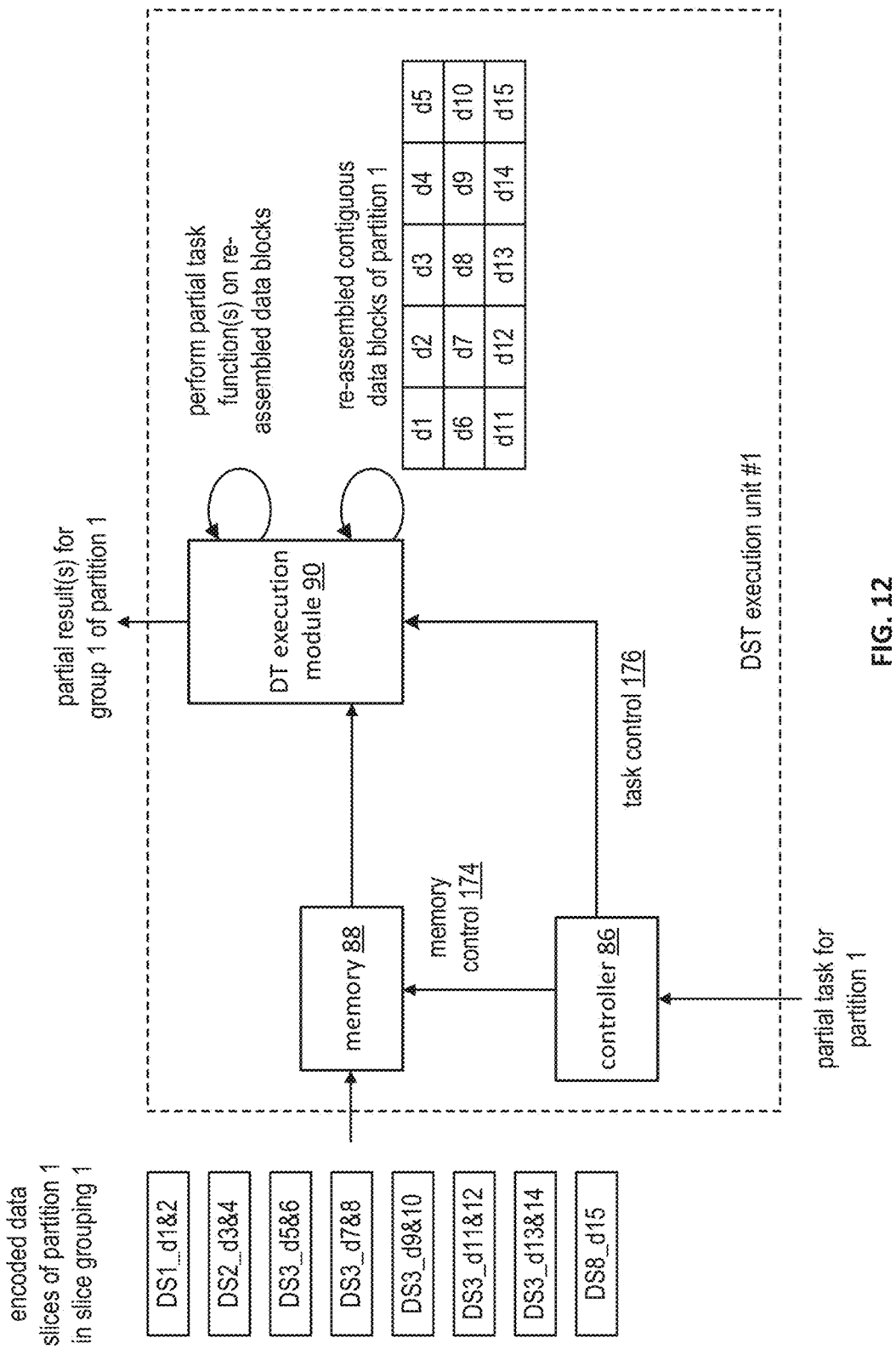
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
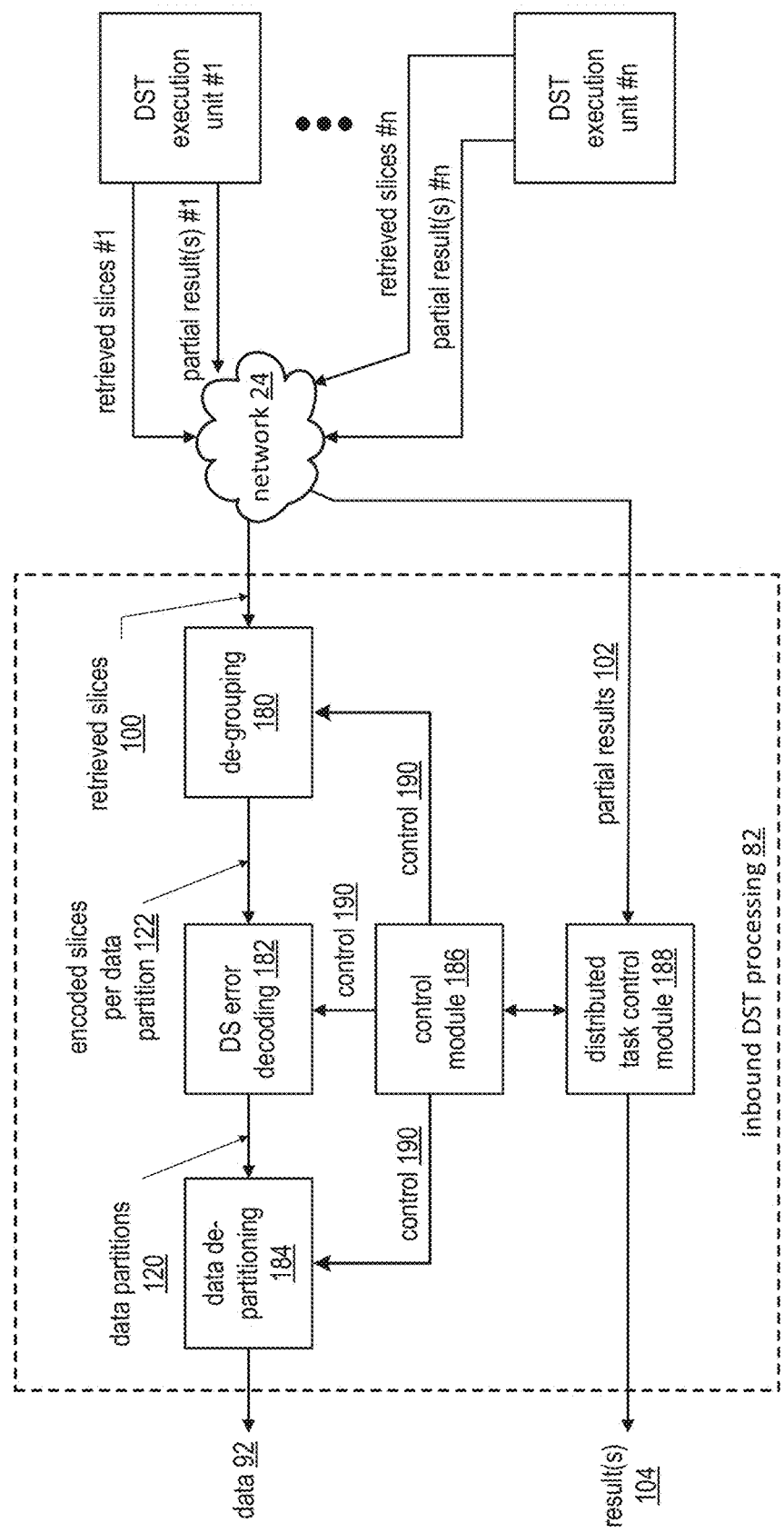
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
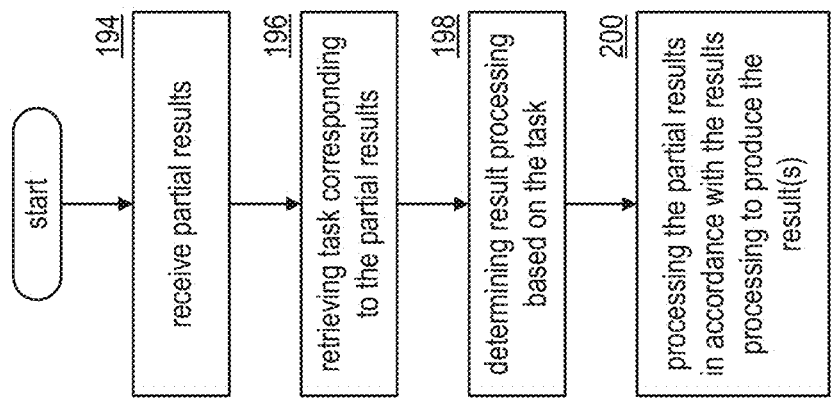
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
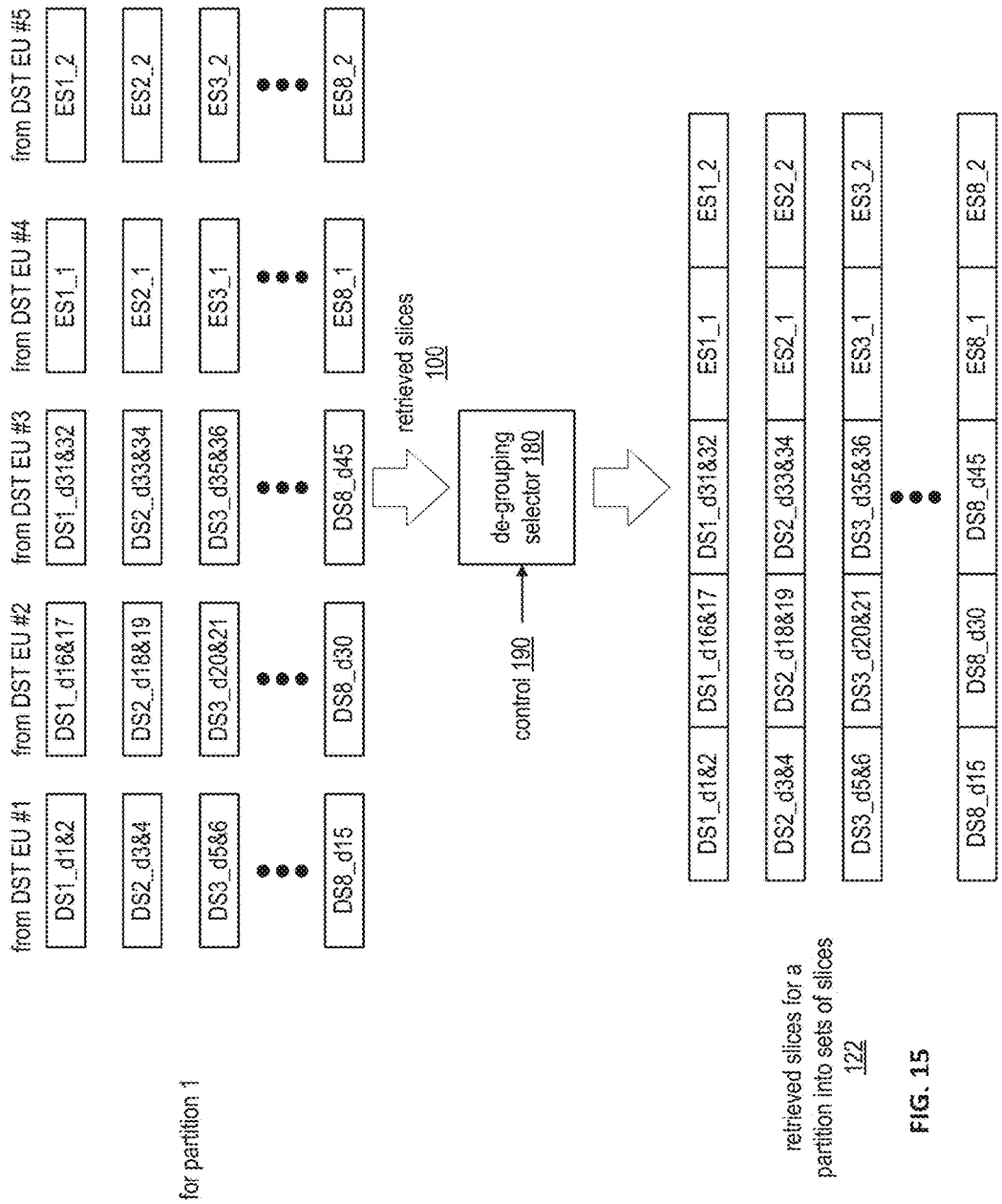
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
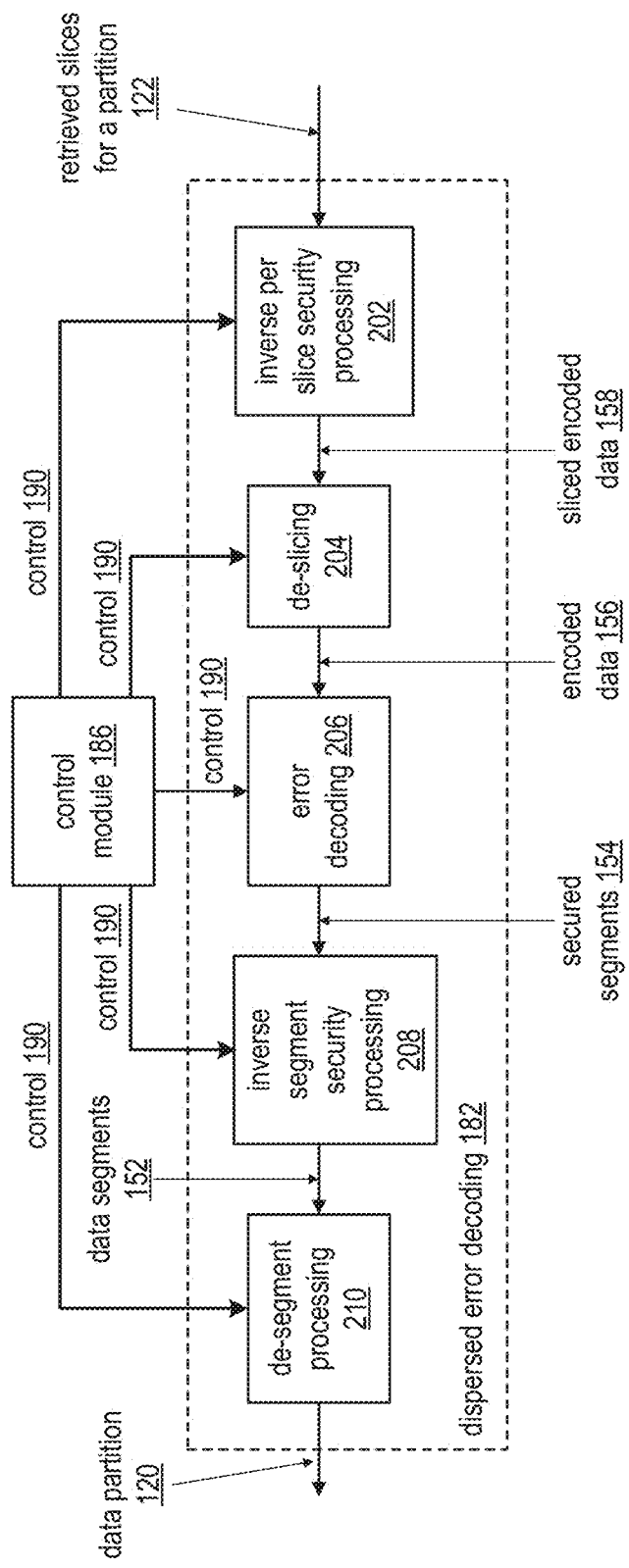
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
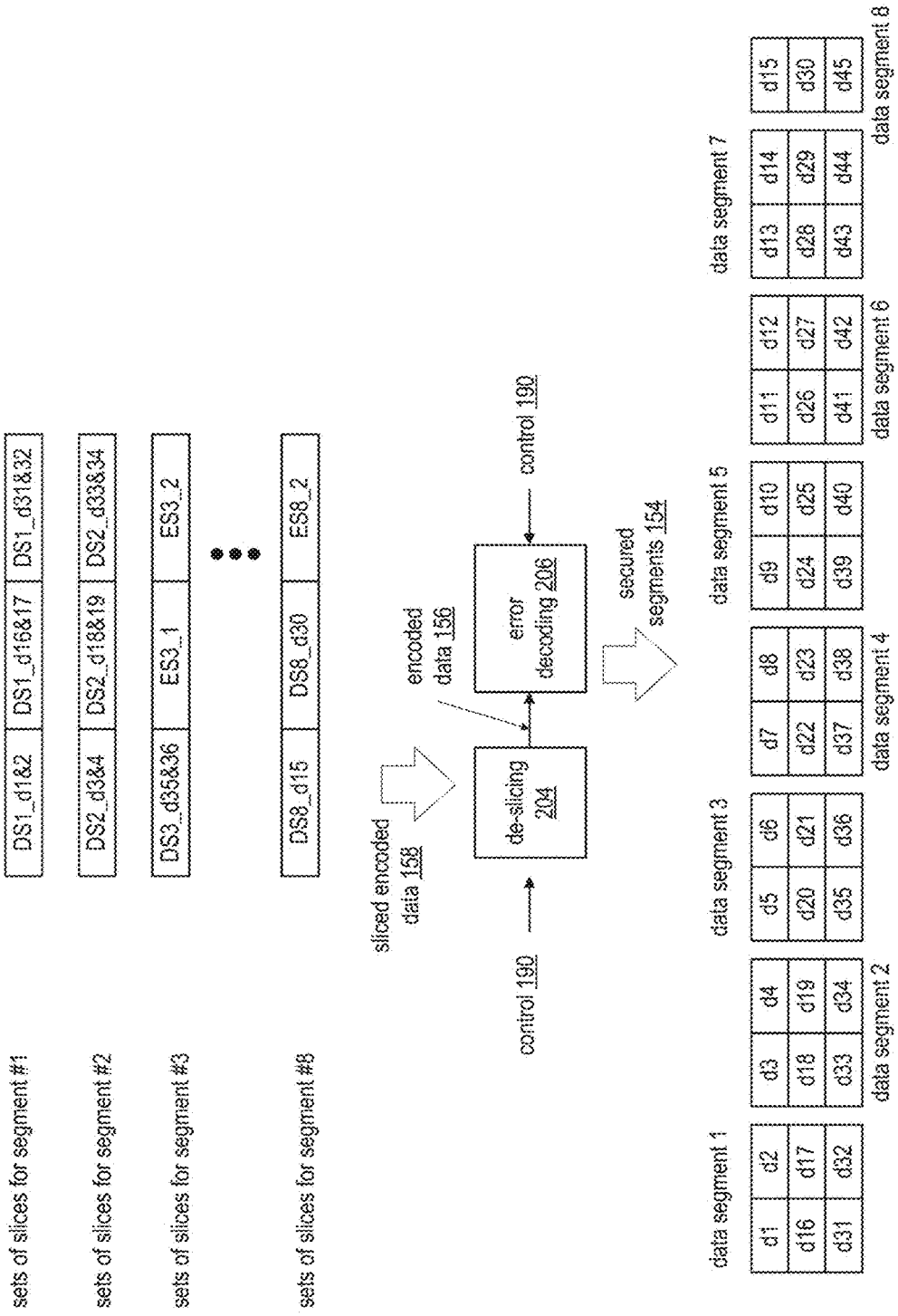
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
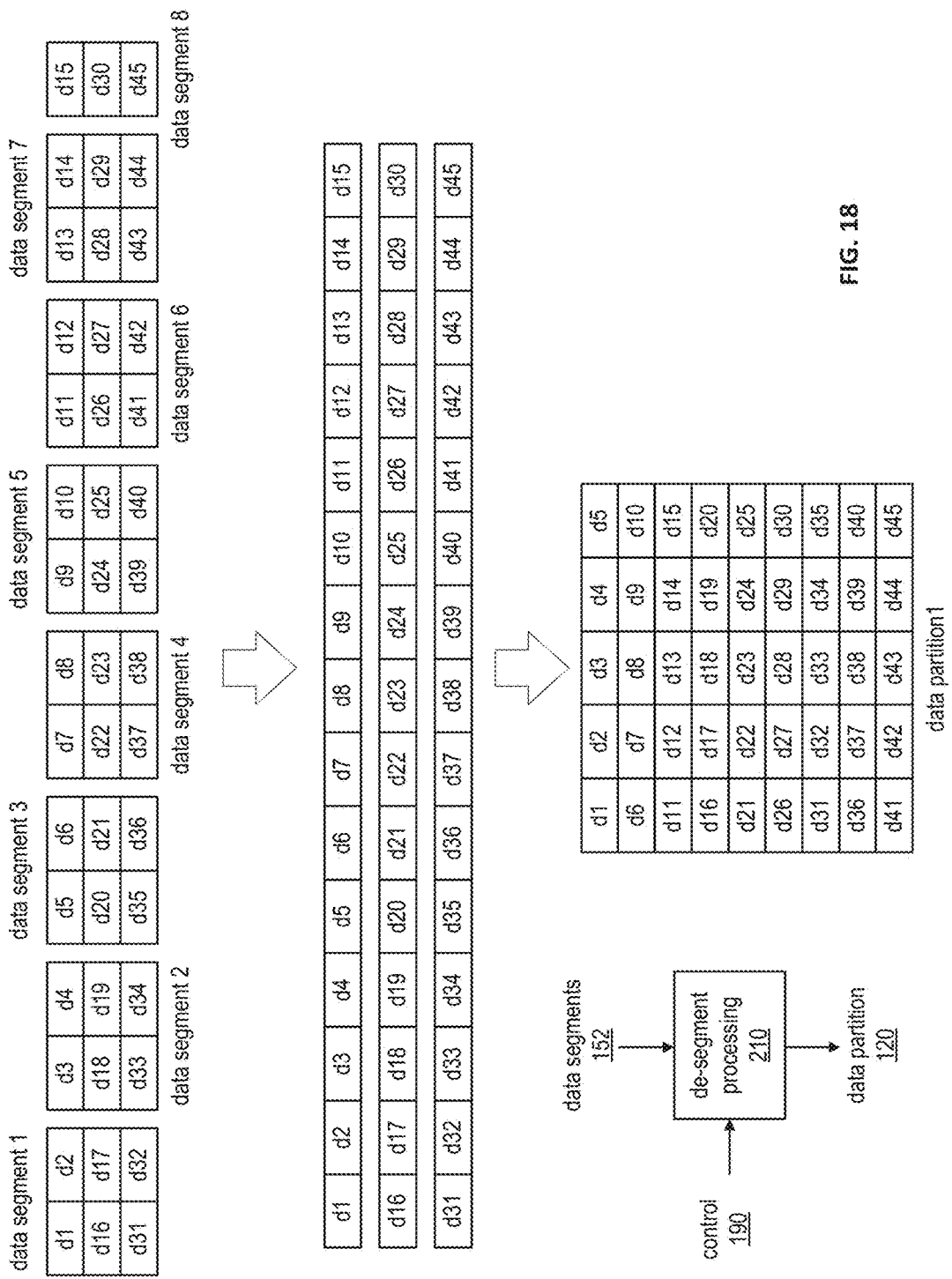
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
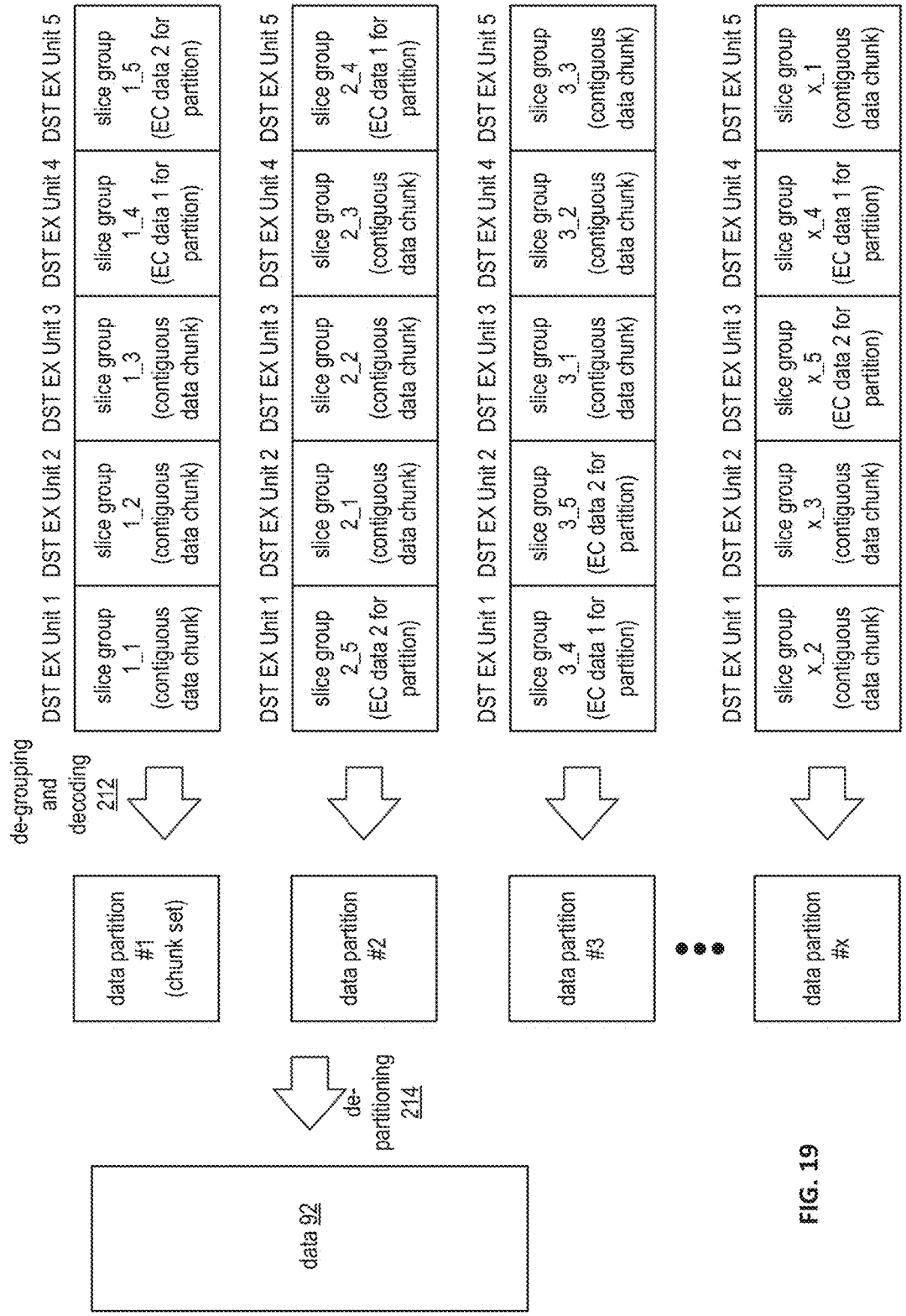
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
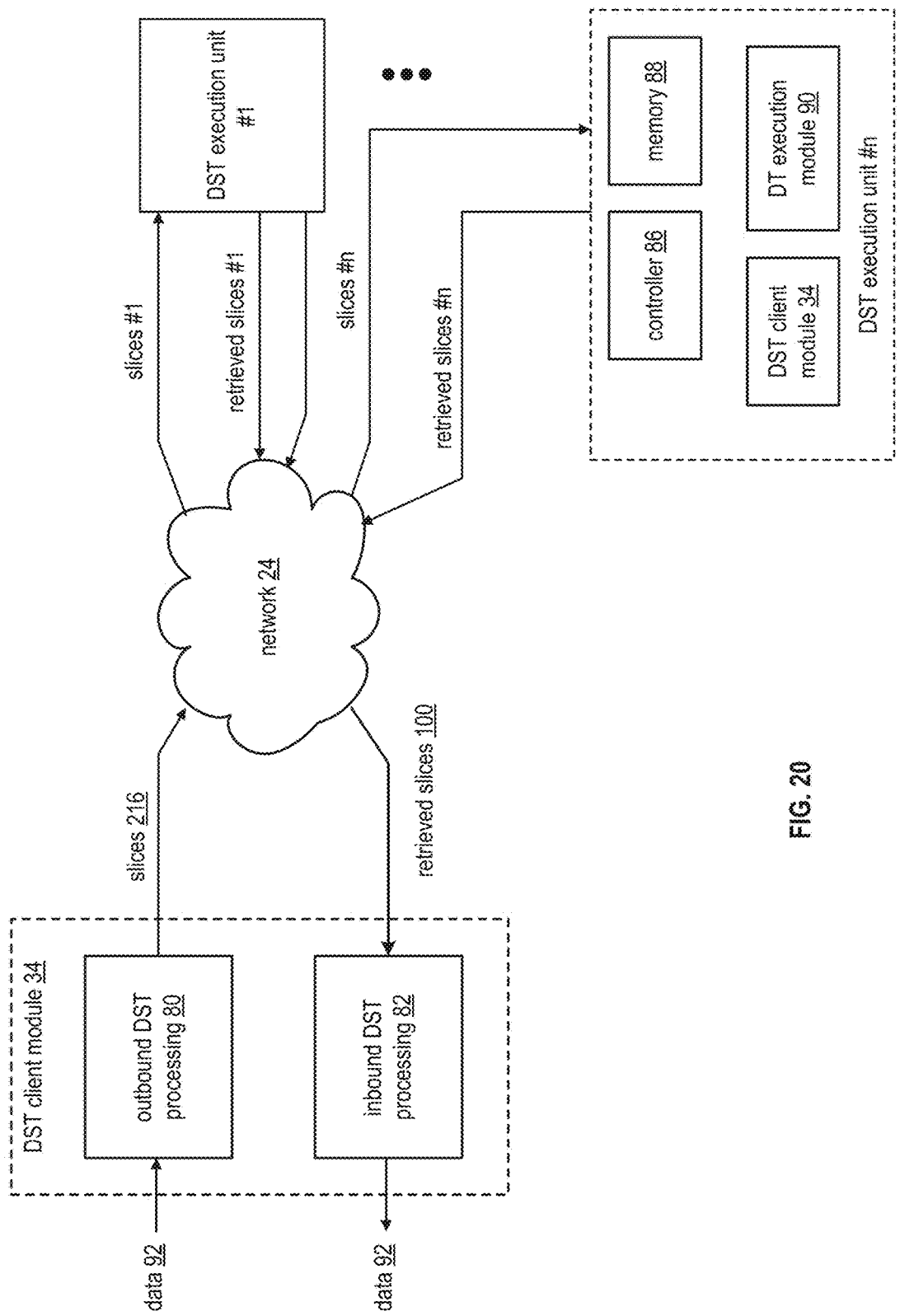
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
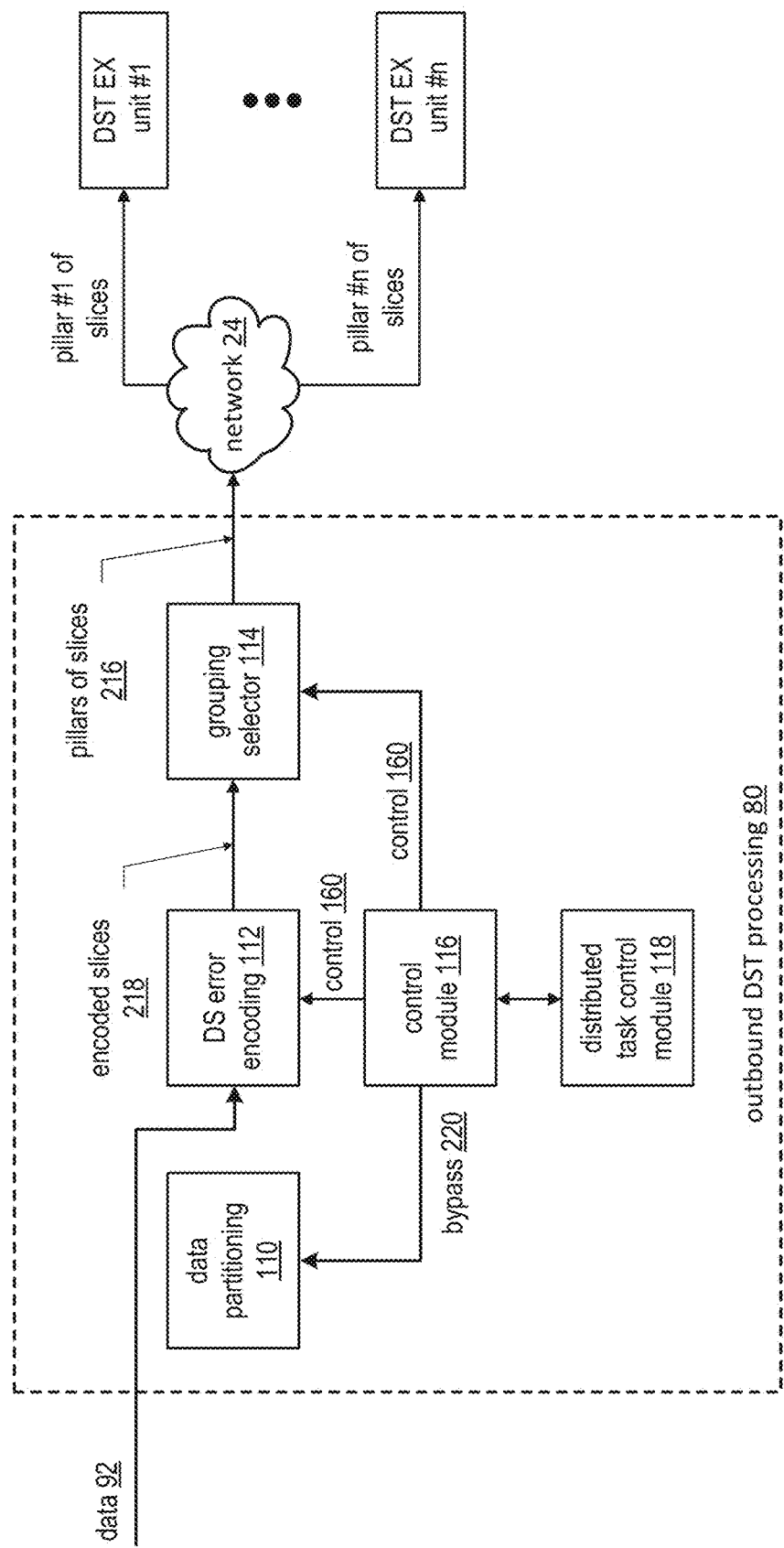
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
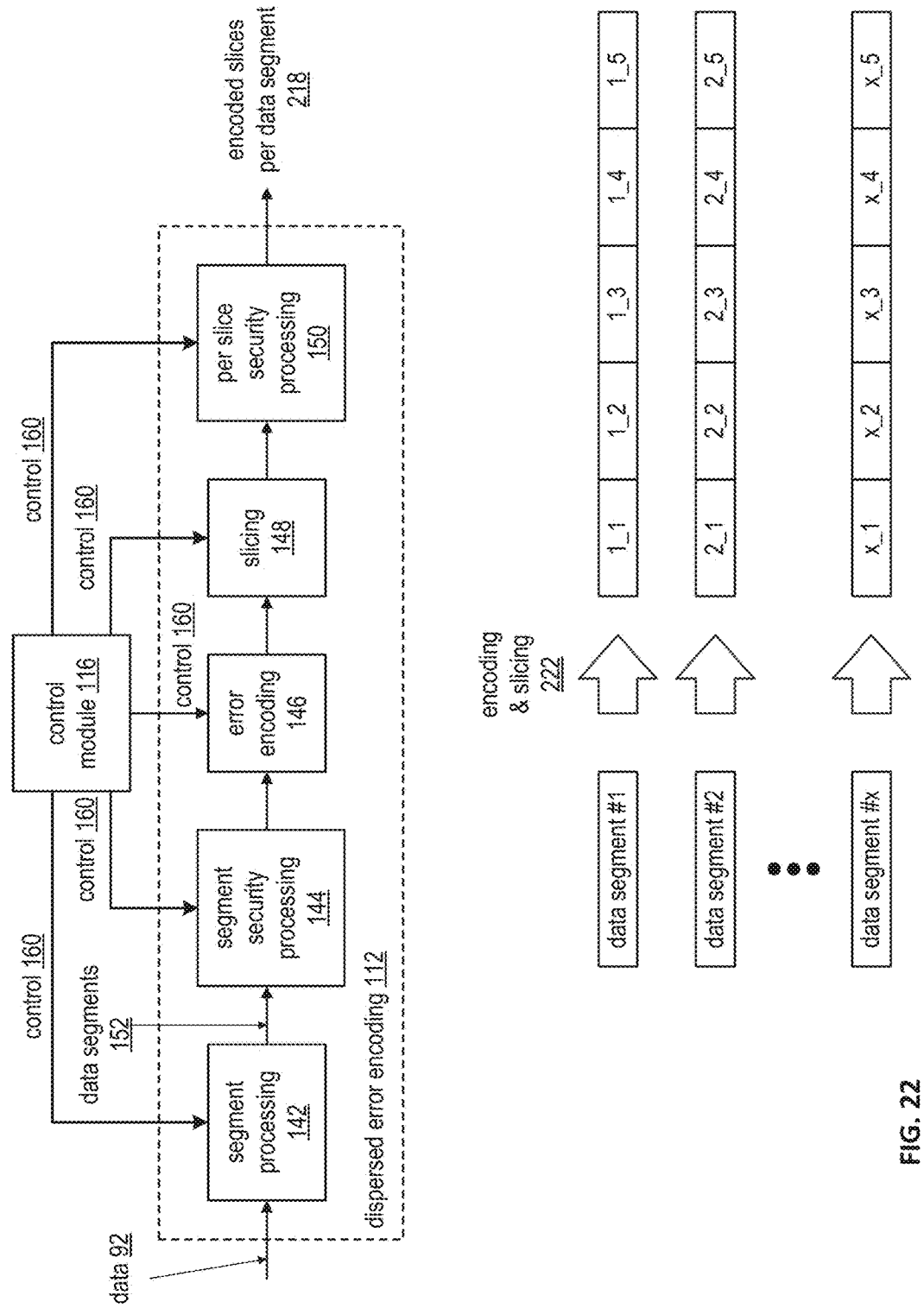
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
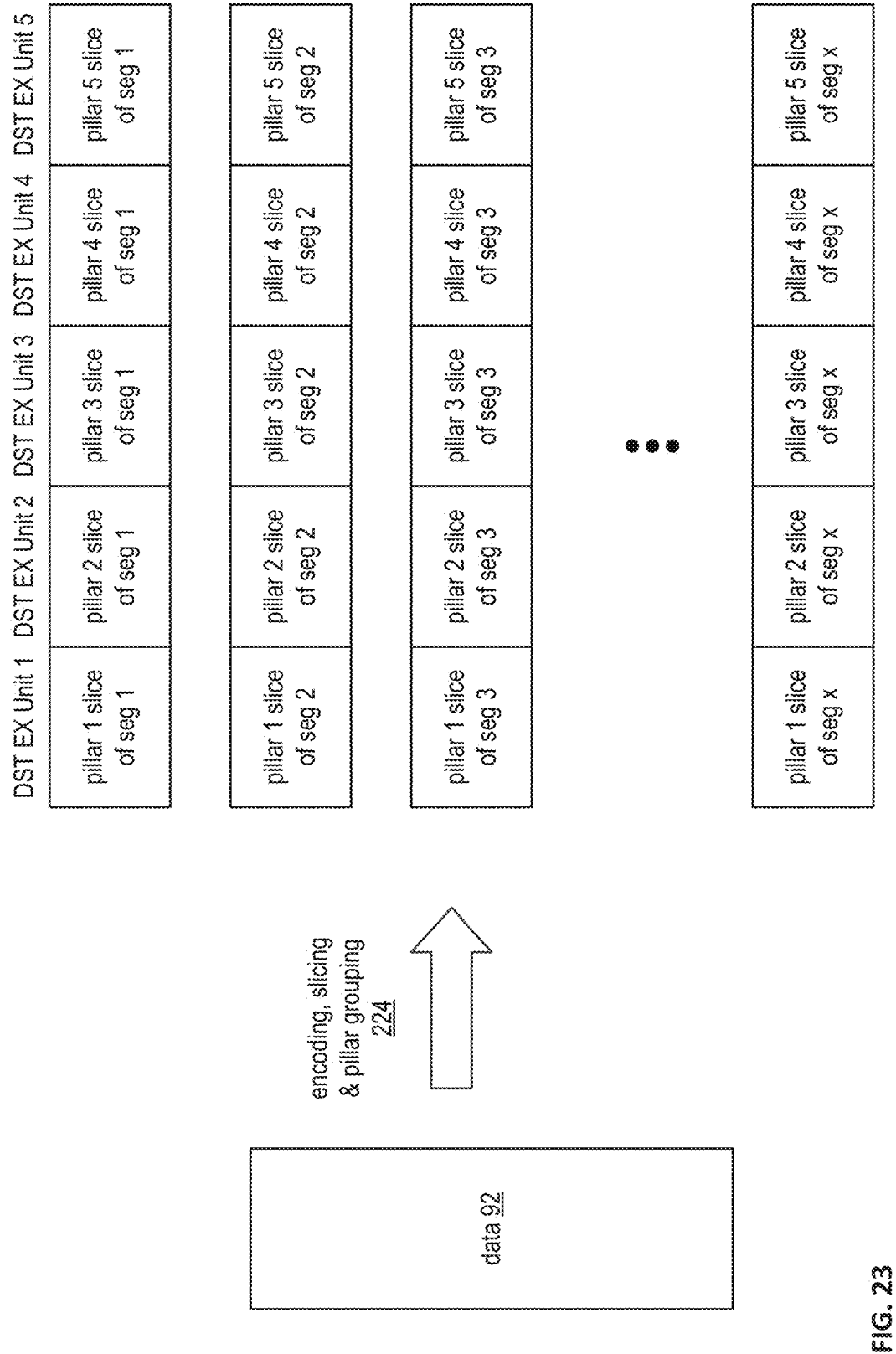
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
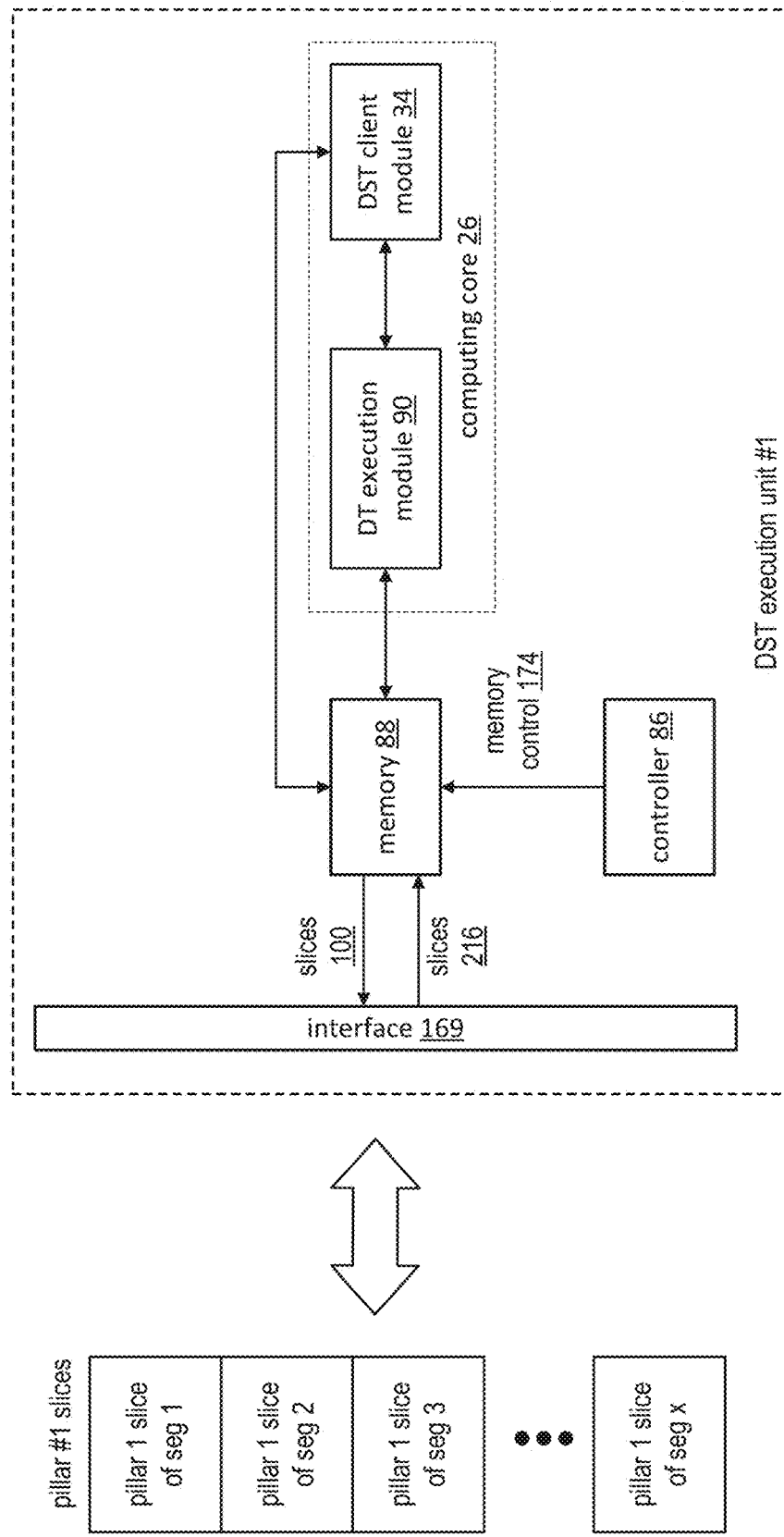
FIG. 24 is a diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
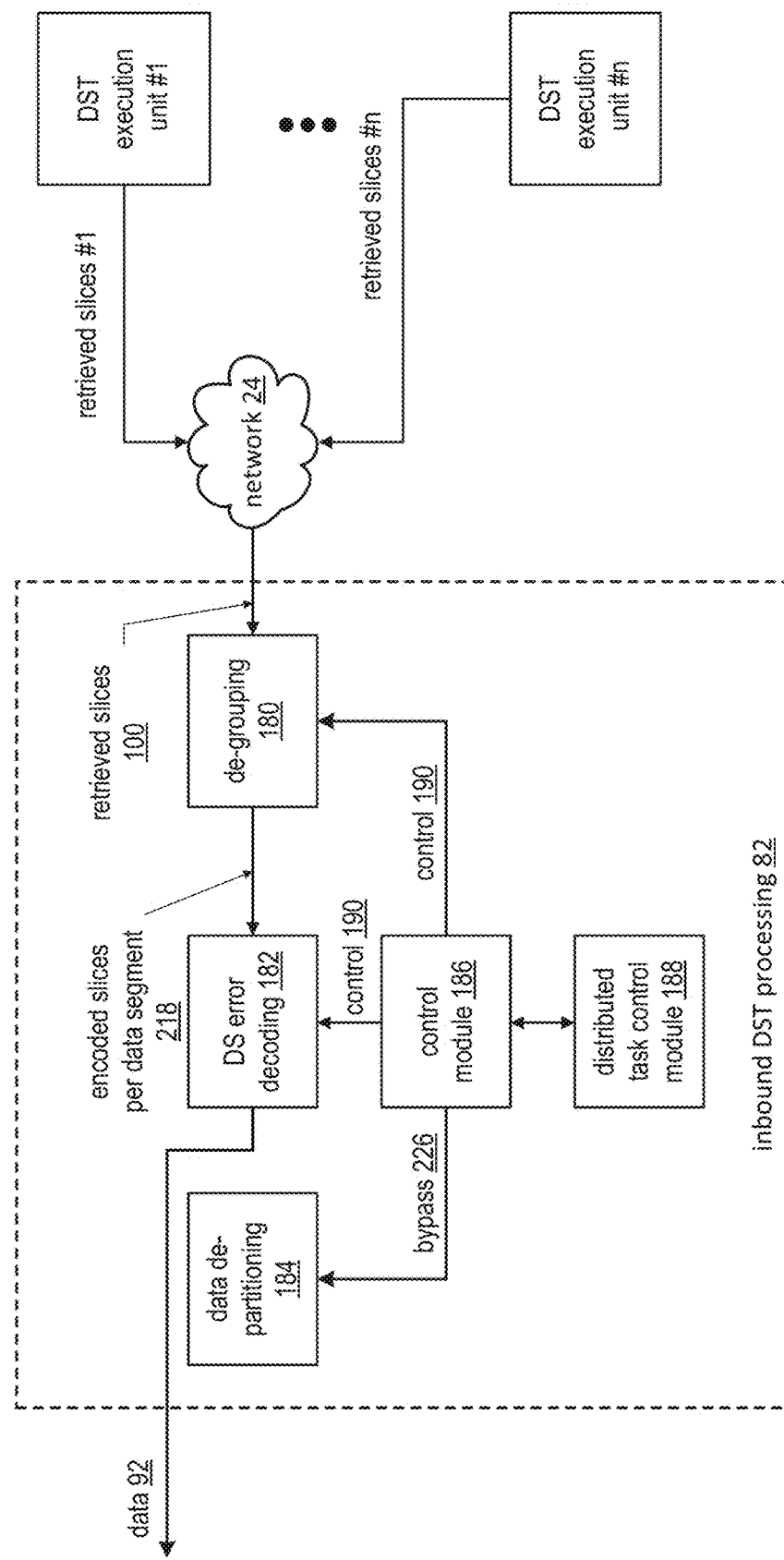
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
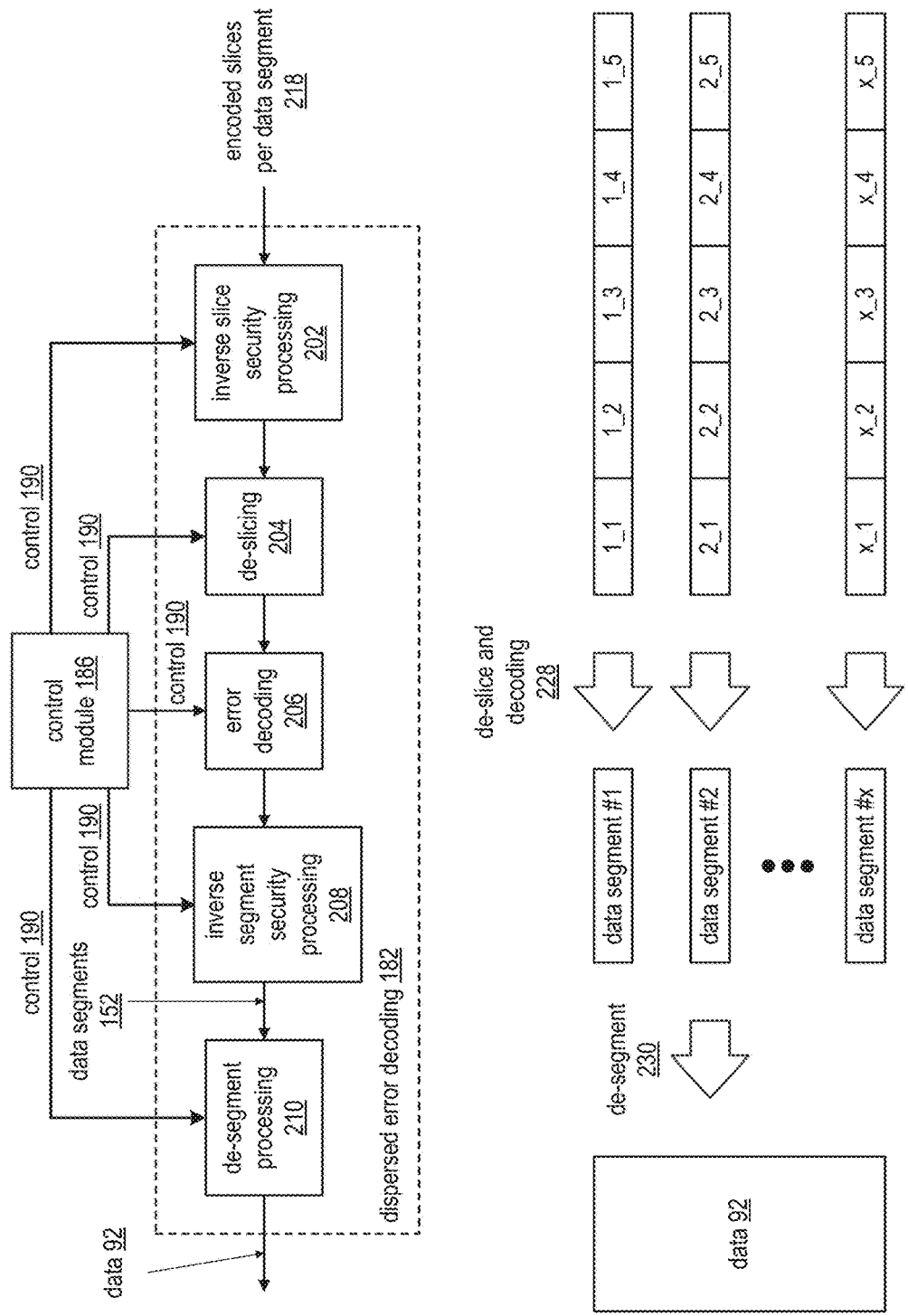
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
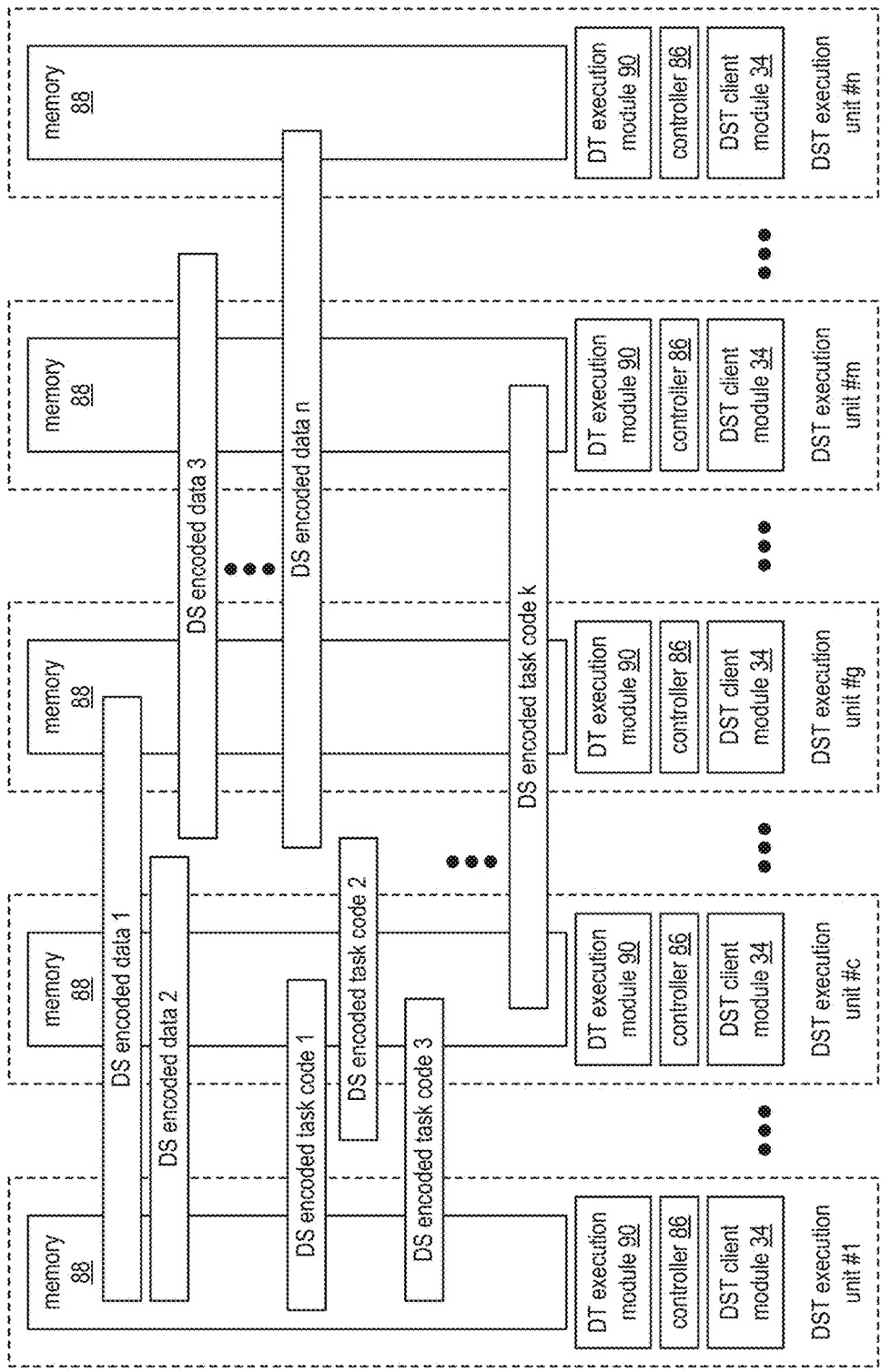
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
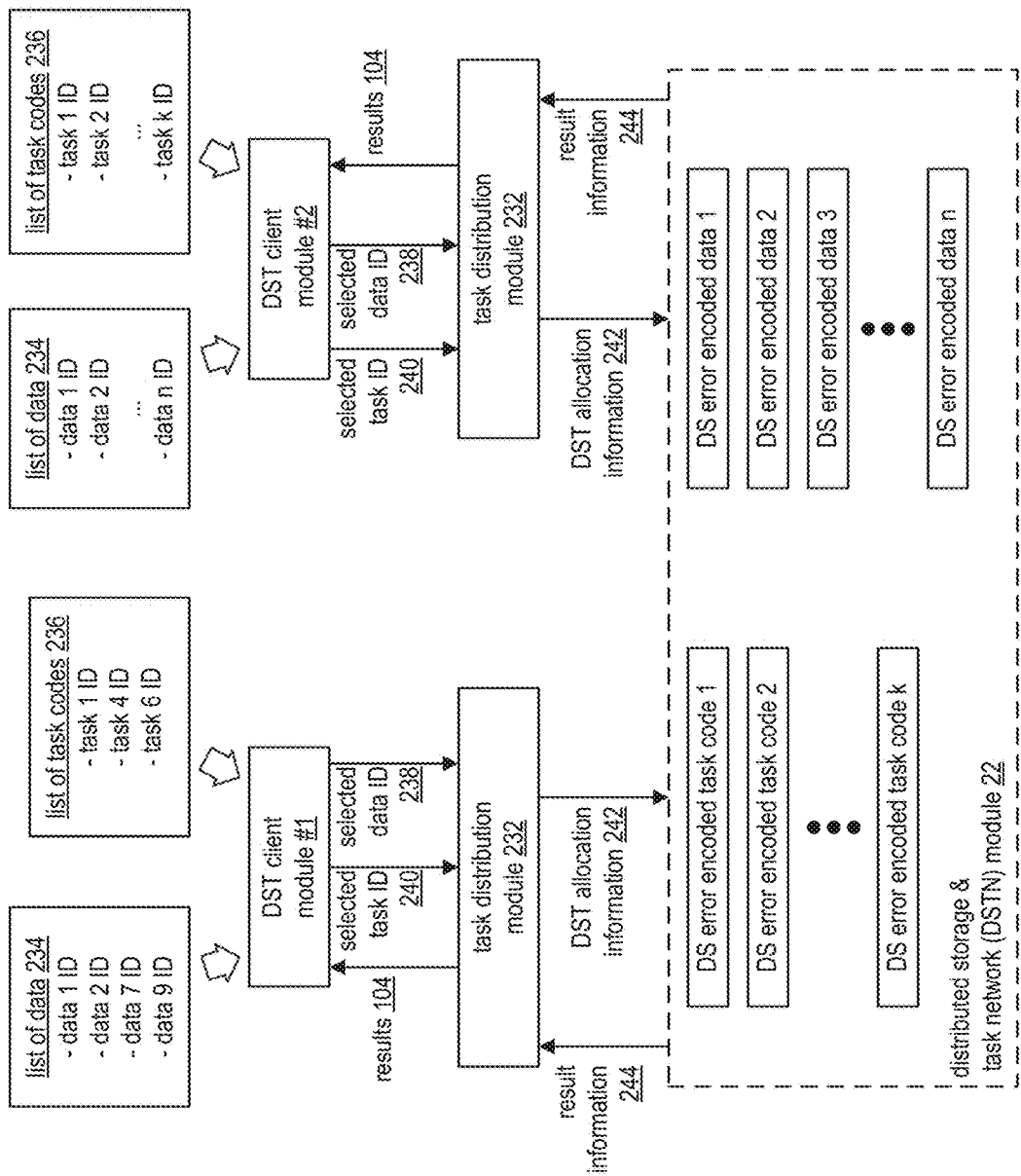
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
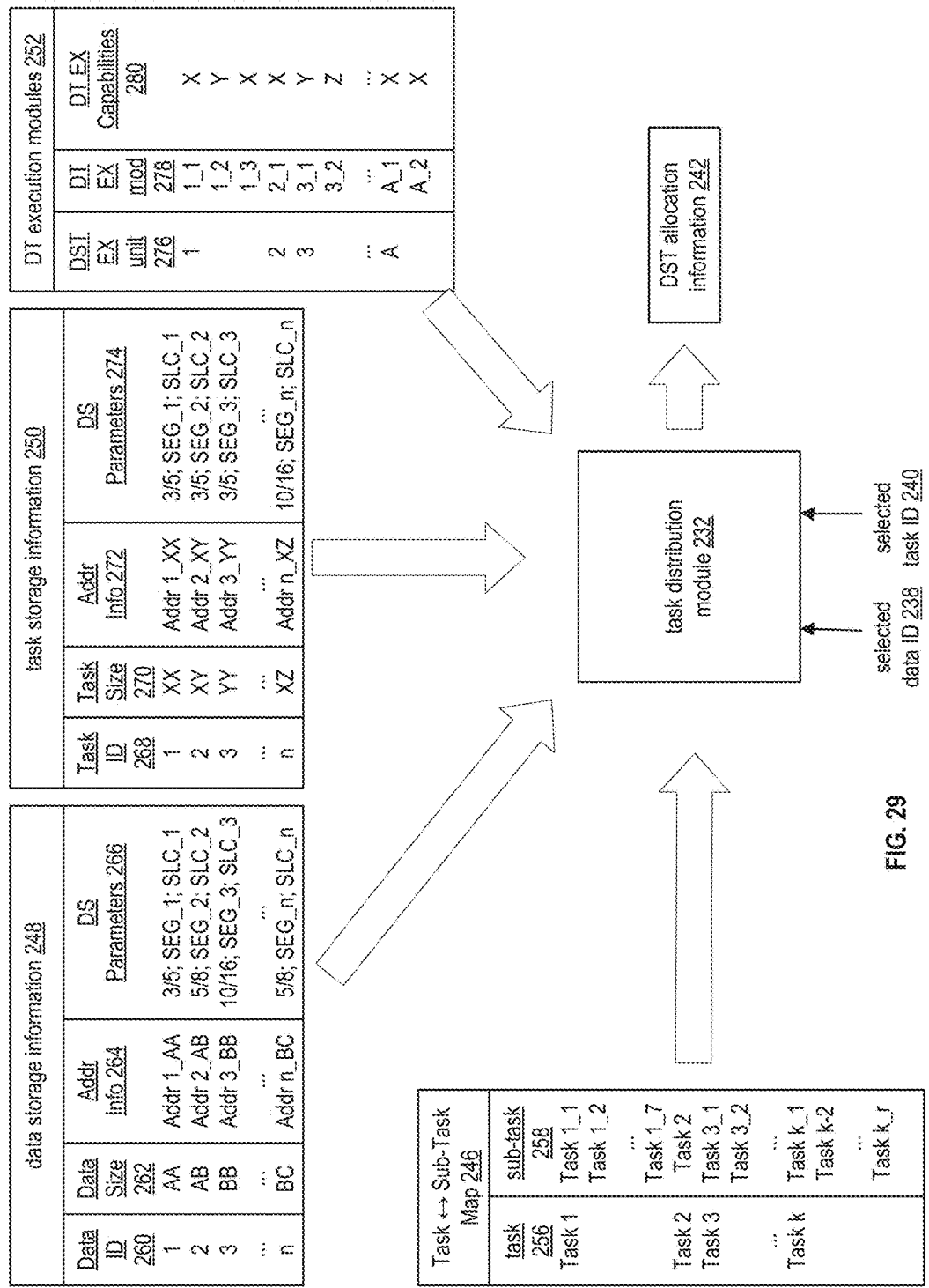
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
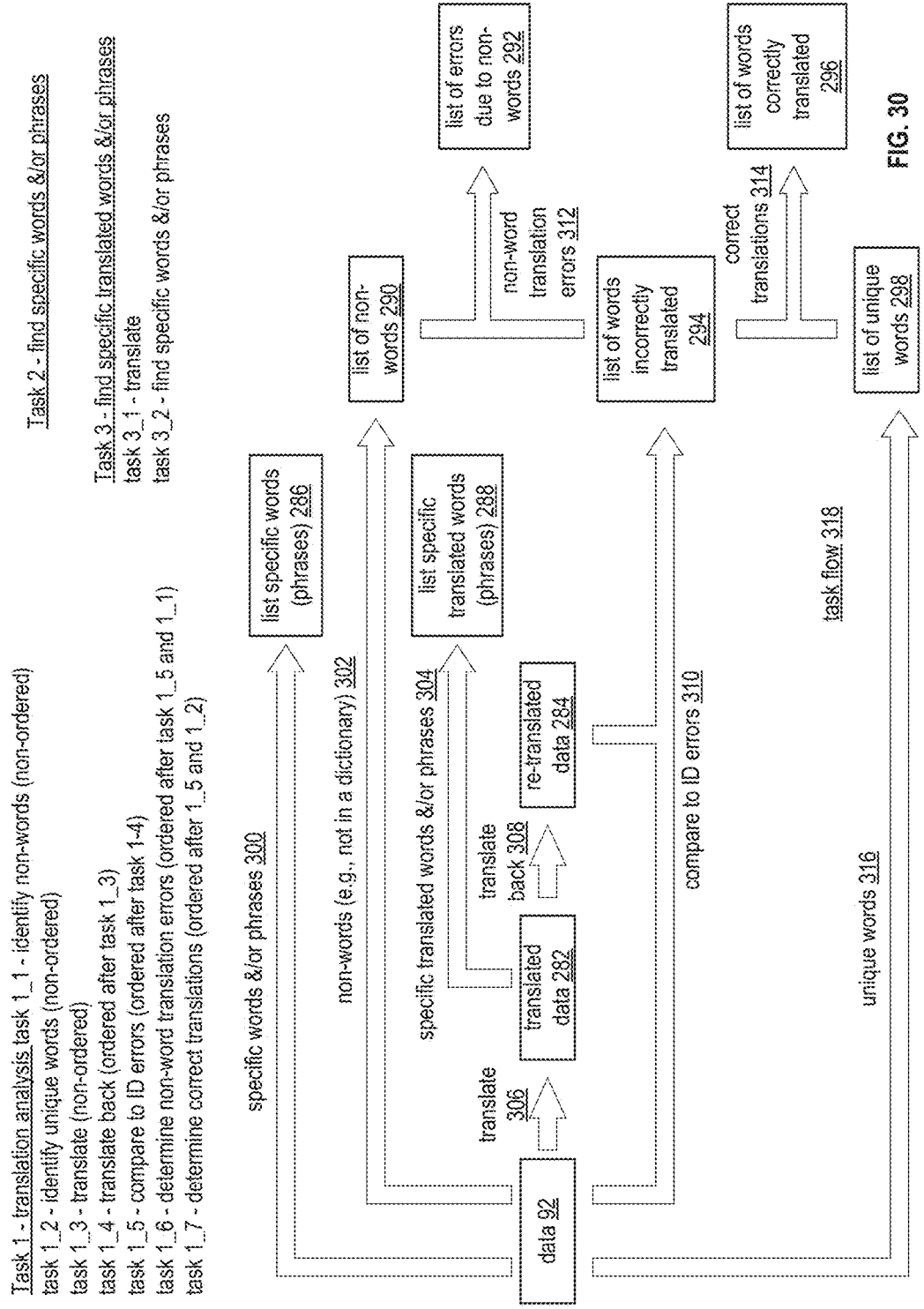
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
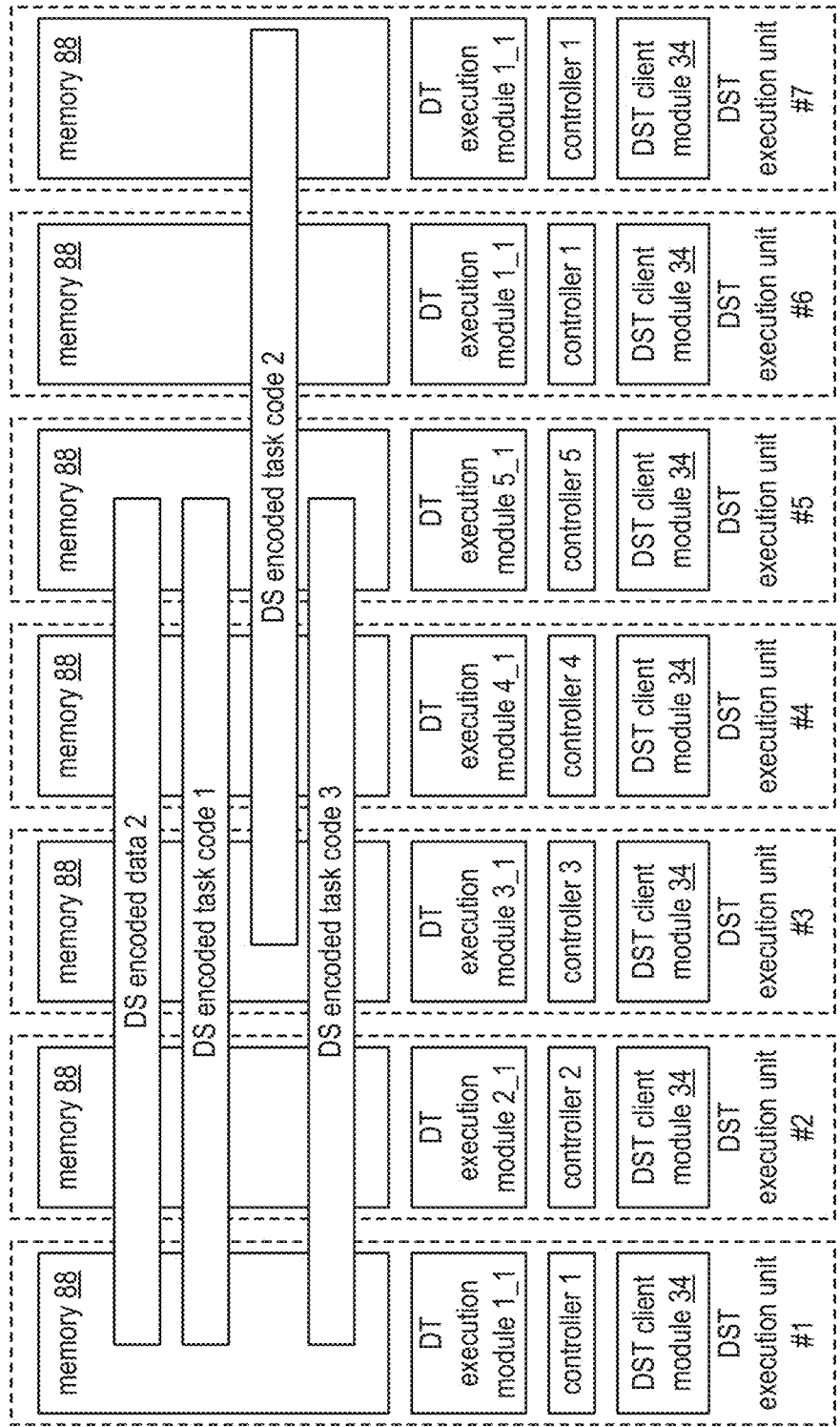
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1st through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
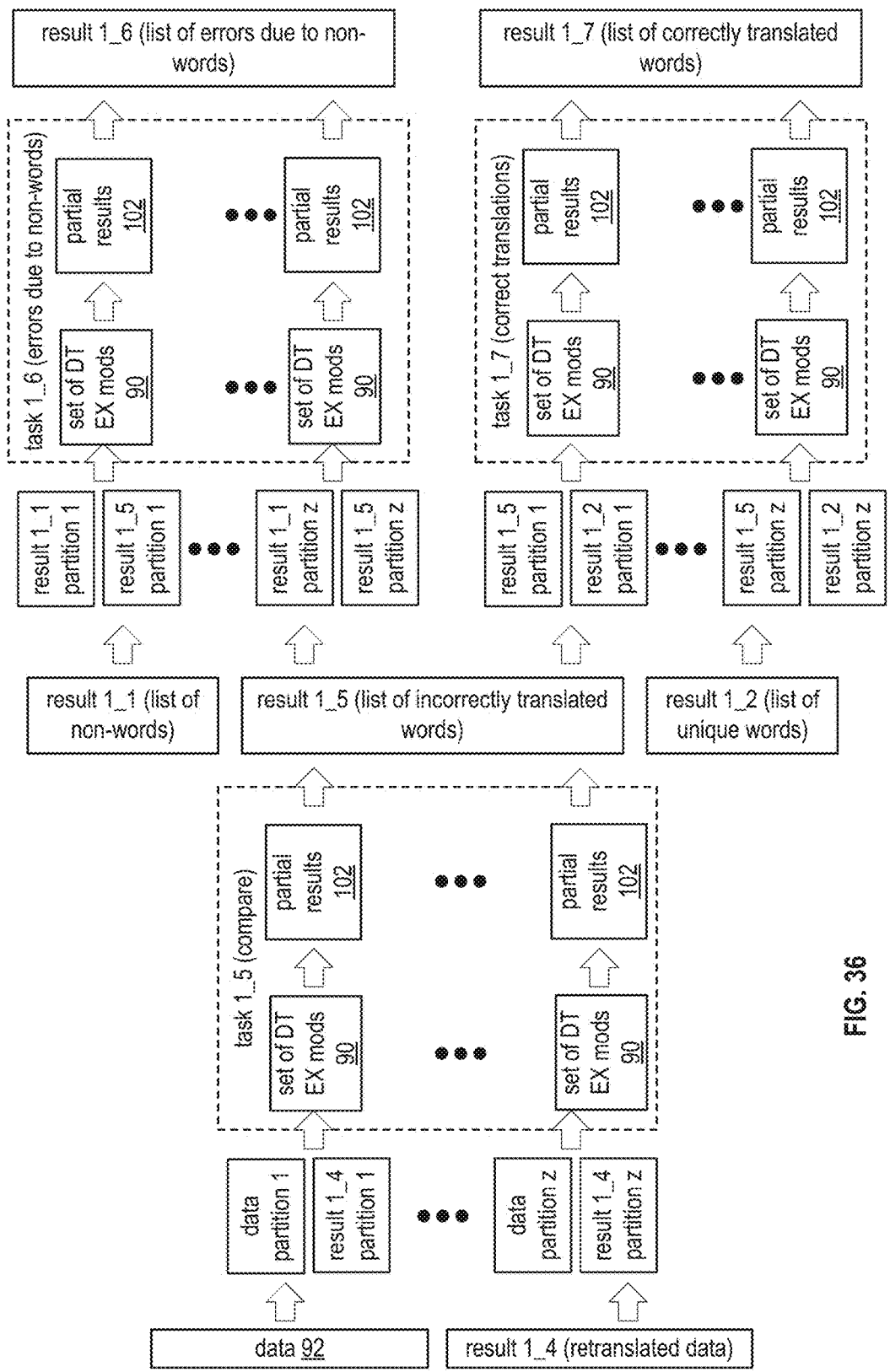

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2).

To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40B:
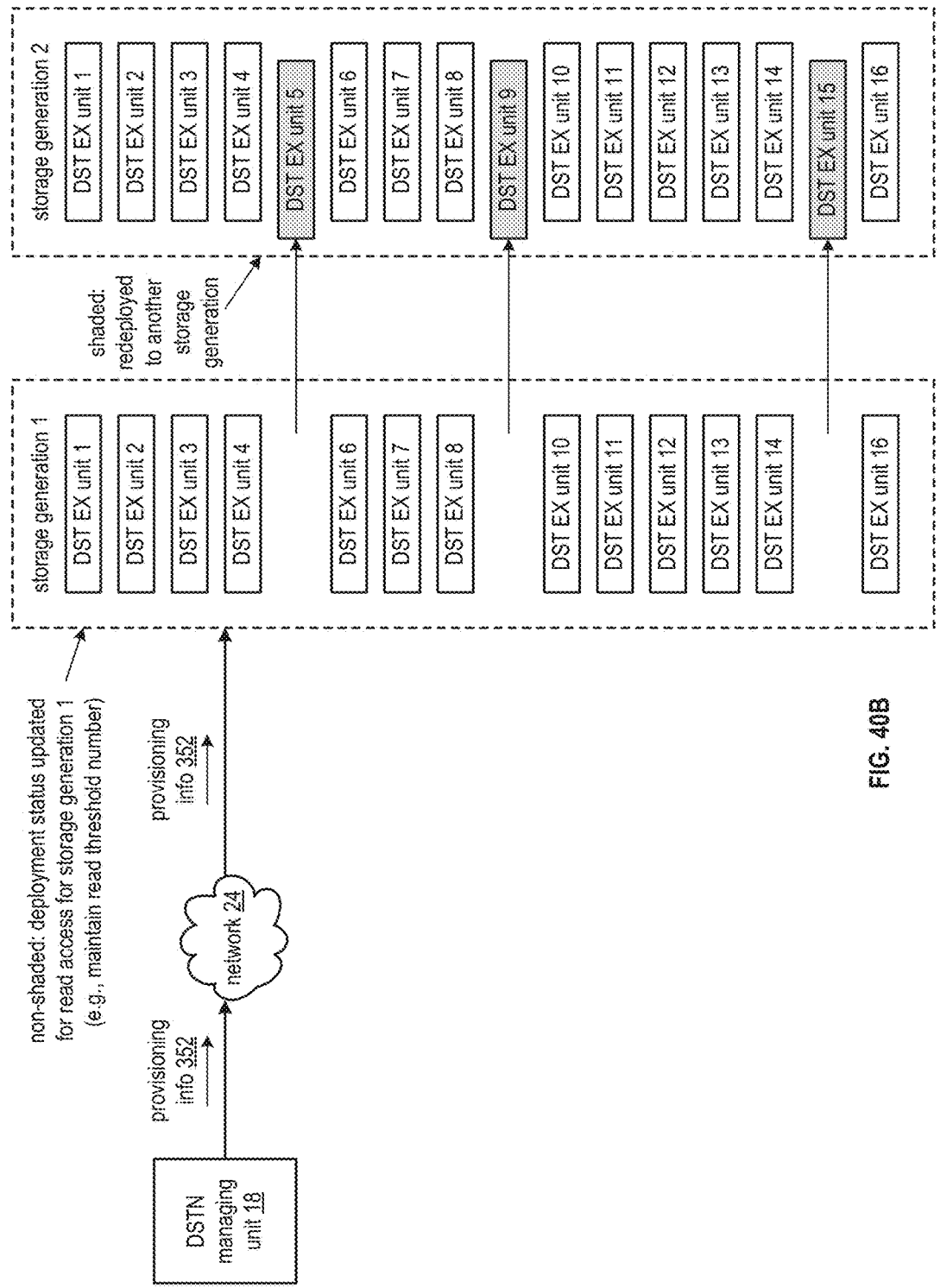

FIGS. 40A and 40B are a schematic block diagram of an embodiment of a dispersed storage network (DSN) that includes the distributed storage and task network (DSTN) managing unit 18 of FIG. 1, the network 24 of FIG. 1, and one or more storage generations (e.g., storage generation 1, and an additional storage generation 2 as depicted in FIG. 40B). Each storage generation includes a set of distributed storage and task (DST) execution (EX) units in accordance with dispersal parameters of a dispersed storage error coding function, where data is dispersed storage error encoded utilizing the dispersed storage error coding function to produce one or more sets of encoded data slices. Hereafter, each DST execution unit may be interchangeably referred to as a storage unit and the set of DST execution units may be interchangeably referred to as a set of storage units.

The dispersal parameters includes one or more of an information dispersal algorithm (IDA) width (e.g., hereafter interchangeably referred to as a pillar width or width), an encoding matrix of the IDA, a write threshold number, a read threshold number, and a decode threshold number, where a decode threshold number of encoded data slices of each of the one or more sets of encoded data slices is required to recover the data. For example, the set of DST execution units of the storage generation 1 includes DST execution units 1-16 when the IDA width is 16.

The DSN functions to maintain storage of the data and adjust a number of dispersed storage execution units based on a phase of the maintaining of the storage. Phases of the maintaining of the storage includes one or more of a write-only phase (e.g., serializing data for storage without pausing to read stored data), a write and read phase (e.g., continuing to write new data and reading the stored data), a primarily read phase with some writing (e.g., performing updates to the store data, reading the stored data), and a read only phase (e.g., when a corresponding storage generation is full or when it is undesirable to write more data for any other reason).

The data may be maintained as stored data in the storage generation by performing a rebuilding function when detecting one or more storage errors (e.g., detecting a missing desired encoded data slice, detecting a corrupted desired encoded data slice). The rebuilding function maintains a rebuilding maintenance number of encoded data slices for each of the sets of encoded data slices in accordance with one or more of a predetermination, interpreting system registry information, determining based on a desired level of data retrieval reliability, and receiving an input via the DST managing unit 18. The rebuilding maintenance number includes at least the decode threshold number of encoded data slices and at most the pillar width number of encoded data slices for each set of encoded data slices. For example, the DSTN managing unit 18 maintains the rebuilding maintenance number of encoded data slices as the write threshold number in accordance with the system registry information.

The DSTN managing unit 18 may establish the dispersal parameters based on one or more of a level of desired data retrieval reliability and a level of desired write availability in accordance with the phase of the maintaining of the storage of the data. When requiring at least a write threshold number of available DST execution units to successfully complete writing of new data, an actual write availability level is based on a difference between the IDA width and the write threshold number, where with a given IDA width, a lower write threshold number yields a more favorable write availability level. When issuing at least a read threshold number of read slice requests to the storage generation to recover the stored data, an actual data retrieval reliability level is based on a difference between the rebuilding maintenance number and the decode threshold number, where the rebuilding maintenance number may be established as the same number of guaranteed slices for the writing of the new data (e.g., the write threshold number). As such, a compromise between data retrieval reliability and write availability must be achieved when the phase of the maintaining of the storage of the data includes any of the phases associated with both writing new data and retrieving stored data. However, such a compromise may not be required when the phase of the maintaining of the storage of the data only includes the reading of the stored data. For example, the rebuilding maintenance number may be lowered when the phase of the maintaining of the storage of the data only includes the reading of the stored data.

FIG. 40A illustrates steps of an example of operation of the adjusting of the number of dispersed storage units where the DSTN managing unit 18 receives, via the network 24, utilization information 350 from at least some of the DST execution units of the storage generation 1. The utilization information 350 includes a memory utilization level (e.g., a percentage utilized of available storage capacity). Having received the utilization information 350, the DSTN managing unit 18 determines that the set of storage units of the DSN will be substantially used for read operations of dispersed storage error encoded data (e.g., after being deployed to storage generation 1 for full access including writing and reading). As a specific example, the DSTN managing unit 18 determines that the memory utilization (e.g., level) of the set of storage units exceeds a utilization threshold (e.g., utilization at 91% when the utilization threshold is 90%). As another specific example, the DSTN managing unit 18 receives, via an interface of the DSTN managing unit, a read only command regarding the set of storage units (e.g., receives the read only command from a manager). As yet another specific example, the DSTN managing unit 18 determines a number of read operations for the set of storage units is a multiple of a number of write operations for the set of storage units (e.g., the primarily read phase with some writing of the maintaining of the storage).

FIG. 40B illustrates further steps of the example of operation of the adjusting of the number of dispersed storage units where, for the set of storage units, the DSTN managing unit 18 determines a number of storage units to remove from the set of storage units based on a difference between the pillar width number regarding encoding of the dispersed storage error encoded data and the read threshold number regarding reading the dispersed storage error encoded data. The DSTN managing unit 18 may utilize an initially assigned read threshold number (e.g., 13) as the read threshold number or may select a new read threshold number as the read threshold number (e.g., utilize an initially assigned read threshold of 14). For example, the DSTN managing unit 18 determines to remove three storage units from the set of storage units when the pillar width number is 16 and the read threshold number is 13.

Having determined the number of storage units to remove, the DSTN managing unit 18 removes the number of storage units from the set of storage units. The removing includes selecting storage units of the number of storage units for removal. The removing further includes at least one of decommissioning a storage unit of the number of storage units and redeploying another storage unit of the number of storage units to another set of storage units. As a specific example, the DSTN managing unit 18 selects the three DST execution units 5, 9, and 15 for redeployment to the storage generation 2 when the DST execution units 5, 9, and 15 are associated with favorable performance (e.g., historical access latency below a maximum access latency threshold level, a historical access bandwidth capability above a minimum bandwidth capability threshold level) and sends provisioning information 352 to the DST execution units 5, 9, and 15, where the provisioning information 352 includes redeployment instructions. As another specific example, the DSTN managing unit 18 selects another three DST execution units for decommissioning when the selected other three DST execution units are associated with unfavorable performance (e.g., historical access latency above a maximum access latency threshold level, a historical access bandwidth capability below a minimum bandwidth capability threshold level) and sends other provisioning information 352 to the other three DST execution units, where the other provisioning information 352 includes decommissioning instructions.

In another example of operation of the adjusting of the number of dispersed storage units, for the set of storage units, the DSTN managing unit 18 determines an actual reliability that indicates a level of reliability in retrieving a decode threshold number of encoded data slices per read request of a plurality of read requests. For example, the DSTN managing unit 18 establishes the actual reliability as a ratio between an original pillar width number and the decode threshold number (e.g., a larger original pillar width number corresponds to a more favorable actual reliability). As another example, the DSTN managing unit 18 establishes the actual reliability as ratio between an effective pillar width number (e.g., the rebuilding maintenance number such as the write threshold number) and the decode threshold number.

Having determined the actual reliability, the DSTN managing unit 18 compares the actual reliability to a desired reliability of the set of storage units, where the desired reliability indicates a desired level of reliability in retrieving the decode threshold number of encoded data slices per read request of the plurality of read requests (e.g., the desired level of reliability and retrieving may be associated with a number lower than all of the pillar width number, a write threshold number, and the rebuilding maintenance number). For example, the DSTN managing unit 18 compares the actual reliability to the desired reliability of the set of storage units associated with the read threshold number of 13.

When the actual reliability exceeds the desired reliability by a reconfiguration threshold, the DSTN managing unit 18 removes one or more storage units from the set of storage units. The removing of the one or more storage units may include maintaining the decode threshold number and updating one or more of: the pillar width number, the write threshold number, the read threshold number, while adjusting rebuilding parameters (e.g., lowering the rebuilding maintenance number) for the dispersed storage error encoded data. For example, the DSTN managing unit 18 maintains the decode threshold number at 10, lowers the IDA width to 13, lowers the write threshold number to 13, and maintains the read threshold number at 13 while adjusting the rebuilding maintenance number to 13 such that 13 slices per set of encoded data slices are maintained.

As a specific example of the removing of the one or more storage units, the DSTN managing unit 18 determines that the one or more storage units has an unacceptable failure rate and when the one or more storage units has an unacceptable failure rate, the DSTN managing unit 18 decommissions the one or more storage units. As another specific example, the DSTN managing unit 18 redeploys the one or more storage units to another set of storage units. As yet another specific example, the DSTN managing unit 18 determines a reliability rate for each of the storage units in the set of storage units, identifies one of the storage units as having a reliability rate below a low reliability threshold and decommissions the one of the storage units, identifies a second one of the storage units as having a reliability rate above a high reliability threshold and redeploys the second one of the storage units (e.g., a split removing operation). As a still further example, the DSTN managing unit 18 establishes the desired reliability as a ratio between the read threshold number and the decode threshold number and determines a number of storage units of the storage units to remove based on a difference between the read threshold number and the original pillar width number or a difference between the read threshold number and the effective pillar width number (e.g., the rebuilding maintenance number).

Figure 40C:
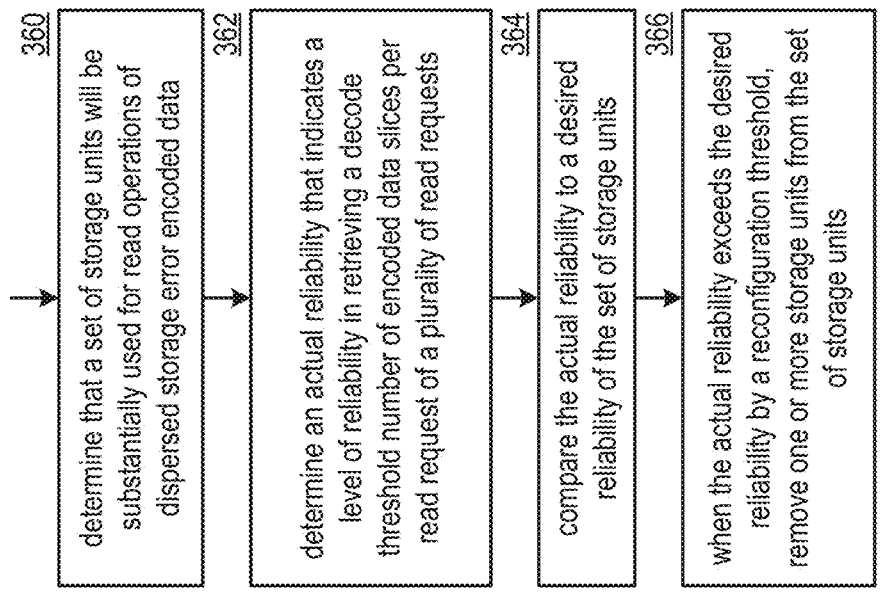
FIG. 40C is a flowchart illustrating an example of adjusting a number of dispersed storage units in a dispersed storage network (DSN) in accordance with the present invention.

FIG. 40C is a flowchart illustrating an example of adjusting a number of dispersed storage units in a dispersed storage network (DSN). In particular, a method is presented for use in conjunction with one or more functions and features described in conjunction with FIGS. 1-39, 40A-B, and also FIG. 40C. The method begins at step 360 where a processing module of a computing device of one or more computing devices (e.g., of the DSTN managing unit 18 of FIG. 40A) of a dispersed storage network (DSN) determines that a set of storage units of the DSN will be substantially used for read operations of dispersed storage error encoded data. For example, the processing module determines that memory utilization of the set of storage units exceeds a utilization threshold (e.g., substantially full). As another example, the processing module receives a read only command regarding the set of storage units. As yet another example, the processing module determines that a number of read operations for the set of storage units is a multiple of a number of write operations for the set of storage units (e.g., substantially a read-only phase).

For the set of storage units, the method continues at step 362 where the processing module determines an actual reliability that indicates a level of reliability in retrieving a decode threshold number of encoded data slices per read request of a plurality of read requests. The determining includes one of establishing the actual reliability as a ratio between an original pillar width number and the decode threshold number and establishing the actual reliability as ratio between an effective pillar width number (e.g., a rebuilding maintenance number) and the decode threshold number.

The method continues at step 364 where the processing module compares the actual reliability to a desired reliability of the set of storage units, where the desired reliability indicates a desired level of reliability in retrieving the decode threshold number of encoded data slices per read request of the plurality of read requests. When the actual reliability exceeds the desired reliability by a reconfiguration threshold, the method continues at step 366 where the processing module removes one or more storage units from the set of storage units. For example, the removing includes one or more of maintaining the decode threshold number, adjusting rebuilding parameters (e.g., lowering the rebuilding maintenance number) for the dispersed storage error encoded data, and updating one or more of a pillar width number, a write threshold number, and a read threshold number.

As another example of the removing of the one or more storage units from the set of storage units, the processing module determines that the one or more storage units has an unacceptable failure rate and when the one or more storage units has an unacceptable failure rate, the processing module decommissions the one or more storage units. As yet another example, the processing module re-deploys the one or more storage units to another set of storage units. As a further example, the processing module determines a reliability rate for each of the storage units in the set of storage units, identifies one of the storage units as having a reliability rate below a low reliability threshold and decommissions the one of the storage units, and identifies a second one of the storage units as having a reliability rate above a high reliability threshold and redeploys the second one of the storage units. As a still further example, the processing module establishes the desired reliability as a ratio between a read threshold number and the decode threshold number and determines a number of storage units of the storage units to remove based on a difference between the read threshold number and the original pillar width number or a difference between the read threshold number and the effective pillar width number.

Alternatively, or in addition to, the method includes, when the processing module determines that the set of storage units of the DSN will be substantially used for read operations of dispersed storage error encoded data, the processing module, for the set of storage units, determining a number of storage units to remove from the set of storage units based on a difference between the pillar width number regarding encoding of the dispersed storage error encoded data and the read threshold number regarding reading the dispersed storage error encoded data. As a specific example, the processing module utilizes an initially assigned read threshold number as the read threshold number or selects a new read threshold number as the read threshold number. The removing of the number of storage units from the set of storage units includes at least one of the processing module decommissioning a storage unit of the number of storage units and the processing module redeploying another storage unit of the number of storage units to another set of storage units.

The method described above in conjunction with the processing module can alternatively be performed by other modules of the dispersed storage network or by other devices. In addition, at least one memory section (e.g., a computer readable storage medium) that stores operational instructions can, when executed by one or more processing modules of one or more computing devices of the dispersed storage network (DSN), cause the one or more computing devices to perform any or all of the method steps described above.

Figure 41A:
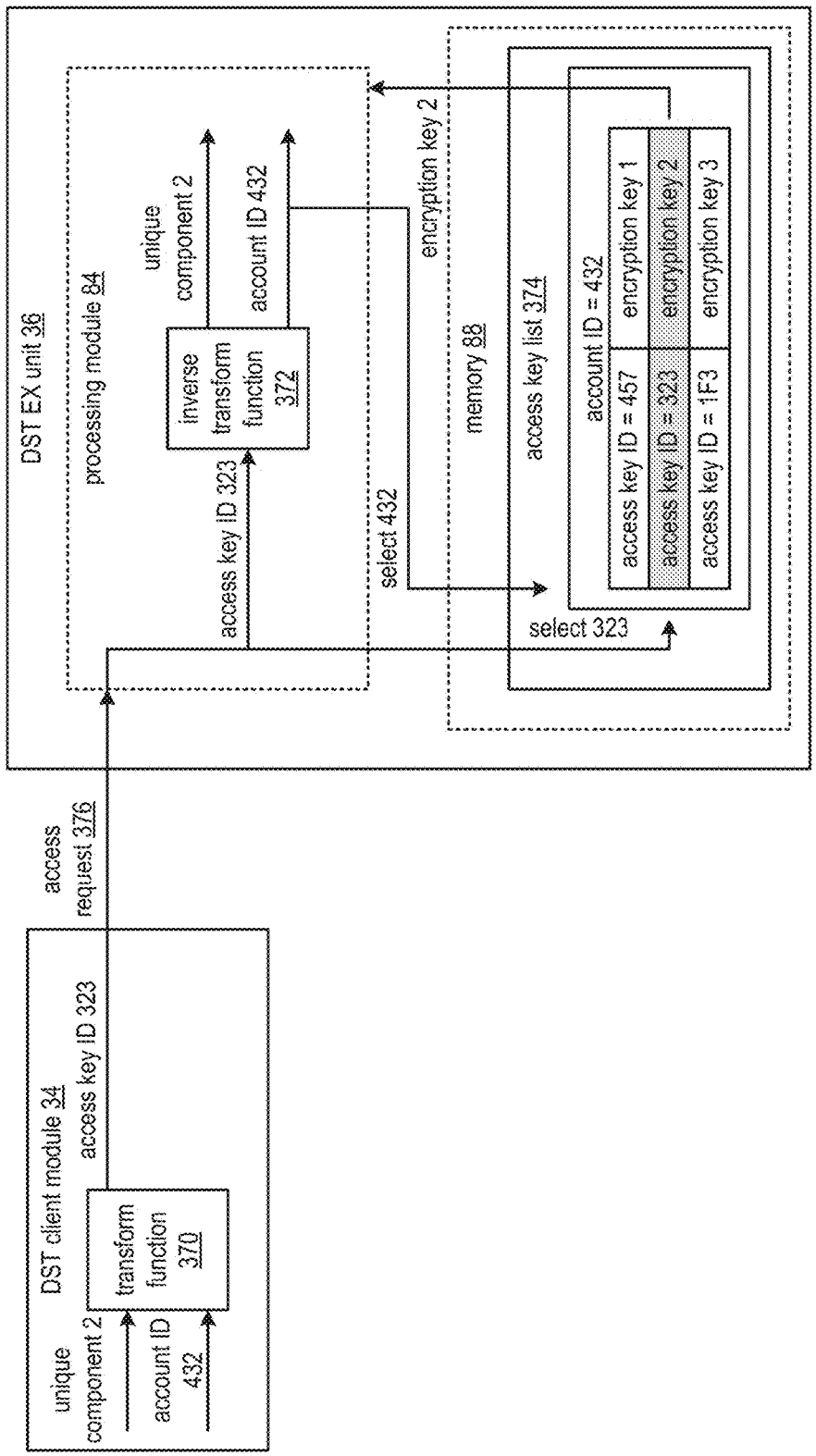
FIG. 41A is a schematic block diagram of another embodiment of a dispersed storage network (DSN) in accordance with the present invention.

FIG. 41A is a schematic block diagram of another embodiment of a dispersed storage network (DSN) that includes the distribute storage and task (DST) client module 34 of FIG. 1 and the DST execution (EX) unit 36 of FIG. 1. The DST client module 34 includes a transform function 370. The DST execution unit 36 includes the processing module 84 of FIG. 3 and the memory 88 of FIG. 3. The processing module 84 includes an inverse transform function 372. The system functions to obfuscate an access request 376 generated by the DST client module 34 and process the obfuscated access request by the DST execution unit 36. The access request 376 includes at least one of a write request, a read request, a delete request, and a list request.

In an example of operation of obfuscation of the access request, the transform function 370 applies a transform to a unique component (e.g., 2) and an account ID (e.g., 432) to produce an access key ID (e.g., 323), where the access key ID is subsequently utilized to obtain an encryption key for utilization in a secure function when processing the access request. The account ID is associated with the DST client module 34. The unique component is associated with an aspect of processing the access request. The aspect includes at least one of applying a crypto function to data associated with at least one of writing, reading, deleting, and listing; applying a crypto function to a message, and utilizing the crypto function to perform an authentication function on the access request generated by the DST client module 34. For example, the transform function applies a deterministic two way transform function of the form $f(x)=y$ to a unique component 2 and an account ID 432 to produce an access key ID 323.

Having produced the access key, the DST client module 34 issues the access request 376 to the DST execution unit 36. The access request 376 includes the access key ID. For example, the DST client module 34 generates the access request 376 to include the access key ID 323 and sends the access request to the DST execution unit 36. The sending may include utilizing the network 24 of FIG. 1.

The processing module 84 receives the access request 376. With the access request received, the inverse transform function 372 applies an inverse transform on the access key ID of the received access request to reproduce the unique component and the account ID. For example, the inverse transform function 372 applies a deterministic two way inverse transform function, where the inverse transform function is the inverse of the transform function of the DST client module 34, and where the inverse transform function is of the form $g(y)=x$, such that $g(f(x))=x$, to the access key ID 323 to reproduce the unique component 2 and the account ID 432.

With the unique component and the account ID reproduced, the processing module 84 selects an account entry of an access key list 374 stored in the memory 88. For example, the processing module 84 selects an entry associated with account ID 432 from the access key list 374. Having selected the entry of the access key list corresponding to the account ID, the processing module 84 accesses a portion of the entry corresponding to the access key ID to recover a corresponding encryption key. For example, the processing module 84 selects a second portion of an entry for the account ID 432 that corresponds to the access key ID of 323 to recover an encryption key 2. Having recovered the encryption key, the processing module 84 utilizes the recovered encryption key to further process the access request in accordance with the unique component. For example, the processing module 84 interprets the unique component 2 to decrypt a recovered encrypted encoded data slice from the memory 88 using the encryption key 2 to reproduce an encoded data slice and sends the encoded data slice to the DST client module 34 when the access request includes the read slice request. As another example, the processing module interprets the unique component 2 to encrypt, using the encryption key 2, an encoded data slice of the access request to produce an encrypted encoded data slice for storage in the memory 88 when the access request includes the write slice request.

Figure 41B:
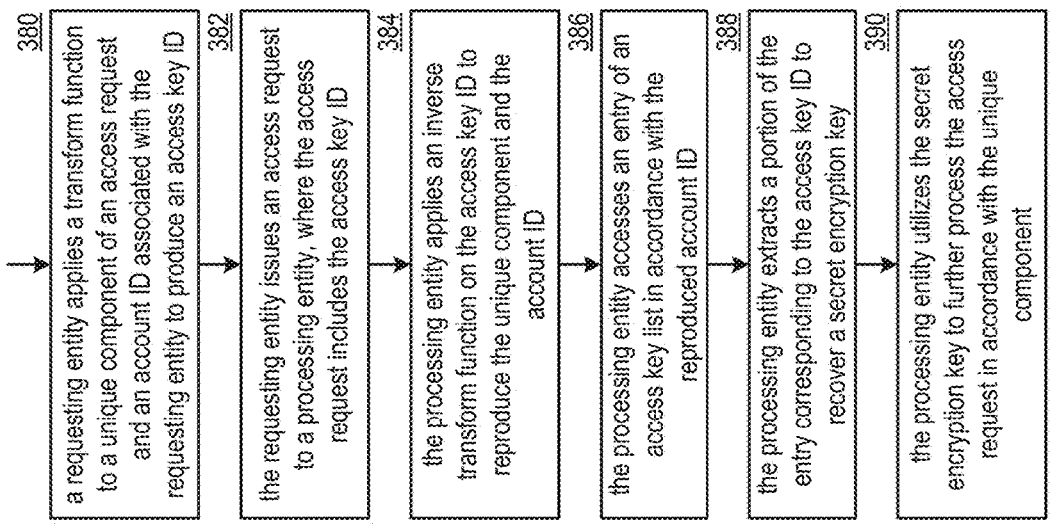
FIG. 41B is a flowchart illustrating an example of obfuscating content of an access request in accordance with the present invention.

FIG. 41B is a flowchart illustrating an example of obfuscating content of an access request. The method begins or continues at step 380 where a requesting entity (e.g., a distributed storage and task (DST) client module) applies a transform function to a unique component of an access request and an account identifier (ID) associated with the requesting entity to produce an access key identifier. The applying of the transform function includes obtaining the unique component based on a factor of the access request (e.g., based on a request type) and obtaining the transform function (e.g., a lookup, initiating query, receiving query response, etc.).

The method continues at step 382 where the requesting entity issues an access request to a processing entity (e.g., a DST execution unit), where the access request includes the access key ID. The issuing includes generating the access request to include one or more of the access key ID, a request type indicator, a security credential, identity of the requesting entity, and an encoded data slice for storage.

The method continues at step 384 where the processing entity applies an inverse transform function on the access key ID to reproduce the unique component and the account ID. The inverse transform function is an inverse of the transform function. The applying of the inverse transfer function includes one or more of performing a lookup to obtain the inverse transform function and identifying the inverse transform function based on the identity of the requesting entity.

The method continues at step 386 where the processing entity accesses an entry of an access key list in accordance with the reproduced account ID. For example, the processing entity performs a lookup utilizing the reproduced account ID as an index key to recover the entry of the access key list.

The method continues at step 388 where the processing entity extracts a portion of the entry corresponding to the access key ID to recover a secret encryption key. For example, the processing entity identifies the portion based on the access key ID and extracts a corresponding encryption key as a recovered secret encryption key.

The method continues at step 390 where the processing entity utilizes the secret encryption key to further process the access request in accordance with the unique component. For example, the processing entity decrypts an encrypted stored partial task and executes the decrypted partial task to produce a partial result.

Figure 42A:
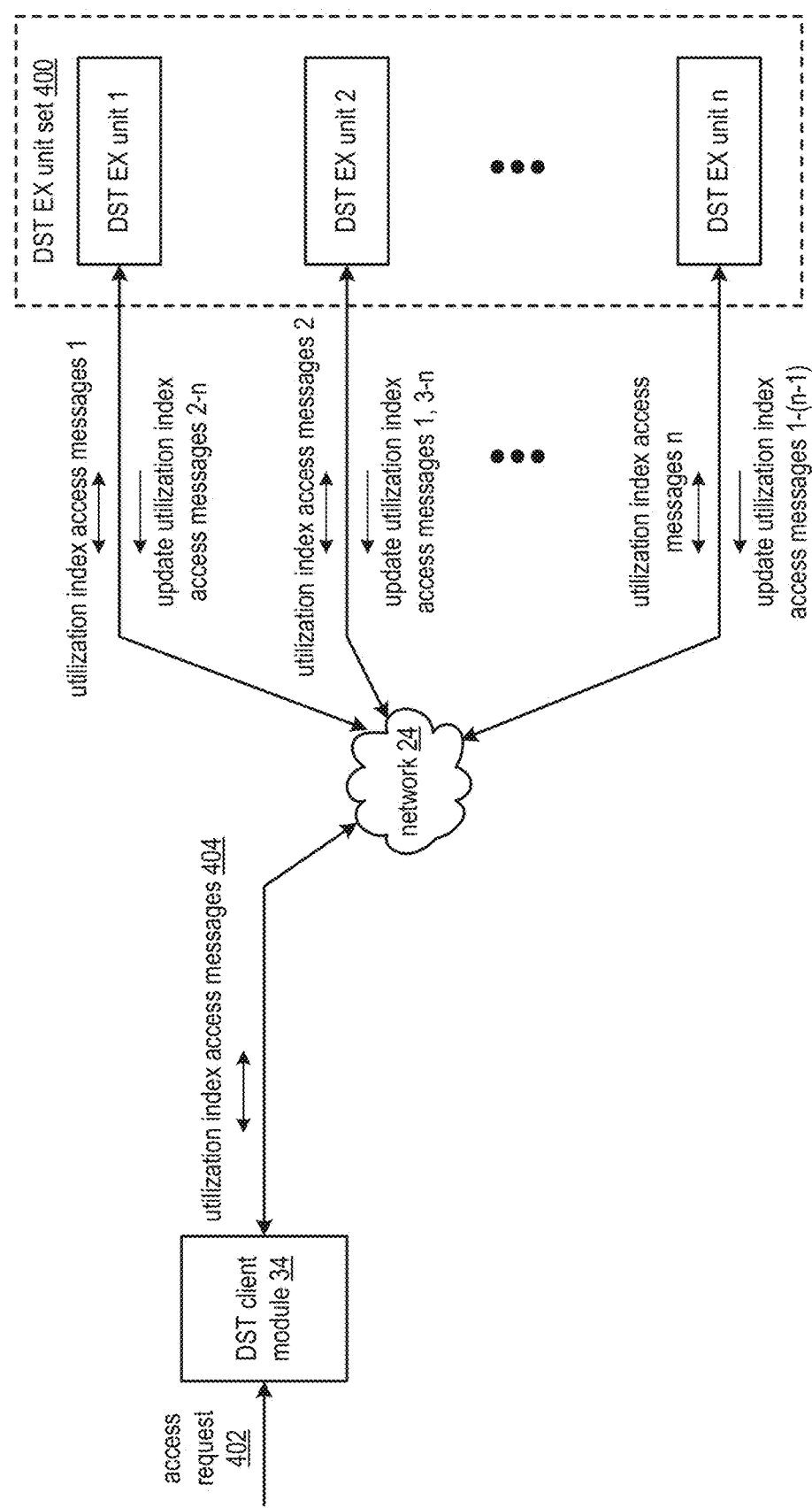
FIG. 42A is a schematic block diagram of another embodiment of a dispersed storage network (DSN) in accordance with the present invention.

FIG. 42A is a schematic block diagram of another embodiment of a dispersed storage network (DSN) that includes the distributed storage and task (DST) client module 34 of FIG. 1, the network 24 of FIG. 1, and a DST execution (EX) unit set 400. The DST execution unit set 400 includes a set of DST execution units 1-*n*. Each DST execution unit may be implemented utilizing the DST execution unit 36 of FIG. 1. The DSN functions to update storage configuration of the DSN. The storage configuration includes one or more of allocation of a new storage generation, the allocation of a previous storage generation, rejecting subsequent access requests when a vault usage quota has been reached, issuing a usage report, determining to remove storage capacity from a current storage generation, and determining to add more storage capacity to the current storage generation.

In an example of operation of the updating of the storage configuration of the DSN, each DST execution unit determines utilization information for the DST execution unit for each of a plurality of address ranges. The utilization information includes one or more of a storage utilization level by address range and an available storage level. The address range includes at least one of a source name range, and a slice name range.

Having determined the utilization information for the DST execution unit, for each address range, the DST execution unit identifies an index node associated with the address range. A dispersed hierarchical index is stored as a plurality of index nodes that includes the identified index node. Each index node is stored as a set of encoded index node slices stored across the set of DST execution units. Each index node includes one or more entries associated with corresponding one or more index keys. As a specific example of identifying the index node, the DST execution unit identifies the dispersed hierarchical index based on a type of the address range (e.g., a slice name index, a vault index, a source name index), generates an index key based on the address range, and searches the identified dispersed hierarchical index utilizing the generated index key to identify the index node where an entry of the index node substantially matches the index key. The searching includes exchanging utilization index access messages 1-*n* with the set of DST execution units, where the utilization index access messages include one or more of list slice requests, the list slice responses, read slice requests, and read slice responses. Having identified the index node, the DST execution unit updates the index node with the corresponding utilization information. The updating includes overwriting the utilization information for the address range to produce an updated index node, dispersed storage error encoding the updated index node to produce a set of updated index node slices, and sending the set of updated index node slices to the set of DST execution units for storage. As a specific example of the sending, DST execution unit 1 issues update utilization index access messages 404 of 2-*n* to DST execution units 2-*n*, where the update utilization index access messages 2-*n* includes write slice requests associated with storing index node slices 2-*n*.

With the utilization information stored in a plurality of index nodes of one or more dispersed hierarchical indexes, the DST client module 34 receives an access request 402 (e.g., a write request, a read request). Having received the access request 402, the DST client module 34 determines whether to update storage configuration of the DSN. The determining may be based on one or more of interpreting a schedule, interpreting an error message, and receiving a request.

When determining to update the storage configuration, the DST client module 34 generates a set of index keys that correspond to the access request 402 (e.g., for a common vault, a common generation, etc.). Having generated the set of index keys, the DST client module 34 selects at least one dispersed hierarchical index based on the set of index keys. Having selected the dispersed hierarchical index, the DST client module 34 searches the dispersed hierarchical index utilizing the set of index keys to identify a set of index nodes corresponding to the set of DST execution units. For example, the DST client module 34 exchanges utilization index access messages with the set of DST execution units to search the dispersed hierarchical index.

Having identified the set of index nodes corresponding to the set of DST execution units, the DST client module 34 extracts utilization information from the identified set of index nodes. Having extracted utilization information, the DST client module 34 determines a scheme to update storage configuration of the DSN based on expected utilization information. As a specific example, the DST client module 34 determines to allocate an additional storage generation when a current generation is substantially full. As another example, the DST client module 34 determines to reject further access requests associated with a vault when a usage quota associated with the vault has been reached.

Figure 42B:
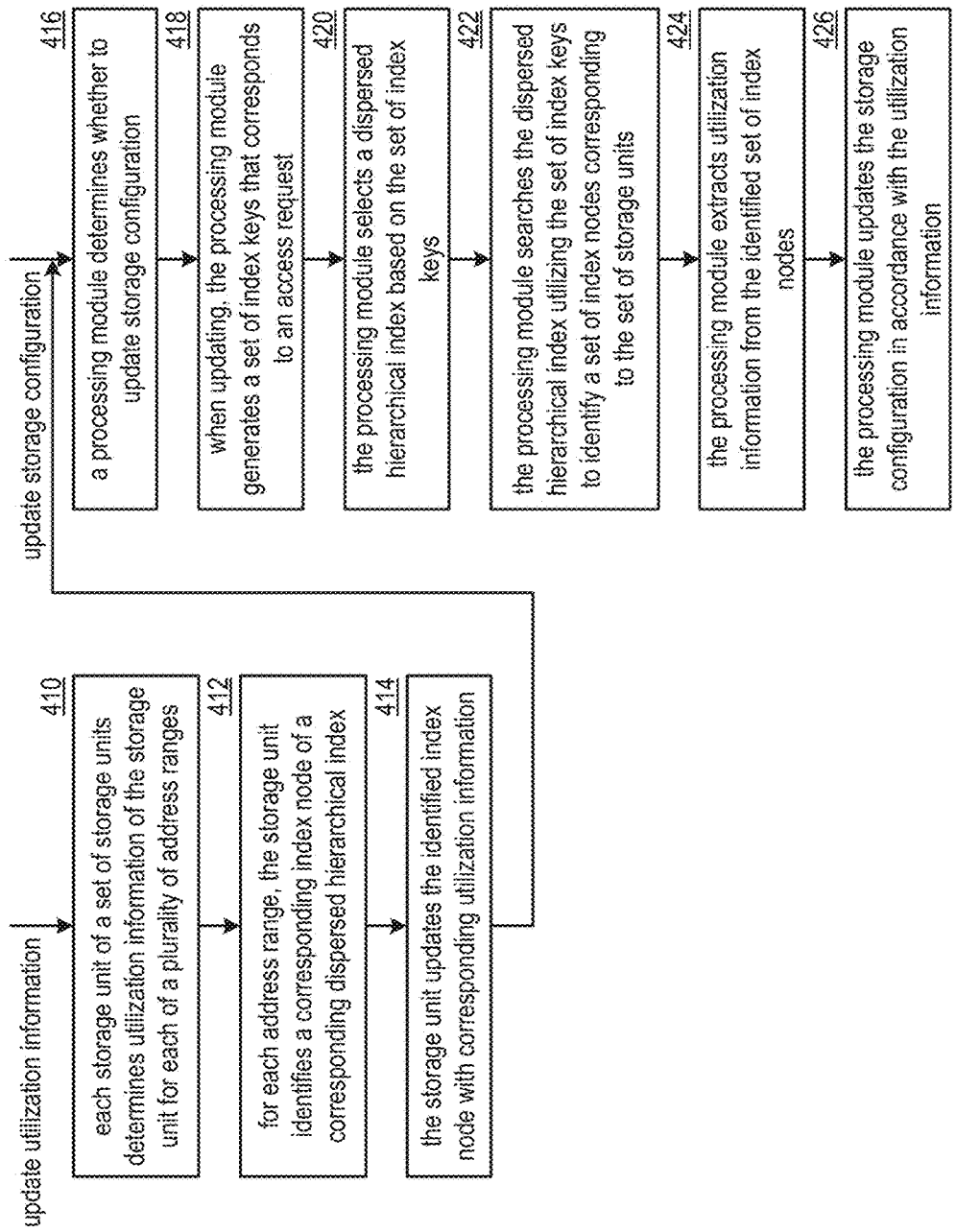
FIG. 42B is a flowchart illustrating an example of updating storage configuration of a dispersed storage network (DSN) in accordance with the present invention.

FIG. 42B is a flowchart illustrating an example of updating storage configuration of a dispersed storage network (DSN). The method begins or continues, when updating utilization information, at step 410 where each storage unit of a set of storage units determines utilization information of the storage unit for each of a plurality of address ranges. The determining includes obtaining the plurality of address ranges, summarizing utilized storage capacity within the plurality of address ranges, and identifying available storage capacity. The obtaining of the plurality of address ranges includes extracting from a slice name list and receiving.

For each address range, the method continues at step 412 where the storage unit identifies a corresponding index node of a corresponding dispersed hierarchical index. The identifying includes identifying the dispersed hierarchical index based on a mapping of address ranges to dispersed particle indexes. The identifying further includes generating the index key based on the address range and searching the dispersed hierarchical index using the index key to identify an index node that includes an index key entry that matches the generated index key.

The method continues at step 414 where the storage unit updates the identified index node with corresponding utilization information. The updating includes storing the utilization information in the recovered index node to produce an updated index node, dispersed storage error encoding the updated index node to produce an updated set of index node slices, and sending the updated set of index node slices to storage units of a set of storage units.

The method continues, when updating storage configuration, at step 416 where a processing module (e.g., a distributed storage and task client module) determines whether to update the storage configuration. The determining includes one or more of receiving an access request, interpreting a schedule, receiving a message, and receiving a request. When updating, the method continues at step 418 where the processing module generates a set of index keys that corresponds to the access request. The generating includes identifying an address range of the access request or similar and generating the index keys using the address range.

The method continues at step 420 where the processing module selects a dispersed hierarchical index based on a set of index keys. For example, the processing module selects the dispersed hierarchical index based on the mapping of address ranges to dispersed hierarchical indexes. The method continues at step 422 where the processing module searches the dispersed hierarchical index utilizing the set of index keys to identify a set of index nodes corresponding to the set of storage units. For example, the processing module searches the dispersed hierarchical index to find each index node that includes an index key entry that matches an index key of the set of index keys.

The method continues at step 424 where the processing module extracts utilization information from the identified set of index nodes. For example, the processing module verifies a field of the index node that includes the utilization information. The method continues at step 426 where the processing module updates the storage configuration in accordance with the utilization information. For example, the processing module modifies the storage configuration in accordance with a storage configuration scheme to update the storage configuration based on extracted utilization information.

Figure 43A:
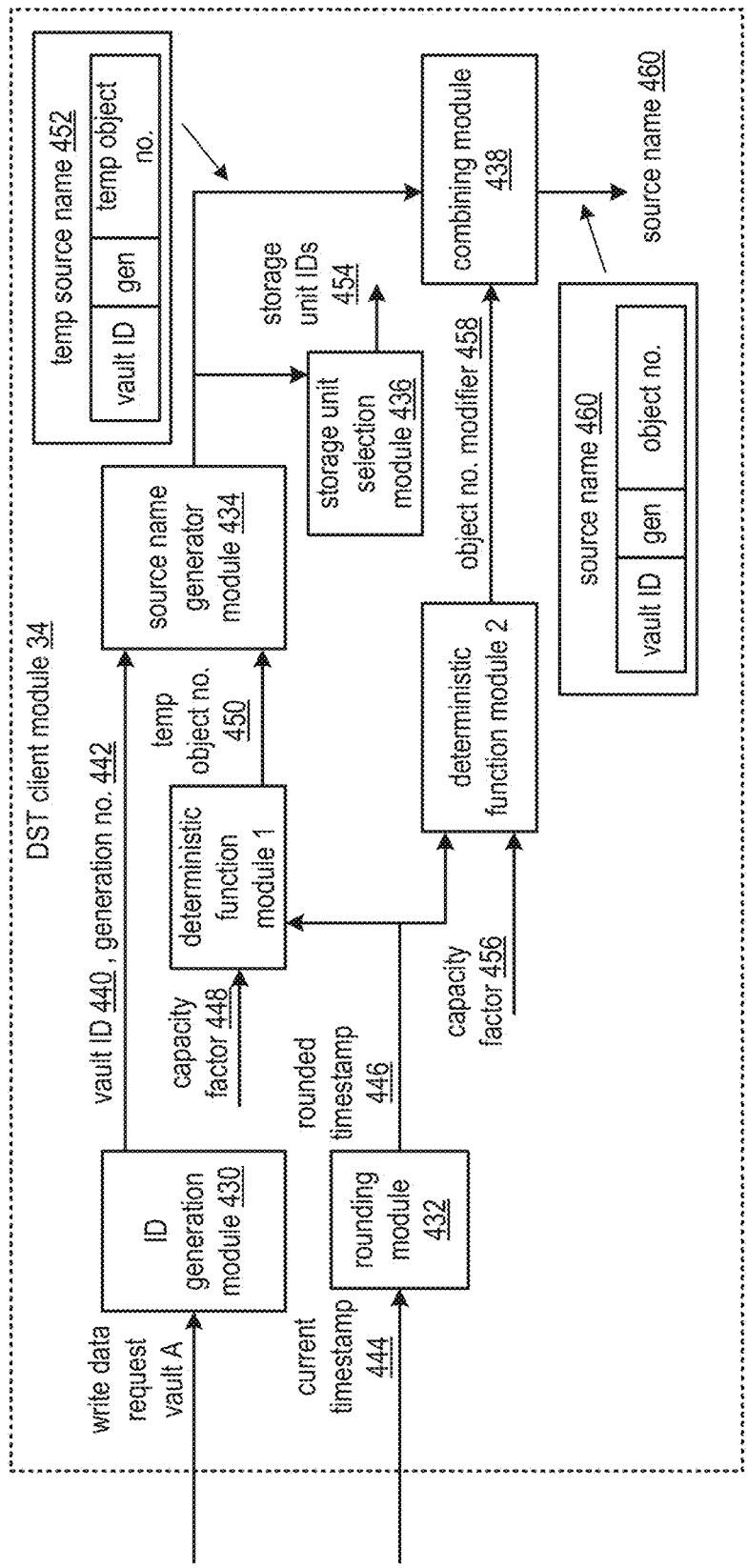
FIG. 43A is a schematic block diagram of another embodiment of a distributed storage and task (DST) client module in accordance with the present invention.

FIG. 43A is a schematic block diagram of another embodiment of a distributed storage and task (DST) client module that includes an identifier (ID) generation module 430, a rounding module 432, a deterministic function module 1, a deterministic function module 2, a source name generator module 434, a storage unit selection module 436, and a combining module 438. The DST client module may be implemented utilizing the DST client module 34 of FIG. 1. The DST client module 34 functions to generate a source name 460 for a write data request.

In an example of operation of generating the source name 460, the ID generation module 430 generates a vault ID 440 and a generation number 442 for a received write data request (e.g., for vault A). The generating may include one or more of performing a system registry lookup, accessing a requesting entity to vault ID table, and accessing a current generation number indicator for the vault ID. The rounding module 432 rounds a current timestamp 444 to produce a rounded timestamp 446. For example, the rounding module 432 rounds the current timestamp 444 to produce a new rounded timestamp 446 every 10 minutes.

With the rounded timestamp 446 produced, the deterministic function module 1 obtains a capacity factor 448. The capacity factor 448 includes one or more of an expected processing performance level of the set of storage units (e.g., of a set of DST execution units) and an expected processing performance level of the current processing module (e.g., of the DST client module 34). The obtaining includes at least one of determining based on performance information for available sets of storage units, performing a lookup, interpreting an error message, and identifying a capacity level of the current processing module. For example, the deterministic function module 1 obtains the capacity factor 448 that indicates that a third set of storage units of a group of ten sets of storage units are associated with most favorable levels of expected processing performance. Having obtained the capacity factor 448, the deterministic function module 1 performs a first deterministic function on the capacity factor 448 and the rounded timestamp 446 to produce a temporary object number 450, the temporary object number 450 is associated with a desired set of storage units for a time duration associated with the rounded timestamp 446. For example, the deterministic function module 1 performs the first deterministic function to produce the temporary object number 450 associated with the third set of storage units (e.g., best-performing set of storage units).

The source name generator module 434 generates a temporary source name 452 that includes the vault ID 440, the generation number 442, and the temporary object number 450. The storage unit selection module 436 identifies the associated set of storage units based on the temporary source name 452. For example, the storage unit selection module 436 accesses a source name to storage unit identifier table utilizing the temporary source name 452 to produce an identifier of the associated set of storage units. For instance, the storage unit selection module 436 accesses the source name to storage unit identifier table to produce a set of storage unit identifiers 454 for the third set of storage units. Each storage unit of the associated set of storage units is associated with an address range assignment that includes the temporary source name 452.

The deterministic function module 2 applies a second deterministic function to the capacity factor 456 and the rounded timestamp 446 to produce an object number modifier 458, where the object number modifier 458 is to be associated with all data objects written within a time frame associated with the rounded timestamp 446 in accordance with the capacity factor 456. The combining module combines the temporary source name 452 and the object number modifier 458 to produce the source name 460 that includes the vault ID 440, the generation number 442, and an object number, where the object number includes a modified version of the temporary object number 450 based on the object number modifier 458. For example, the combining module 438 modifies a middle section of the temporary object number 450 with bits of the object number modifier 458 to provide storage locality during the time frame associated with the rounded timestamp 446. For instance, source names generated during the timeframe shall have close locality for different associated objects.

Having generated the source name 460, the DST client module 34 generates a plurality of sets of slice names utilizing the source name 460. For example, the DST client module 34 determines entries of a slice index field, where a different slice index entry is utilized for each slice name of the set of slice names. As another example, the DST client module 34 determines entries of a segment number field as a function of a size of the data object for storage. Having generated the plurality of sets of slice names, the DST client module 34 utilizes the plurality of sets of slice names when issuing write slice requests to the set of storage units associated with the write data request. For example, the DST client module 34 generates a set of write slice requests that includes a set of slice names and sends the set of write slice requests to the third set of storage units.

Figure 43B:
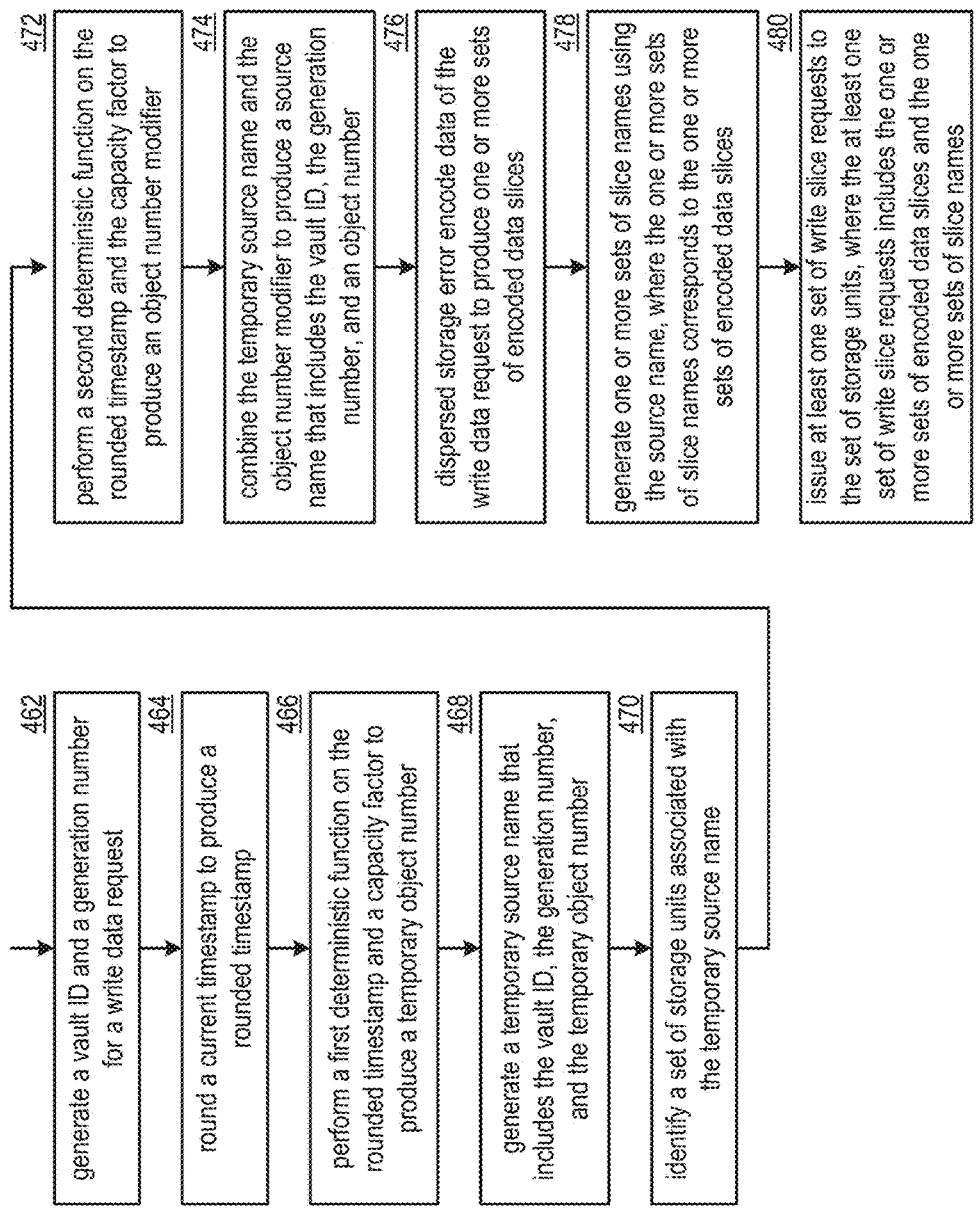
FIG. 43B is a flowchart illustrating an example of generating a virtual address for storing data in accordance with the present invention.

FIG. 43B is a flowchart illustrating an example of generating a virtual address for storing data. The method begins or continues at step 462 where a processing module (e.g., of a distributed storage and task (DST) client module) generates a vault identifier (ID) and a generation number for a write data request. The method continues at step 464 where the processing module rounds a current timestamp to produce a rounded timestamp. The method continues at step 466 where the processing module performs a first deterministic function on the rounded timestamp and a capacity factor to produce a temporary object number. As a specific example, the performing includes obtaining the capacity factor and performing the first deterministic function to produce the temporary object number, where the object number is associated with a preferred set of storage units.

The method continues at step 468 where the processing module generates a temporary source name that includes the vault ID, the generation number, and the temporary object number. The method continues at step 470 where the processing module identifies a set of storage units associated with the temporary source name. The method continues at step 472 where the processing module performs a second deterministic function on the rounded timestamp and the capacity factor to produce an object number modifier. For example, the processing module performs the second deterministic function to generate a bit pattern for middle bits of an object number to provide a desired locality of storage within the preferred set of storage units.

The method continues at step 474 where the processing module combines the temporary source name and the object number modifier to produce a source name that includes the vault ID, the generation number, and an object number. For example, the processing module overwrites one or more bits of the temporary object number with the object number modifier to produce the object number.

The method continues at step 476 where the processing module dispersed storage error encodes data of the write data request to produce one or more sets of encoded data slices. The method continues at step 478 where the processing module generates one or more sets of slice names using the source name, where the one or more sets of slice names corresponds to the one or more sets of encoded data slices. For example, the processing module appends a slice index and a segment number to the source name for one or more segments of the data. The method continues at step 480 where the processing module issues at least one set of write slice requests to the set of storage units, where the at least one set of write slice requests includes the one or more sets of encoded data slices and the one or more sets of slice names.

Figure 44A:
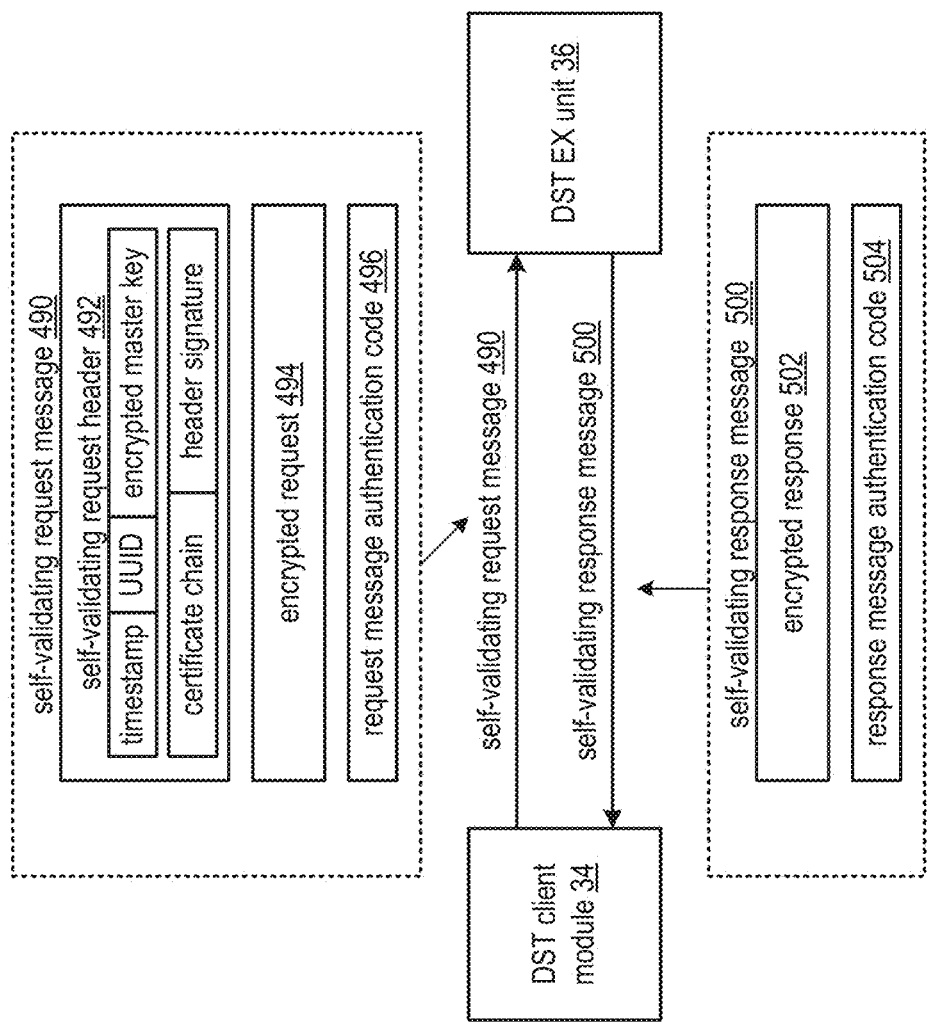
FIG. 44A is a schematic block diagram of another embodiment of a dispersed storage network (DSN) in accordance with the present invention.

FIG. 44A is a schematic block diagram of another embodiment of a dispersed storage network (DSN) that includes the distributed storage and task (DST) client module 34 of FIG. 1 and the DST execution unit 36 of FIG. 1. Alternatively, the DST client module 34 is operably coupled to a set of DST execution units 36. The DSN functions to utilize a self-validating request message 490 (e.g., interchangeably referred to as self-validating message 490) to enable the DST client module 34 to issue a request to the DST execution unit 36 and for the DST execution unit 36 to respond with a self-validating response message 500 to the DST client module 34. Hereafter, the DST client module 34 may be referred to interchangeably as a requester or device 1 and the DST execution unit 36 may be referred to interchangeably as a responder or device 2.

In an example of operation of sending the self-validating request message 490, the requester generates a random master key. For example, the requester generates a random number and performs a mask generating function on the random number to generate the random master key with a number of bits associated with a desired number of bits of the random master key.

Having generated the master key, the requester generates a set of keys, where the set of keys includes a requester encryption key (e.g., a message encryption key), a requester signing key, a responder encryption key, and a responder signing key based on a secret function. The generating includes performing a deterministic function (e.g., a corresponding secret function of a plurality of secret functions) on the master key in accordance with a deterministic function type associated with each key of a set of keys. For example, the requester performs a first deterministic function on the master key to produce the requester encryption key (e.g., the message encryption key), performs a second deterministic function on the master key to produce the requester signing key, performs a third deterministic function on the master key to produce the responder encryption key, and performs a fourth deterministic function on the master key to produce the responder signing key.

Having produced the set of keys, the requester encrypts the master key using a public key of the responder (e.g., received earlier) to produce an encrypted master key. A public/private key pair of the responder includes the public key of the responder and a private key of the responder. The encrypting may include receiving the public key from the responder (e.g., from a previous transaction, extracted from system registry information).

Having encrypted the master key, the requester generates a header signature over one or more of a timestamp, a universally unique identifier (UUID) associated with the request, the encrypted master key, and a certificate chain of the requester using a private key of a public/private key pair associated with the requester, where the public/private key pair associated with the request includes a private key of the requester and a public key of the requester. The certificate chain includes one or more certificates chained to a certificate authority of the DSN, and may include the public key of the requester.

Having produced the header signature, the requester generates a self-validating request header 492 to include the timestamp, the UUID, the encrypted master key, the certificate chain of the requester, and the header signature. Having generated the header 492, the requester encrypts the request message (e.g., a write request, a delete request, a list request, a read request) using the requester encryption key to produce an encrypted request 494. Having produced the encrypted request 494, the requester generates a request message authentication code 496 (e.g., a signature) over the encrypted request 494 using the requester signing key.

Having generated the request message authentication code 496, the requester generates the self-validating request message 490 to include the self-validating request header 492, the encrypted request 494, and the request message authentication code 496. Having generated the self-validating request message 490, the requester sends the self-validating request message 490 to the responder (e.g., the second device).

The responder (e.g., the second device) receives the self-validating request message 490 and verifies the timestamp and the UUID (e.g., no other requests have been received within a timeframe of the timestamp that includes the same UUID to provide replay attack abatement. Having verified the timestamp and the UUID, the responder verifies the certificate chain (e.g., each layer of the chain is valid and ultimately connects to a trusted certificate authority). Having verified the certificate chain, the responder validates the header signature with contents of the self-validating request header 492. For example, the responder utilizes a public key of the requester from the verified certificate chain to validate the header signature with the contents of the header 492 (e.g., having received the public key of the requester from a previous transaction or obtaining the public key from the system registry information).

Having verified the self-validating request header 492, the responder decrypts the encrypted master key using the private key of the responder to reproduce the master key. Having recovered the master key, the responder generates the set of keys using the reproduced master key and a secret function (e.g., utilizing the same first through fourth deterministic functions of the secret function). Having generated the set of keys, the responder decrypts the encrypted request 494 using the requester encryption key to reproduce the request. Having reproduced the request message, the responder authenticates the encrypted request 494 using the request message authentication code 496 and the requester signing key. For example, the responder validates the signature over the encrypted request 494 using the requester signing key of the set of keys. As another example, the responder validates the signature over the request using the requester signing key when the signature is performed over the request rather than the encrypted request 494.

Having authenticated the encrypted request 494, the responder authorizes the request. For example, the responder authorizes the request based on the certificate chain and an access control list comparison to a nature of the reproduced request. When the request is authorized, the responder processes the request to produce a response (e.g., a write response, a read response). For example, the responder retrieves an encoded data slice and generates a read slice response as the response that includes the retrieved encoded data slice when the request includes a read slice request.

Having produced the response, the responder encrypts the response using the responder encryption key of the set of keys to produce an encrypted response 502. Having produced the encrypted response 502, the responder generates a response message authentication code 504 (e.g., signature) over the encrypted response 502 using the responder signing key of the set of keys. Having generated the response message authentication code 504, the responder generates the self-validating response message 500 to include the encrypted response 502 and the response message authentication code 504. Having produced the self-validating response message 500, the responder sends the self-validating response message 500 to the requester.

The requester authenticates the encrypted response 502 using the response message authentication code 504 and the responder signing key. When authenticated, the requester decrypts the encrypted response 502 using the responder encryption key to reproduce the response message. For example, the requester decrypts the encrypted response 502 using the responder encryption key to reveal the retrieved encoded data slice associated with the read slice request.

Alternatively, or in addition to, the requester generates a set of self-validating requests, where each of the self-validating requests includes a common header except for a unique encrypted master key for each request and a unique header signature for each request. Having produced the set of requests, the requester sends the set of self-validating requests to the set of DST execution units 36 that includes the DST execution unit 36.

Figure 44B:
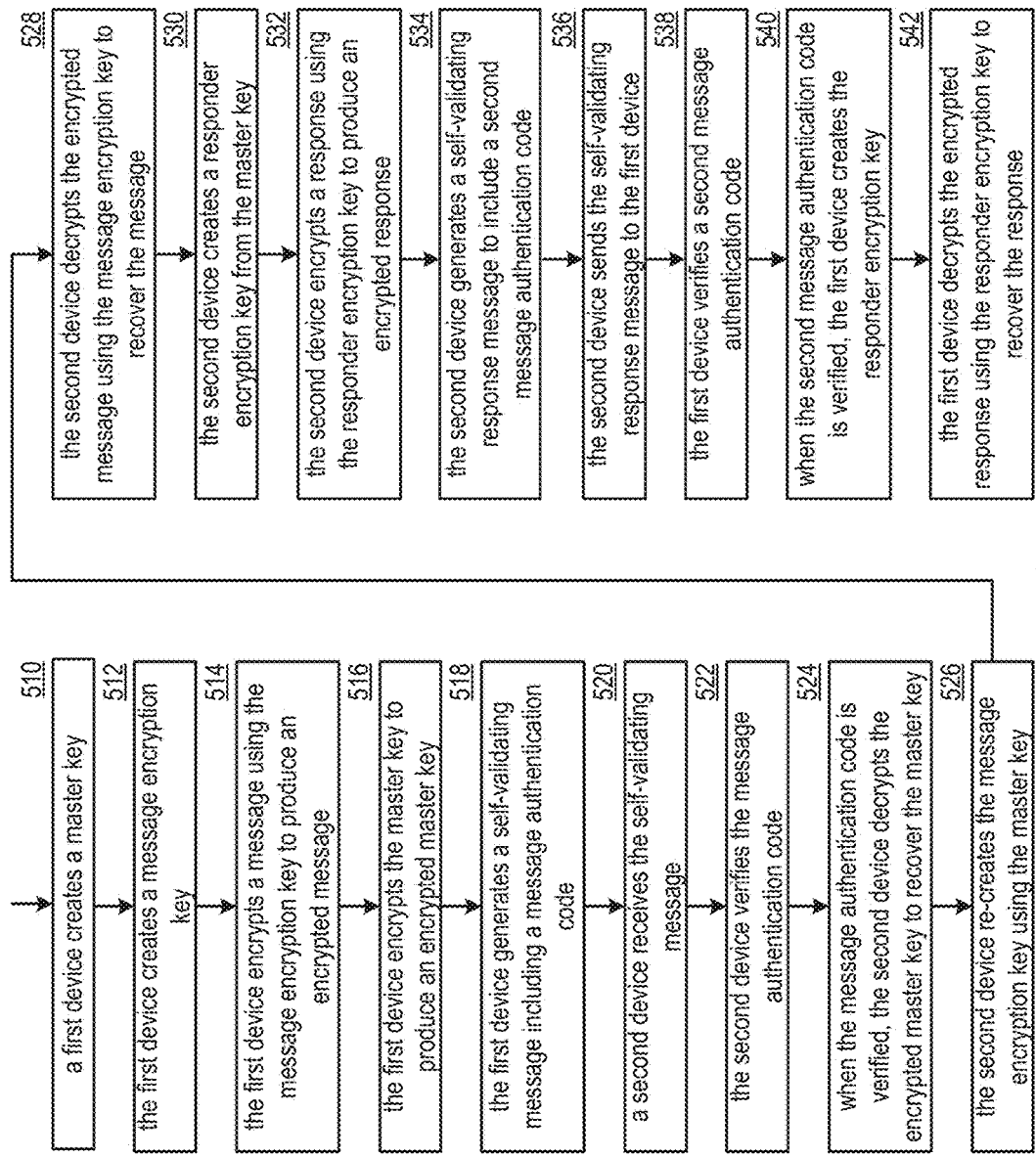
FIG. 44B is a flowchart illustrating an example of verifying access utilizing a self-validating request message structure in accordance with the present invention.

FIG. 44B is a flowchart illustrating an example of verifying access utilizing a self-validating request message structure. In particular, a method is presented for use in conjunction with one or more functions and features described in conjunction with FIGS. 1-39, 44A, and also FIG. 44B. The method begins at step 510 where one or more processing modules of a first device (e.g., computing device) of two or more devices of a dispersed storage network (DSN) creates a master key to include in a generation of a self-validating message, where the self-validating message includes a header section that includes an encrypted master key (e.g., of the master key) and one or more of a time stamp, a first device identifier (e.g., of the first device), a certificate chain, and a header signature (e.g., using a private key of the public/private key pair associated with the first device). The self-validating message further includes an encrypted message (e.g., an encrypted request) and a message authentication code. As a specific example of creating of the master key, the first device generates a random number and performs a deterministic function on the random number to produce the master key.

The method continues at step 512 where the first device uses the master key and a secret function to create a message encryption key. As a specific example, the first device performs the secret function (e.g., a first deterministic function) on the master key to produce the message encryption key. The method continues at step 514 where the first device encrypts a message using the message encryption key to produce an encrypted message. The method continues at step 516 where the first device encrypts the master key using a public key of a second device to produce an encrypted master key. The method continues at step 518 where the first device includes the message authentication code of the first device in the self-validating message. The including includes the first device creating the message authentication code based on the master key and a second secret function. For example, the first device performs the second secret function (e.g., a second deterministic function) on the master key to produce a requester signing key and performs a signing function by generating a signature over the self-validating message (e.g., over the header and the encrypted message) as the message authentication code using the requester signing key. Having produced the self-validating message, the first device sends the self-validating message to the second device.

The method continues at step 520 where the second device receives the self-validating message. The method continues at step 522 where the second device verifies the message authentication code of the first device to initiate decoding of the self-validating message. As a specific example, the second device verifies the message authentication code based on the master key and the second secret function. For instance, the second device decrypts the encrypted master key utilizing a private key of the public/private key pair of the second device to reproduce the master key, performs the second secret function (e.g., the second deterministic function) on the reproduced master key to reproduce the requester signing key, regenerates the signature over the self-validating request message using the reproduced requester signing key, compares the regenerated signature to the received message authentication code, and indicates a favorable verification when the comparison is favorable (e.g., favorable verification when the regenerated signature and a received message authentication code are substantially the same).

When the message authentication code of the first device is verified, the method continues at step 524 where the second device decrypts the encrypted master key using the private key of the second device to recover the master key. Alternatively, the second device recovers the master key in a previous step. The method continues at step 526 where the second device uses the master key and the secret function to recreate the message encryption key. For example, the second device performs the secret function (e.g., the first deterministic function) on the re-created master key to produce the message encryption key.

The method continues at step 528 where the second device decrypts the encrypted message using the message encryption key to recover the message. The method continues at step 530 where the second device creates a responder encryption key from the master key and a third secret function (e.g., a third deterministic function) to initiate creating of a self-validating response message. For example, the second device performs the third secret function on the master key to produce the responder encryption key. The method continues at step 532 where the second device encrypts a response to the message using the responder encryption key to produce an encrypted response.

The method continues at step 534 where the second device continues to produce the self-validating response message by including a second message authentication code of the second device. The second device creates the second message authentication code based on the master key and a fourth secret function (e.g., a fourth deterministic function). For the example, the second device performs the fourth secret function on the master key to produce a responder signing key and performs another signing function using the responder signing key on the self-validating response message to produce the second message authentication code. The method continues at step 536 where the second device sends the self-validating response message to the first device.

The method continues at step 538 where the first device verifies a second message authentication code based on the master key and the fourth secret function. For example, the first device applies the fourth secret function to the master key to reproduce the responder signing key, performs the other signing function using the reproduced responder signing key on the self-validating response message to produce a calculated second message authentication code, compares the calculated second message authentication code to the received second message authentication code, and indicates a favorable verification of the second message authentication code when the comparison is favorable (e.g., substantially the same).

When the second message authentication code is verified, the method continues at step 540 where the first device creates the responder encryption key from the master key and the third secret function. For example, the first device applies the third secret function to the master key to produce the responder encryption key. The method continues at step 542 where the first device decrypts the encrypted response using the responder encryption key to recover the response.

Alternatively, or in addition to, when the message includes a read request (e.g., a read slice request) the first device encrypts, as a message, the read request using the message encryption key to produce the encrypted message. Having produced the encrypted message, the first device sends the self-validating message to the second device. Having received the self-validating message, the second device decrypts the encrypted message to recover the read request. Having recovered the read request, the second device generates a read response (e.g., to include a desired encoded data slice for retrieval) corresponding to the read request. Having generated the read response, the second device creates a responder encryption key from the master key and a secret function (e.g., a particular one of a plurality of secret functions). Having created the responder encryption key, the second device encrypts the read response using the responder encryption key to produce an encrypted read response. Having produced the encrypted response, the second device sends the self-validating response message that includes the encrypted response to the first device.

With the self-validating response message sent, the first device receives the encrypted read response and creates the responder encryption key from the master key and the same particular secret function. Having re-created the responder encryption key, the first device decrypts the encrypted response based on the responder encryption key to recover the read response.

Alternatively, or in addition to, when the message includes a write request (e.g., a write slice request, the first device encrypts, as the message, a write request using the message encryption key to produce the encrypted message. Having produced the encrypted message, the first device sends the self-validating message that includes the encrypted message to the second device. Having received the self-validating message, the second device decrypts the encrypted message to recover the write request. Having recovered the write request, the second device executes the write request. For instance, the second device stores an encoded data slice of the write slice request in a local memory of the second device.

Having executed the write request, the second device generates a write response (e.g., a write slice response) corresponding to the executing of the write request. Having generated the write response, the second device creates a responder encryption key from the master key and a particular secret function. Having produced the responder encryption key, the second device encrypts the write response using the responder encryption key to produce an encrypted write response. Having produced the encrypted write response, the second device sends another self-validating response message that includes the encrypted write response to the first device.

With the self-validating response message sent, the first device receives the encrypted write response. Having received the encrypted write response, the first device creates the responder encryption key from the master key and the particular secret function. Having created the responder encryption key, the first device decrypts the encrypted write response based on the responder encryption key to recover the write response. Having recovered the write response, the first device generates a second message encryption key from the master key and a particular other secret function. Having generated the second message encryption key, the first device encrypts a write commit message using the second message encryption key to produce an encrypted write commit message. Having produced the encrypted write commit message, the first device sends yet another self-validating message that includes the write commit message to the second device.

With the yet another self-validating message that includes the write commit message sent to the second device, the second device receives the encrypted write commit message. Having received the encrypted write commit message, the second device creates the second message encryption key from the master key and the other particular secret function. Having created the second message encryption key, the second device decrypts the encrypted write commit message based on the second encryption key to recover the write commit message. Having recovered the write commit message, the second device completes a second phase of the multiphase storage process to make available for retrieval the encoded data slice of the write slice request.

The method described above in conjunction with the processing module can alternatively be performed by other modules of the dispersed storage network or by other devices. In addition, at least one memory section (e.g., a computer readable storage medium) that stores operational instructions can, when executed by one or more processing modules of one or more computing devices of the dispersed storage network (DSN), cause the one or more computing devices to perform any or all of the method steps described above.

Figure 45A:
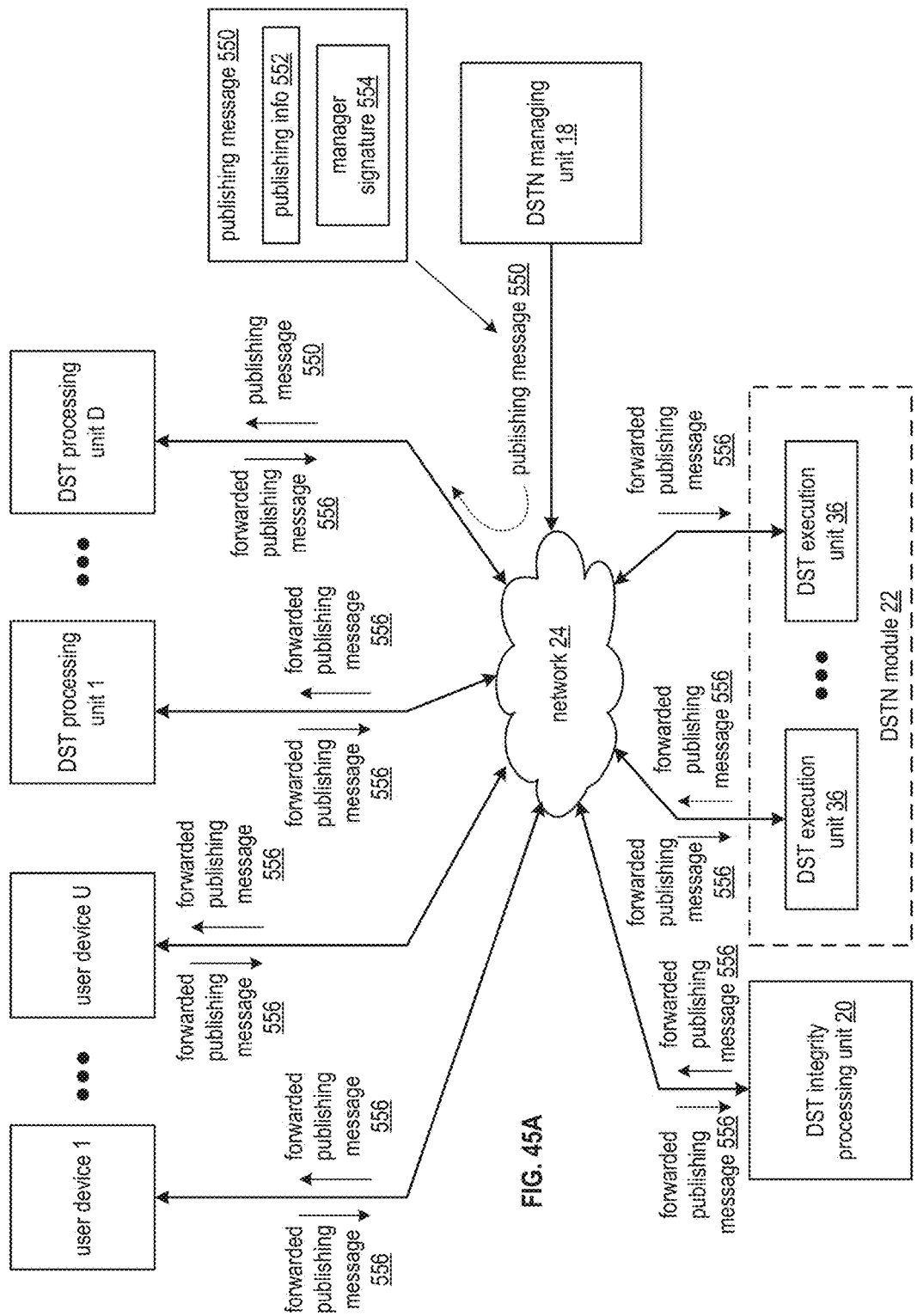
FIG. 45A is a schematic block diagram of another embodiment of a dispersed storage network (DSN) in accordance with the present invention.

FIG. 45A is a schematic block diagram of another embodiment of a dispersed storage network (DSN) that includes a plurality of user devices 1-U, a plurality of distributed storage and task (DST) processing units 1-D, the network 24 of FIG. 1, the distributed storage and task network (DSTN) managing unit 18 of FIG. 1, the DST integrity processing unit 20 of FIG. 1, and the DSTN module 22 of FIG. 1. The DSTN module 22 includes a plurality of DST execution units 36 of FIG. 1. The plurality of user devices 1-U may be implemented utilizing one or more of the user device 12 and the user device 14 of FIG. 1. The DST processing units 1-D may be implemented utilizing the DST processing unit 16 of FIG. 1.

The DSN functions to distribute publishing information 552 to substantially each entity of the DSN (e.g., including the plurality of user devices, the plurality of DST processing units, the DST integrity processing unit 20, and the plurality of DST execution units 36). The publishing information 552 includes one or more of system registry information, DSN configuration information, DSN entity configuration information, a trusted certificate, operational software, and any other information aligned with sharing on a global basis across the DSN.

In an example of operation to distribute the publishing information 552, the DSTN managing unit 18 generates updated publishing information 552 (e.g., updated portion of the system registry, updated configuration information, a new trusted certificate, a software upgrade package, etc.). Having generated the publishing information 552, the DSTN managing unit 18 generates a manager signature 554 over the updated publishing information 552. For example, the DSTN managing unit 18 generates the manager signature 554 over the publishing (e.g., new) information utilizing a private key of a public/private key pair associated with the DSTN managing unit 18, where a public key of the public/private key pair is distributed to the DSN entities (e.g., in a separate message, as part of the manager signature, as part of the publishing information).

Having generated the manager signature 554, the DSTN managing unit 18 determines a distribution scheme for the publishing information 552. The distribution scheme includes one or more of timing of the distribution, a distribution approach including one or more of selecting which entities of the DSN to directly receive the publishing information 552 and selecting a fan out scheme where the selected units further distribute the publishing information 552 such that full distribution to substantially all of the entities of the DSN occurs within the desired timing of the distribution.

Having determined the distribution scheme, the DSTN managing unit 18 generates a publishing message 550 to include one or more of the publishing information 552, the manager signature 554, and a descriptor of the distribution scheme. Having generated the publishing message 550, the DSTN managing unit 18 sends the publishing message 550 to at least one entity of the DSN in accordance with the distribution scheme. For example, the DSTN managing unit 18 sends the publishing message 550 to the selected units to directly receive the publishing information 552. For instance, the DSTN managing unit 18 sends the publishing message 550 to the DST processing unit D when the DST processing unit D has been selected to directly receive the publishing message 550.

The at least one entity of the DSN receives the publishing message 550 and validates the publishing information 552 utilizing the manager signature 554 and the public key of the public/private key pair of the DSTN managing unit 18 (e.g., received earlier). Having validated the publishing information 552, the entity locally stores at least a portion of the publishing information 552. For example, the entity stores a software update package when the software update package pertains to an entity type associated with the entity. As another example, the entity stores a portion of the system registry that is associated with the entity (e.g., for a particular vault).

Having stored the portion of the publishing information, the entity issues a forwarded publishing message 556 to at least one other entity of the DSN in accordance with the distribution scheme, where the forwarded publishing message 556 includes the publishing message 552. For example, the DST processing unit D generates the forwarded publishing message 556 and sends the forwarded publishing message 556 to another DST processing unit of the DST processing units 1-D.

The at least one other entity of the DSN repeats the above steps to include receiving the publishing message 552, validating the publishing information 552 using the manager signature 554, locally storing a portion of validated publishing information, and further issuing another forwarded publishing message 556 to yet another entity of the DSN in accordance with the distribution scheme until substantially all entities of the DSN have received the publishing information 552.

Figure 45B:
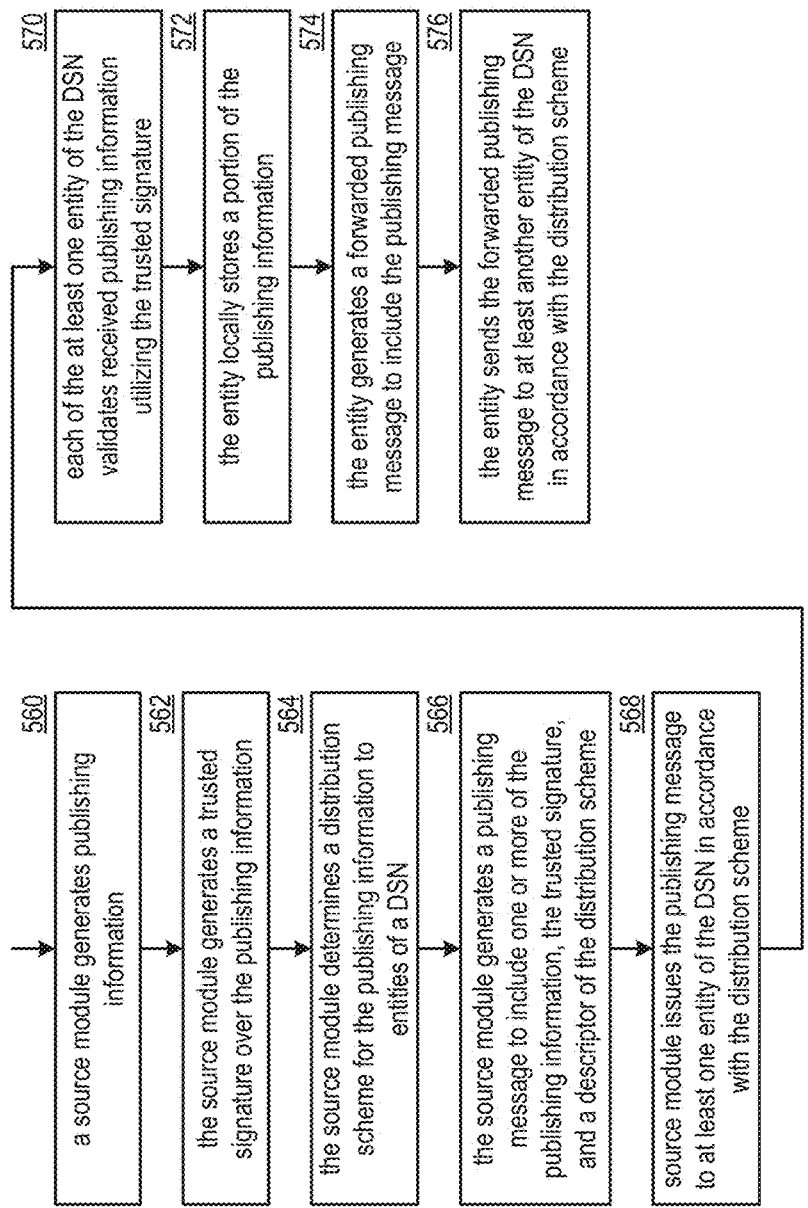
FIG. 45B is a flowchart illustrating an example of publishing information in a dispersed storage network (DSN) in accordance with the present invention.

FIG. 45B is a flowchart illustrating an example of publishing information in a dispersed storage network (DSN). The method begins or continues at step 560 where a source module (e.g., of a distributed storage and task network (DSTN) managing unit 18) generates publishing information. The generating includes determining, updating, receiving, and retrieving. The source module may generate the publishing information in accordance with an update schedule.

The method continues at step 562 where the source module generates a trusted signature over the publishing information. For example, the source module generates a signature over the publishing information using a private key of a public/private key pair of the source module. The method continues at step 564 where the source module determines a distribution scheme for the publishing information to entities of the DSN. The determining may be based on one or more of a predetermination, to meet a distribution timing requirement, and historical distributional times.

The method continues at step 566 where the source module generates a publishing message to include one or more of the publishing information, the trusted signature, and a descriptor of the distributed scheme. The method continues at step 568 where the source module issues the publishing message to at least one entity of the DSN in accordance with the distribution scheme. The issuing may include selecting the at least one entity based on one or more of a type of the entity, and entity entry of an entity list, performance of the entity, and availability of the entity.

The method continues at step 570 where each of the at least one entity of the DSN validates received publishing information utilizing the trusted signature. For example, the entity receives the publishing message, extracts the publishing information, and validates the publishing information using the trusted signature and a public key of the source module.

The method continues at step 572 where the entity locally stores a portion of the publishing information. For example, the entity identifies the portion of the publishing information based on affiliation with the entity. The method continues at step 574 where the entity generates a forwarded publishing message to include the publishing message. The generating may further include an indicator with regards to execution of the distribution scheme. For example, the indicator identifies which DSN entities still need to receive the forwarded publishing message.

The method continues at step 576 where the entity sends the forwarded publishing message to at least another entity of the DSN in accordance with the distribution scheme. Alternatively, or in addition to, the method continues where each of the at least another entity validates receiving the publishing messages, locally stores a corresponding portion of the forwarded publishing information, and when the distribution in accordance with the distribution scheme has not been completed, generates another forwarded publishing message and sends the other forwarded publishing message to at least one still further entity of the DSN in accordance with the distribution scheme.

Figure 46A:
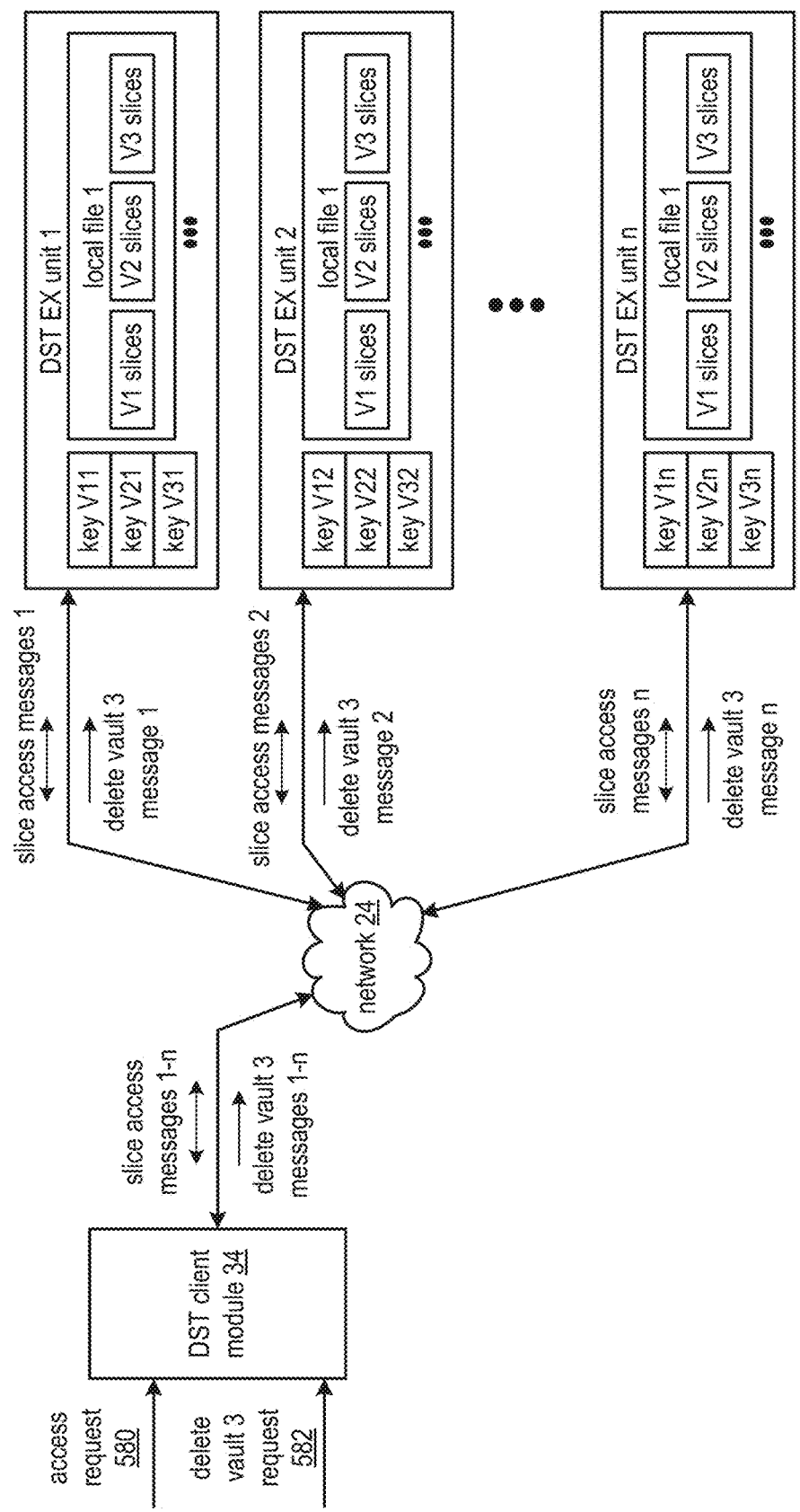
FIG. 46A is a schematic block diagram of another embodiment of a dispersed storage network (DSN) in accordance with the present invention.

FIG. 46A is a schematic block diagram of another embodiment of a dispersed storage network (DSN) that includes the distributed storage and task (DST) client module 34 of FIG. 1, the network 24 of FIG. 1, and a set of DST execution (EX) units 1-n. Each DST execution unit may be implemented utilizing the DST execution unit 36 of FIG. 1. The DSN functions to store data associated with one or more virtual vaults. Each vault may be associated with one or more of a group of users, a group of affiliated data, a combination of users and affiliated data. Data objects associated with a vault are dispersed storage error encoded to produce sets of slices for storage in the set of DST execution units. The DSN further functions to delete the vault such that the data associated with the vault is no longer available for access. Accessing the data includes storing the data and retrieving the data.

In an example of operation of accessing the data, the DST client module 34 receives an access request 580 for the data (e.g., a store data access request, a retrieve data access request). The DST client module 34 generates one or more sets of slice names corresponding to the data and generates at least one set of slice access messages 1-n (e.g., write slice requests for the store data access request, read slice requests for the retrieve data access request), where the set of slice access messages includes the one or more sets of slice names. Each slice name includes a common vault identifier (ID) associated with the vault. The DST client module 34 sends, via the network 24, the set of slice access messages 1-n to the set of DST execution units 1-n.

Each DST execution unit receives a slice access message. The DST execution unit extracts the vault ID from the slice name of the slice access message. For instance, the DST execution unit extracts a vault ID of 3. Having extracted the vault ID, the DST execution unit obtains a vault encryption key corresponding to the vault ID. For example, the DST execution unit accesses a local list of unique vault encryption keys corresponding to each vault affiliated with the DST execution unit. For instance, DST execution unit 2 accesses the local list that includes vault encryption keys V12, V22, and V32 corresponding to DST execution unit 2 vault encryption keys for vaults 1-3 to extract vault encryption key V32 corresponding to vault 3.

Having obtained the vault encryption key, the DST execution unit identifies a local file associated with the slice name. For example, the DST execution unit performs a local directory lookup based on the slice name to identify the local file name 1. The local file name corresponds to a file that may be utilized to store encoded data slices associated with one or more vaults. For example, the local file 1 includes encoded data slices corresponding to the vaults 1-3.

Having identified the local file associated with the slice name, the DST execution unit accesses the identified local file and performs a crypto function in accordance with the received slice access message. As a specific example, the DST execution unit 2 retrieves an encrypted encoded data slice from the local file 1 corresponding to the slice name and decrypts the encrypted encoded data slice using the vault encryption key V32 to reproduce an encoded data slice when the received slice access message includes the read slice requests. As another specific example, the DST execution unit 2 encrypts a received encoded data slice of the write slice request using the vault encryption key V32 to produce the encrypted encoded data slice and stores the encrypted encoded data slice in the local file 1 when the received slice access message is the write slice request.

Having accessed the local file and performed the crypto function, the DST execution unit issues, via the network 24, a slice access message in response to the received slice access message based on the accessing of the local file to the DST client module 34. As a specific example, the DST execution unit generates the slice access message to include a read slice response when the corresponding received slice access message was the read slice request. The DST execution unit generates the read slice response to include the decrypted encoded data slice. As another specific example, the DST execution unit generates the slice access message to include a write slice response when the corresponding received slice access message was the write slice request. The DST execution unit generates the write slice response to include a status indicator associated with the storing of the encrypted encoded data slice (e.g., successful storage, storage error).

In an example of operation of the deleting of the vault, the DST client module 34 receives a delete vault request 582 that includes a vault identifier. For example, the DST client module 34 receives a delete vault 3 request. The DST client module 34 may perform a combination of authentication and authorization to verify and validate the received delete vault request. The DST client module 34 issues delete vault messages to the set of DST execution units, where the delete vault messages includes the vault identifier. For example, the DST client module 34 issues, via the network 24, delete vault 3 messages 1-*n* to the DST execution units 1-*n*.

Each DST execution unit receives a corresponding delete vault message. The DST execution unit identifies the vault encryption key corresponding to the vault ID (e.g., performs a lookup in the local list of unique vault encryption keys). For example, DST execution unit 2 identifies vault encryption key V32 corresponding to vault 3.

Having identified the vault encryption key, each DST execution unit deletes the vault encryption key. For example, the DST execution unit 1 deletes the vault encryption key V31 from the local list of unique vault encryption keys associated with DST execution unit 1, the DST execution unit 2 deletes the vault encryption key V32 from the local list of unique vault encryption keys associated with DST execution unit 2, through the DST execution unit n deletes the vault encryption key V3*n* from the local list of unique vault encryption keys associated with DST execution unit n. Having deleted the vault encryption keys associated with the vault for deletion, access to stored encrypted encoded data slices associated with the vault is no longer possible.

Having deleted the vault encryption key, each DST execution unit identifies storage space of one or more local files associated with encrypted encoded data slices corresponding to the vault ID as available storage space. For example, each DST execution unit identifies storage space within the one or more local files associated with the storage of encoded data slices associated with slice names that includes vault 3 and indicates that the identified storage space is now available storage space to support subsequent storing of further new encrypted encoded data slices within the one or more local files.

Figure 46B:
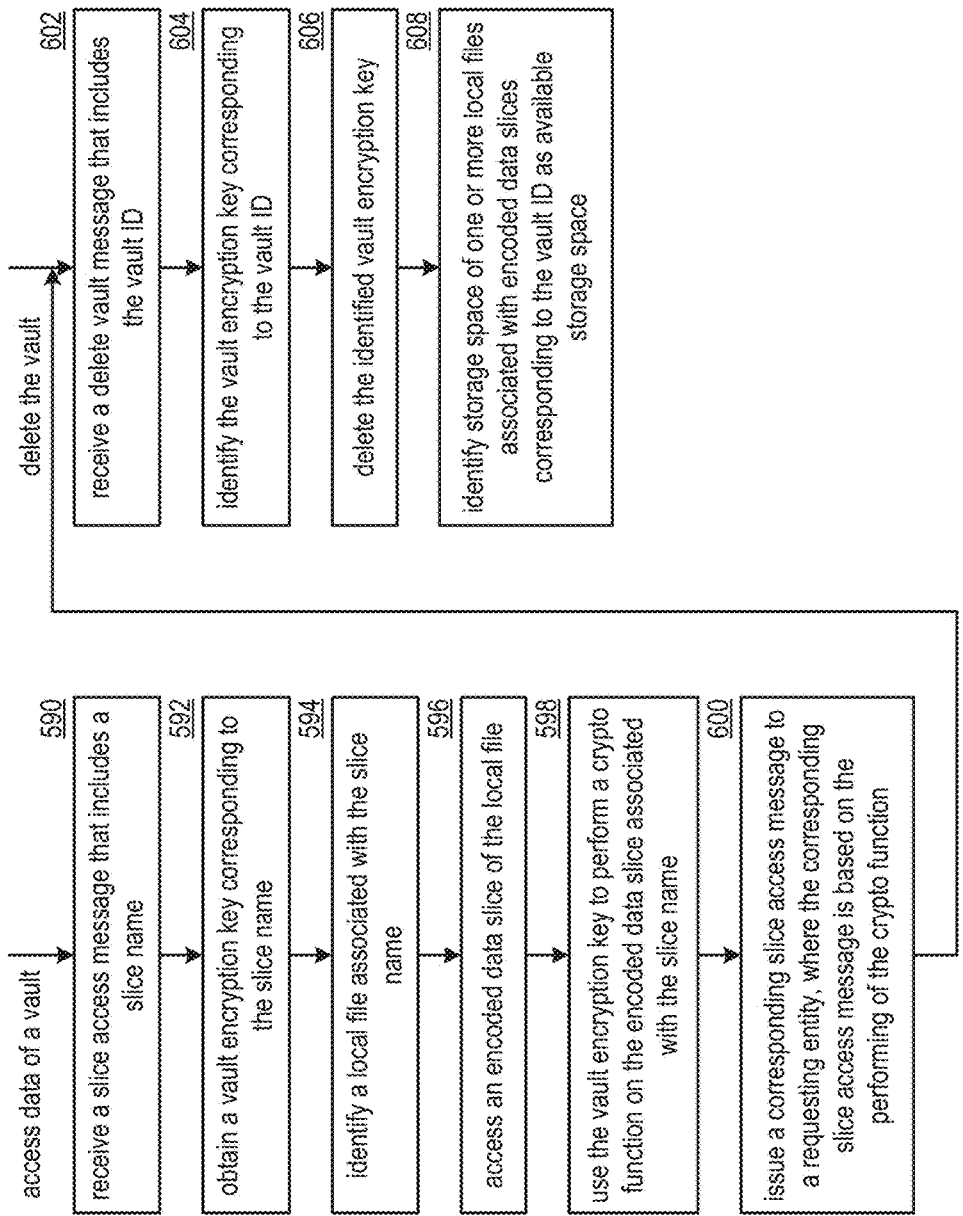
FIG. 46B is a flowchart illustrating an example of deleting a vault in a dispersed storage network (DSN) in accordance with the present invention.

FIG. 46B is a flowchart illustrating an example of deleting a vault in a dispersed storage network (DSN). The method begins or continues, when accessing data of a vault associated with the DSN, at step 590 where a processing module (e.g., of a distributed storage and task (DST) execution unit) receives a slice access message that includes a slice name. The method continues at step 592 where the processing module obtains a vault encryption key corresponding to the slice name. For example, the processing module performs a lookup using a vault ID of the slice name to obtain the vault encryption key.

The method continues at step 594 where the processing module identifies a local file associated with the slice name. For example, the processing module performs a lookup utilizing the slice name to identify the local file. The method continues at step 596 where the processing module accesses an encoded data slice of the local file. For example, the processing module retrieves an encrypted encoded data slice from the local file when the slice access message includes a read slice request. As another example, the processing module extracts the encoded data slice from the slice access message when the slice access message includes a write slice request.

The method continues at step 598 where the processing module uses the vault encryption key to perform the crypto function on the encoded data slice associated with the slice name. For example, the processing module decrypts the retrieved encrypted encoded data slice using the vault encryption key to produce a decrypted encoded data slice when the slice access message includes the read slice request. As another example, the processing module encrypts the extracted encoded data slice using the vault encryption key to produce the encrypted encoded data slice for storage in the local file.

The method continues at step 600 where the processing module issues a corresponding slice access message to a requesting entity, where the corresponding slice access message is based on the performing of the crypto function. For example, the processing module issues a read slice response to the requesting entity, where the read slice response includes the decrypted encoded data slice. As another example, the processing module issues a write slice response to the requesting entity, where the write slice response includes a status associated with the writing of the encrypted encoded data slice to the local file.

The method continues, when deleting the vault, at step 602 where the processing module receives a delete vault message that includes the vault ID. The method continues at step 604 where the processing module identifies the vault encryption key corresponding to the vault ID. For example, the processing module performs a lookup using the vault ID to identify the vault encryption key.

The method continues at step 606 where the processing module deletes the identified vault encryption key. For example, the processing module permanently destroys the identified vault encryption key and any copies of the vault encryption key. For instance, the processing module deletes a section of a memory utilized to store the vault encryption key. In another instance, the processing module issues delete slice requests to a plurality of storage units associated with storing encoded key slices, where the vault encryption key is dispersed storage error encoded to produce a set of encoded key slices and the set of encoded key slices are stored in the plurality of storage units.

The method continues at step 608 where the processing module identifies storage space of one or more local files associated with encoded data slices corresponding to the vault ID as available storage space. For example, the processing module updates a storage table of available storage space to indicate offsets within each local file corresponding to the encoded data slices corresponding to the vault ID.

Figure 47A:
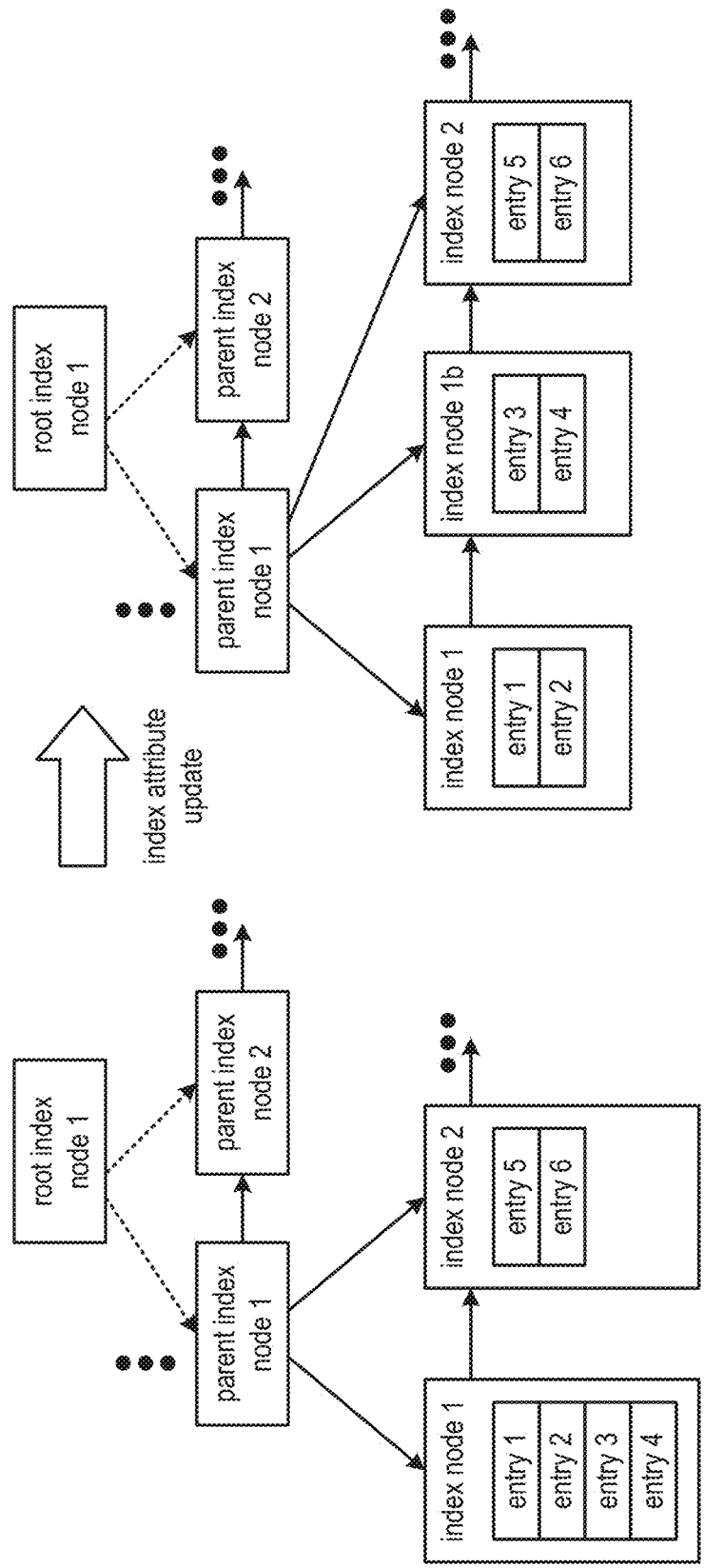
FIG. 47A is a schematic block diagram of an embodiment of a dispersed hierarchical index in accordance with the present invention.

FIG. 47A is a schematic block diagram of an embodiment of a dispersed hierarchical index that includes one root index node, one or more parent index nodes, and one or more index nodes. Each of the nodes (e.g., root index node, parent index nodes, index nodes) may be implemented utilizing a data object and includes entries of one or more of an associated index key range, pointers to other nodes, and pointers to data objects stored in a dispersed storage network (DSN). Such pointers include a virtual DSN address (e.g., a source name) corresponding to a storage location the node and/or the data object. Parent index nodes include pointers to child index nodes forming parent-child relationships. Nodes may also include pointers to sibling level nodes on a common level of the index. Each node is dispersed storage error encoded to produce a set of node slices and each set of node slices is stored in a set of storage units of the DSN at a location corresponding to the DSN address of the node.

The dispersed hierarchical index may be constructed and maintained to include dimensions associated with one or more index attributes. Index attributes include one or more of a maximum number of levels, a minimum number of levels (e.g., from the root index node at a top-level to the index nodes at a lowest level), a maximum number of child nodes in a parent-child node relationship, a minimum number of child nodes in the parent-child node relationship, a maximum number of sibling nodes and a common level, a minimum number of sibling nodes at the common level, a maximum number of entries in an index node, and a minimum number of entries in the index node.

The dispersed hierarchical index may be utilized to locate the storage location associated with a data object stored in the DSN. For example, starting with the root index node, the dispersed hierarchical index is searched by matching a desired index key to an index key within an entry of an index node at the lowest level, where the entry of the index node corresponds to the desired data object. The search may include accessing successive lower levels of the index by comparing the desired index key to the index key ranges associated with nodes between the root index node and the index node of the lowest level that is associated with the desired data object. The lowest level of index nodes includes entries associated with the data objects stored in the DSN. For example, an index node 1 includes entries 1-4 corresponding to four different data objects stored in the DSN and an index node 2 includes entries 5-6 corresponding to two more data objects stored in the DSN. The lowest level of index nodes may incur a highest level of updating when data objects are added to the DSN and deleted from the DSN. As such, a lowest level index node that includes a higher than average number of entries may incur a disproportionate amount of access activity (e.g., reading and writing the index node with updates). Such access activity may include contention when two or more writers attempt to substantially simultaneously write a different update of a common index node to the DSN. Such contention may be undesirable when higher delays associated with successful writing are incurred. As such, a method may be employed by the DSN to update an index attribute of the dispersed hierarchical index.

In an example of operation of updating the index attribute, a processing module of the DSN obtains dispersed hierarchical index access contention information. The access contention information includes one or more of a number of attempted write accesses to a common index node per unit of time, a number of successful write accesses to the common index node per unit of time, a number of failed write accesses to the common index node per unit of time, an average time to complete a successful write access to the common index node, and any other metric that measures an artifact of contention between two or more writers to a common index node.

The obtaining the contention information includes one or more of interpreting an error message, performing a test, interpreting a test result, initiating a query, receiving a query response, and interpreting historical records of write access requests. Having obtained the access contention information, the processing module determines to modify an index attribute based on the contention information and a contention goal threshold level. For example, the processing module indicates to lower a maximum number of entries per index node for a level of the index when a level of write contention is greater than a maximum write contention threshold level. As another example, the processing module indicates to raise the maximum number of entries per index node for the level of the index when the level of write contention is less than a low write contention threshold level. As yet another example, the processing module indicates to raise a minimum number of entries per index node for the level of the index when an index search timeframe is greater than a high search timeframe threshold level. As a still further example, the processing module indicates to lower the minimum number of entries per index node for the level of the index when the index search time frame is less than a low search timeframe threshold level. Having determined to modify the index attribute, the processing module modifies the index attribute in accordance with the contention information and the contention goal threshold level.

Having modified the index attribute, the processing module updates configuration of the dispersed hierarchical index based on the modified index attribute. For example, the processing module performs a join node operation when the number of entries of the index node is less than the minimum number of entries per index node (e.g., entries from two index nodes are combined into a first index node of the two index nodes and a second node of the two index nodes is deleted). As another example, the processing module performs a split node operation when a number of entries of an index node is greater than the maximum number of entries per index node. For instance, the processing module identifies index node 1 for modification when the index node attribute for maximum number of entries for the index node is two and the current number of entries for index node 1 is 4 (e.g., as illustrated on the left side of FIG. 47A. Having identified index node 1 for the split node modification, the processing module generates a new index node 1b, transfers at least some entries of the index node 1 to the index node 1b, and integrates (e.g., updates pointers) the index node 1b into the dispersed hierarchical index (e.g., as illustrated on the right side of FIG. 47A)

Figure 47B:
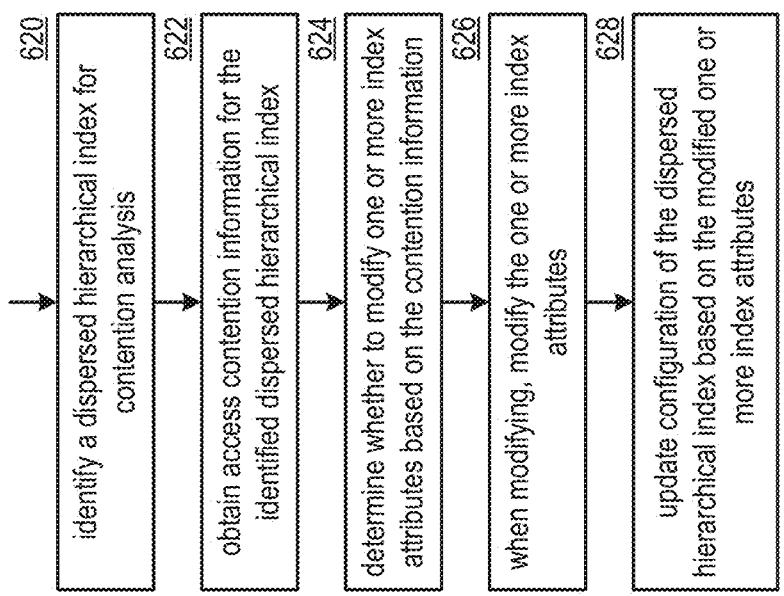
FIG. 47B is a flowchart illustrating an example of updating an attribute of a dispersed hierarchical index in accordance with the present invention.

FIG. 47B is a flowchart illustrating an example of updating an attribute of a dispersed hierarchical index. The method begins or continues at step 620 where a processing module (e.g., of a distributed storage and task (DST) client module) identifies a dispersed hierarchical index for contention analysis. The identifying includes at least one of interpreting an analysis schedule, interpreting an error message, and receiving a request. For example, the processing module identifies a next dispersed hierarchical index on a list of dispersed hierarchical indexes to be analyzed.

The method continues at step 622 where the processing module obtains access contention information for the identified dispersed hierarchical index. The obtaining includes at least one of interpreting an error message, performing a test, interpreting a test result, polling two or more distributed storage and task processing units, receiving the access contention information from the two or more distributed storage and task processing units, and accessing historical records of write requests to one or more levels of the dispersed technical index.

The method continues at step 624 where the processing module determines whether to modify one or more index attributes based on the contention information. For example, the processing module indicates to modify an index attribute when the contention information compares unfavorably to a contention goal. When modifying, the method continues at step 626 where the processing module modifies the one or more index attributes. For example, the processing module updates the one or more index attributes such that estimated contention information is expected to compare favorably to the contention goal.

The method continues at step 628 where the processing module updates configuration of the dispersed hierarchical index based on the modified one or more index attributes.

For example, the processing module identifies an index node associated with an index node attribute the compares unfavorably to the one or more updated index attributes and updates configuration of the dispersed hierarchical index that includes configuration of the identified index node.

Figure 48A:
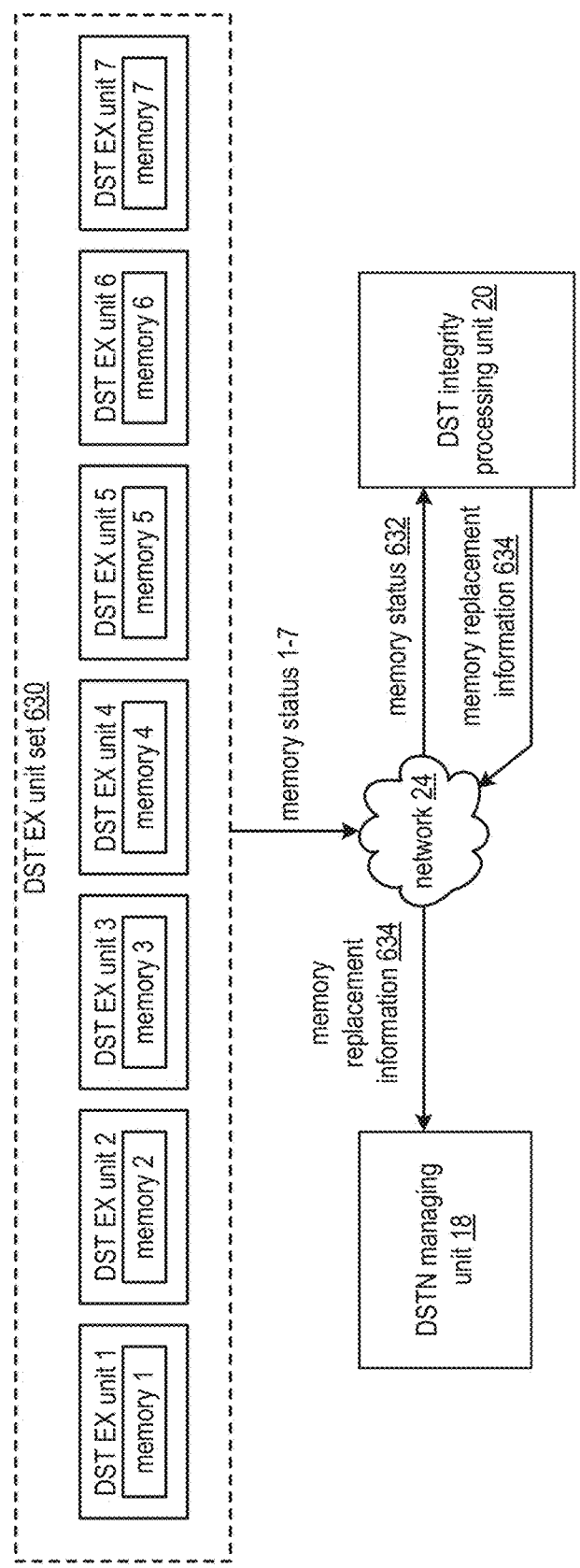
FIG. 48A is a schematic block diagram of another embodiment of a dispersed storage network (DSN) in accordance with the present invention.

FIG. 48A is a schematic block diagram of another embodiment of a dispersed storage network (DSN) that includes a distributed storage and task (DST) execution unit set 630, the distributed storage and task network (DSTN) managing unit 18 of FIG. 1, the network 24 of FIG. 1, and the DST integrity processing unit 20 of FIG. 1. Alternatively, the DST integrity processing unit 20 may be implemented utilizing one or more of the DSTN managing unit 18, a rebuilding module, and a DST client module 34 of FIG. 1. The DST execution unit set 630 includes a set of DST execution units 1-7. Each DST execution unit may be implemented utilizing the DST execution unit 36 of FIG. 1. The set of DST execution units 1-7 includes a set of memories 1-7. Each memory may be implemented utilizing the memory 88 of FIG. 3.

The DSN functions to schedule replacement of the memories in accordance with a rebuilding threshold approach. The rebuilding threshold approach includes rebuilding one or more encoded data slices associated with storage errors of a set of an information dispersal algorithm (IDA) width number of encoded data slices stored in the set of memories where at least a decode threshold number of encoded data slices of the set of encoded data slices is required to recover a corresponding data segment. As a specific example, the DST integrity processing unit 20 identifies the storage errors, detects that the set of encoded data slices only includes a rebuilt threshold or fewer number of available encoded data slices (e.g., no storage error and memory operational), and initiates rebuilding of one or more encoded data slices of the set of encoded data slices. For instance, the DST integrity processing unit 20 rebuilds two encoded data slices of the set of 7 encoded data slices when identifying that only 5 encoded data slices are available when the IDA width is 7 and the rebuild threshold is 5.

The DSN schedules the replacement of the memories such that all seven memories are available when the DST integrity processing unit 20 determines to rebuild a set of encoded data slices. For example, the DSN schedules replacement of older memories such that the older memories are replaced with new memories just before a number of storage errors grows to a point such that a rebuild threshold is detected.

In an example of operation, the DST integrity processing unit 20 obtains memory reliability information (e.g., memory status 632) associated with the set of memories of the set of DST execution units. The obtaining includes one or more of acquiring a memory meantime to failure for the memories based on one or more of receiving the memory meantime to failure, performing a test, interpreting a test result, and interpreting historical memory performance information. For example, the DST integrity processing unit 20 accesses a system registry and extracts the memory meantime to failure reliability information provided by a memory vendor.

Having obtained the memory of reliability information, the DST integrity processing unit 20 obtains dispersal parameters for the set of DST execution units. The dispersal parameters includes one or more of the IDA width, the rebuild threshold, and the decode threshold. The obtaining includes at least one of retrieving from the system registry, receiving, and determining based on one or more of a performance goal level and actual performance level.

Having obtained the dispersal parameters, the DST integrity processing unit 20 generates a recommended time between memory replacements based on the memory reliability information and the dispersal parameters. For example, the DST integrity processing unit 20 generates a meantime to reach rebuild threshold as the recommended time between memory replacements. For instance, the DST integrity processing unit 20 generates the meantime to reach rebuild threshold in accordance with a formula: sum from i=rebuild threshold to IDA with of: (memory meantime to failure)/i.

Having generated the recommended time between memory replacements, the DST integrity processing unit 20 may issue memory replacement information 634, via the network 24, to the DSTN managing unit 18 for subsequent utilization by a manager and/or service technician. The memory replacement information 634 includes one or more of identifiers of the set of memories, identifiers of the set of DST execution units, and the recommended time between memory replacements. Having sent the memory replacement information 634, the DST integrity processing unit 20 obtains memory status 1-7 for the memories 1-7. The obtaining includes at least one of sending a request, receiving a response, and autonomously receiving the memory status from the DST execution units.

Having obtained the memory status 632, the DST integrity processing unit 20 determines whether a number of available memories of the set of memories compares favorably to the rebuild threshold to produce an activated memory replacement indicator when the comparison is unfavorable. For example, the DST integrity processing unit 20 produces the memory replacement indicator when the comparison is unfavorable as indicated by the number of available memories is less than or equal to the rebuild threshold.

Having established the replacement indicator, the DST integrity processing unit 20 generates updated memory replacement information 634 that includes the memory replacement information and the memory replacement indicator. Having generated the updated memory replacement information, the DST integrity processing unit 20 sends, via the network 24, the updated memory replacement information 634 to one or more of the DSTN managing unit 18, a user device, the set of DST execution units, and to a memory replacement unit (e.g., to facilitate semi-automated replacement of memories in accordance with the recommended time between memory replacements).

Figure 48B:
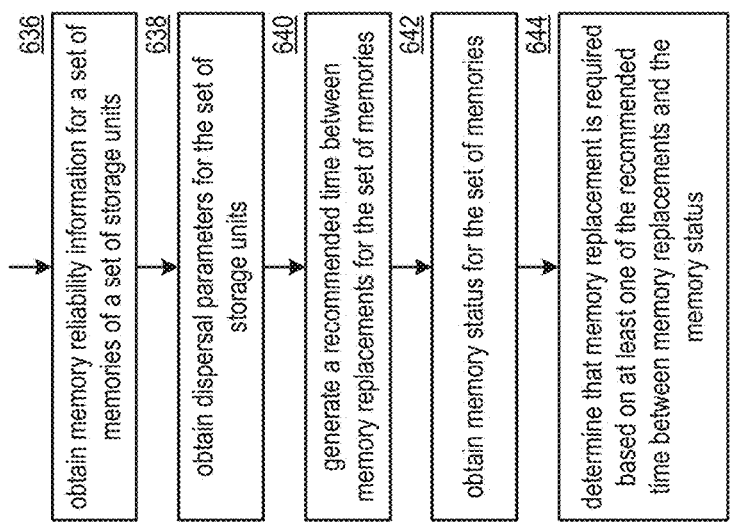
FIG. 48B is a flowchart illustrating an example of scheduling replacement of memories in a dispersed storage network (DSN) in accordance with the present invention.

FIG. 48B is a flowchart illustrating an example of scheduling replacement of memories in a dispersed storage network (DSN). The method begins or continues at step 636 where a processing module (e.g., of a distributed storage and task (DST) integrity processing unit) obtains memory reliability information for a set of memories of a set of storage units. The obtaining includes determining memory meantime to failure for each memory of the set of memories.

The method continues at step 638 where the processing module obtains dispersal parameters for the set of storage units. For example, the processing module interprets system registry information. The method continues at step 640 where the processing module generates a recommended time between memory replacements for the set of memories based on the meantime to failure for the memories and the dispersal parameters. For example, the processing module extracts a rebuild threshold number and an information dispersal algorithm (IDA) width of the dispersal parameters and calculates the recommended time between memory replacements as a meantime to reach the rebuild threshold in accordance with a formula of: sum, for i=rebuild threshold number to IDA width, (memory meantime to failure)/i.

The method continues at step 642 where the processing module obtains memory status for the set of memories. For example, the processing module issues a memory status request to the set of storage units and receives a set of responses that includes the memory status for the set of memories. The method continues at step 644 where the processing module determines that memory replacement is required based on at least one of the recommended time between memory replacements and the memory status. For example, the processing module indicates to replace a memory immediately when the memory status indicates that a number of available memories is less than or equal to the rebuild threshold number (e.g., a number of failed memories is greater than or equal to a difference between the IDA width of the rebuild threshold number). As another example, the processing module indicates to replace memories in accordance with the recommended time between memory replacements when the memory status indicates that the number of available memories is greater than the rebuild threshold number.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices of a dispersed storage network (DSN), the method comprises:
   determining that a set of storage units of the DSN will be used for read operations of dispersed storage error encoded data; and
   for the set of storage units:
      determining an actual reliability that indicates a level of reliability in retrieving a decode threshold number of encoded data slices per read request of a plurality of read requests;
      comparing the actual reliability to a desired reliability of the set of storage units, wherein the desired reliability indicates a desired level of reliability in retrieving the decode threshold number of encoded data slices per read request of the plurality of read requests; and
      when the actual reliability exceeds the desired reliability by a reconfiguration threshold, removing one or more storage units from the set of storage units.

2. The method of claim 1, wherein the determining that the set of storage units will be used for read operations comprises one or more of:
   determining that memory utilization of the set of storage units exceeds a utilization threshold;
   receiving a read only command regarding the set of storage units; and
   determining a number of read operations for the set of storage units is a multiple of a number of write operations for the set of storage units.

3. The method of claim 1, wherein the removing the one or more storage units comprises:
   determining that the one or more storage units has an unacceptable failure rate; and
   when the one or more storage units has the unacceptable failure rate, decommissioning the one or more storage units.

4. The method of claim 1, wherein the removing the one or more storage units comprises:
   redeploying the one or more storage units to another set of storage units.

5. The method of claim 1, wherein the removing the one or more storage units comprises:
   determining a reliability rate for each of the storage units in the set of storage units;
   identifying one of the storage units as having a reliability rate below a low reliability threshold and decommissioning the one of the storage units; and
   identifying a second one of the storage units as having a reliability rate above a high reliability threshold and redeploying the second one of the storage units.

6. The method of claim 1 further comprises:
   updating one or more of: a pillar width number, a write threshold number, or a read threshold number; and
   maintaining the decode threshold number.

7. The method of claim 1 further comprises:
   adjusting rebuilding parameters for the dispersed storage error encoded data.

8. The method of claim 1, wherein the determining the actual reliability comprises one of:
   establishing the actual reliability as a ratio between an original pillar width number and the decode threshold number; and
   establishing the actual reliability as a ratio between an effective pillar width number and the decode threshold number.

9. The method of claim 8, wherein the removing the one or more storage units comprises:
   establishing the desired reliability as a ratio between a read threshold number and the decode threshold number; and
   determining a number of storage units of the storage units to remove based on:
      a difference between the read threshold number and the original pillar width number; or
      a difference between the read threshold number and the effective pillar width number.

10. A non-transitory computer readable storage medium comprises:
    at least one memory section that stores operational instructions that, when executed by one or more processing modules of one or more computing devices of a dispersed storage network (DSN), causes the one or more computing devices to:
       determine that a set of storage units of the DSN will be used for read operations of dispersed storage error encoded data; and
       for the set of storage units:

determine an actual reliability that indicates a level of reliability in retrieving a decode threshold number of encoded data slices per read request of a plurality of read requests;

compare the actual reliability to a desired reliability of the set of storage units, wherein the desired reliability indicates a desired level of reliability in retrieving the decode threshold number of encoded data slices per read request of the plurality of read requests; and when the actual reliability exceeds the desired reliability by a reconfiguration threshold, remove one or more storage units from the set of storage units.

11. The non-transitory computer readable storage medium of claim 10, wherein the one or more processing modules functions to execute the operational instructions stored by the at least one memory section to cause the one or more computing devices of the DSN to determine that the set of storage units will be used for read operations by:

determining that memory utilization of the set of storage units exceeds a utilization threshold;

receiving a read only command regarding the set of storage units; and determining a number of read operations for the set of storage units is a multiple of a number of write operations for the set of storage units.

12. The non-transitory computer readable storage medium of claim 10, wherein the one or more processing modules functions to execute the operational instructions stored by the at least one memory section to cause the one or more computing devices of the DSN to remove the one or more storage units by:

determining that the one or more storage units has an unacceptable failure rate; and when the one or more storage units has the unacceptable failure rate, decommissioning the one or more storage units.

13. The non-transitory computer readable storage medium of claim 10, wherein the one or more processing modules functions to execute the operational instructions stored by the at least one memory section to cause the one or more computing devices of the DSN to remove the one or more storage units by:

redeploying the one or more storage units to another set of storage units.

14. The non-transitory computer readable storage medium of claim 10, wherein the one or more processing modules functions to execute the operational instructions stored by the at least one memory section to cause the one or more computing devices of the DSN to remove the one or more storage units by:

determining a reliability rate for each of the storage units in the set of storage units;

identifying one of the storage units as having a reliability rate below a low reliability threshold and decommissioning the one of the storage units; and identifying a second one of the storage units as having a reliability rate above a high reliability threshold and redeploying the second one of the storage units.

15. The non-transitory computer readable storage medium of claim 10 further comprises:

the at least one memory section stores further operational instructions that, when executed by the one or more processing modules, causes the one or more computing devices of the DSN to:

update one or more of: a pillar width number, a write threshold number, or a read threshold number; and maintain the decode threshold number.

16. The non-transitory computer readable storage medium of claim 10 further comprises:

the at least one memory section stores further operational instructions that, when executed by the one or more processing modules, causes the one or more computing devices of the DSN to:

adjust rebuilding parameters for the dispersed storage error encoded data.

17. The non-transitory computer readable storage medium of claim 10, wherein the one or more processing modules functions to execute the operational instructions stored by the at least one memory section to cause the one or more computing devices of the DSN to determine the actual reliability by one of:

establishing the actual reliability as a ratio between an original pillar width number and the decode threshold number; and establishing the actual reliability as a ratio between an effective pillar width number and the decode threshold number.

18. The non-transitory computer readable storage medium of claim 17, wherein the one or more processing modules functions to execute the operational instructions stored by the at least one memory section to cause the one or more computing devices of the DSN to remove the one or more storage units by:

establishing the desired reliability as a ratio between a read threshold number and the decode threshold number; and determining a number of storage units of the storage units to remove based on:

a difference between the read threshold number and the original pillar width number; or a difference between the read threshold number and the effective pillar width number.

19. A computing device of a group of computing devices of a dispersed storage network (DSN), the computing device comprises:

an interface;

a local memory; and a processing module including a processor operably coupled to the interface and the local memory, wherein the processor functions to:

determine that a set of storage units of the DSN will be used for read operations of dispersed storage error encoded data; and for the set of storage units:

determine an actual reliability that indicates a level of reliability in retrieving a decode threshold number of encoded data slices per read request of a plurality of read requests;

compare the actual reliability to a desired reliability of the set of storage units, wherein the desired reliability indicates a desired level of reliability in retrieving the decode threshold number of encoded data slices per read request of the plurality of read requests; and when the actual reliability exceeds the desired reliability by a reconfiguration threshold, remove one or more storage units from the set of storage units.

20. The computing device of claim 19, wherein the processing module functions to determine that the set of storage units will be used for the read operations by:

determining that memory utilization of the set of storage units exceeds a utilization threshold;

receiving, via the interface, a read only command regarding the set of storage units; and determining a number of read operations for the set of storage units is a multiple of a number of write operations for the set of storage units.

21. The computing device of claim 19, wherein the processing module functions to remove the one or more storage units by:
   determining that the one or more storage units has an unacceptable failure rate; and
   when the one or more storage units has the unacceptable failure rate, decommissioning the one or more storage units.

22. The computing device of claim 19, wherein the processing module functions to remove the one or more storage units by:
   redeploying the one or more storage units to another set of storage units.

23. The computing device of claim 19, wherein the processing module functions to remove the one or more storage units by:
   determining a reliability rate for each of the storage units in the set of storage units;
   identifying one of the storage units as having a reliability rate below a low reliability threshold and decommissioning the one of the storage units; and
   identifying a second one of the storage units as having a reliability rate above a high reliability threshold and redeploying the second one of the storage units.

24. The computing device of claim 19, wherein the processing module further functions to:
   update one or more of: a pillar width number, a write threshold number, or a read threshold number; and
   maintain the decode threshold number.

25. The computing device of claim 19, wherein the processing module further functions to:
   adjust rebuilding parameters for the dispersed storage error encoded data.

26. The computing device of claim 19, wherein the processing module functions to determine the actual reliability by one of:
   establishing the actual reliability as a ratio between an original pillar width number and the decode threshold number; and
   establishing the actual reliability as a ratio between an effective pillar width number and the decode threshold number.

* * * * *